United States Patent
Andrews et al.

(10) Patent No.: US 10,171,194 B2
(45) Date of Patent: *Jan. 1, 2019

(54) INTERFERENCE MANAGEMENT AND DECENTRALIZED CHANNEL ACCESS SCHEMES IN HOTSPOT-AIDED CELLULAR NETWORKS

(71) Applicant: Board of Regents, The University of Texas System, Austin, TX (US)

(72) Inventors: Jeffrey G. Andrews, Austin, TX (US); Vikram Chandrasekhar, Dallas, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 60 days.

This patent is subject to a terminal disclaimer.

(21) Appl. No.: 14/744,467

(22) Filed: Jun. 19, 2015

(65) Prior Publication Data

US 2016/0006527 A1 Jan. 7, 2016

Related U.S. Application Data

(63) Continuation of application No. 12/621,781, filed on Nov. 19, 2009, now Pat. No. 9,078,138.

(Continued)

(51) Int. Cl.
*H04J 11/00* (2006.01)
*H04W 16/10* (2009.01)
(Continued)

(52) U.S. Cl.
CPC ........... *H04J 11/005* (2013.01); *H04W 16/10* (2013.01); *H04W 36/04* (2013.01);
(Continued)

(58) Field of Classification Search
CPC .................................................... H04W 24/02
See application file for complete search history.

(56) References Cited

U.S. PATENT DOCUMENTS

| | | | | |
|---|---|---|---|---|
| 6,314,294 B1 * | 11/2001 | Benveniste | ........... | H04W 16/04 455/452.2 |
| 2004/0047312 A1 * | 3/2004 | Muszynski | ........... | H04W 36/30 370/331 |

(Continued)

OTHER PUBLICATIONS

International Search Report and Written Opinion, dated Jan. 21, 2010, received in connection with International Patent Application No. PCT/US2009/065135.

*Primary Examiner* — John D Blanton
(74) *Attorney, Agent, or Firm* — Meunier Carlin & Curfman LLC

(57) ABSTRACT

A system and method are provided wherein one or more femtocell base stations are deployed within a range of a cellular base station and utilize substantially the same frequency band as the cellular base station. Each femtocell base station may be configured to employ one or more interference avoidance techniques such that coexistence between the cellular and the corresponding femtocell base station is enabled. The interference avoidance techniques employed may include use of randomized time or frequency hopping; randomly selecting a predetermined number, or identifying one or more unutilized, frequency subchannels for signal transmission; using two or more transmit, and two or more receive antennas; nulling one or more transmissions in a direction of a nearby cellular base station user; handing off at least one cellular user to one of the femtocell base stations and vice versa; and/or reducing the transmission power of at least one femtocell base station.

24 Claims, 30 Drawing Sheets

Related U.S. Application Data

(60) Provisional application No. 61/116,531, filed on Nov. 20, 2008.

(51) Int. Cl.
*H04W 52/24* (2009.01)
*H04W 36/04* (2009.01)
*H04W 72/04* (2009.01)
*H04W 84/04* (2009.01)

(52) U.S. Cl.
CPC ..... *H04W 52/244* (2013.01); *H04W 72/0446* (2013.01); *H04W 72/04* (2013.01); *H04W 72/0473* (2013.01); *H04W 84/045* (2013.01)

(56) References Cited

U.S. PATENT DOCUMENTS

| | | | |
|---|---|---|---|
| 2005/0156775 A1* | 7/2005 | Petre | H03M 1/121 341/155 |
| 2006/0019665 A1* | 1/2006 | Aghvami | H04W 16/32 455/444 |
| 2006/0109865 A1* | 5/2006 | Park | H04W 16/02 370/482 |
| 2006/0223449 A1 | 10/2006 | Sampath et al. | |
| 2007/0123257 A1* | 5/2007 | Noll | H04W 36/0055 455/436 |
| 2008/0101306 A1 | 5/2008 | Bertrand et al. | |
| 2008/0260084 A1* | 10/2008 | Horiguchi | H04W 72/02 375/359 |
| 2008/0261602 A1* | 10/2008 | Livneh | H04W 84/045 455/442 |
| 2008/0268797 A1* | 10/2008 | Ahn | H01Q 3/30 455/127.1 |
| 2008/0274712 A1 | 11/2008 | Rofougaran | |
| 2009/0082027 A1 | 3/2009 | Yavuz et al. | |
| 2010/0054196 A1* | 3/2010 | Hui | H04W 16/00 370/329 |

\* cited by examiner

| Symbol | Description | Value |
|---|---|---|
| $\mathcal{H}$ | Region inside reference cellsite | N/A |
| $\Omega_c, \Omega_f$ | SPPPs defining Tier 1, Tier 2 users | N/A |
| $R_c, R_f$ | Macro/Femtocell Radius | 500, 20 meters |
| $U_f$ | Poisson mean users per femtocell | 5 |
| $N_{sec}$ | Macrocell/Femtocell BS antenna sectors | 3 |
| $N_{hop}$ | CDMA Hopping slots | 1, 2, 4 |
| $\alpha, \beta$ | Path-loss exponents | 4, 2 |
| $G$ | Processing Gain | 128 |
| $\gamma$ | Target SIR per tier | 2 [C/I=3 dB] |
| $\epsilon$ | Target Outage Probability | 0.1 |
| $\sigma_{dB}$ | Lognormal shadowing parameter | 4 dB |
| $P_r^c$ | Macrocell receive power | 1 |
| $P_r^f$ | Femtocell receive power | 1, 10, 100 |
| $d_{0c}, d_{0f}$ | Reference distances | 100, 5 meters |
| $f_c$ | Carrier Frequency | 2 GHz |

FIG. 5

| Symbol | Description | Value |
|---|---|---|
| $R_c, R_f$ | Macrocell/Femtocell Radius | 288 m, 40 m |
| $U$ | Total users per cell site | 300 |
| $U_f$ | Users per femtocell | 2 |
| $P_{f,dB}$ | Wall penetration loss | 2 dB, 10 dB |
| $G, L$ | Shannon Gap, Modulation Levels | 3 dB, 8 |
| $\alpha_c$ | Path-loss exponent (Macrocell Outdoor) | 4 |
| $\alpha_f$ | Path-loss exponent (Femtocell to Femtocell) | 3.5, 4 |
| $\beta_f$ | Path-loss exponent (Inside Home Femtocell) | 3 |
| $\sigma_{c,dB}, \sigma_{fi,dB}, \sigma_{fo,dB}$ | Lognormal Shadow Parameters | 8 dB, 4 dB, 12 dB |

FIG. 23

| Variable | Parameter | Sim. Value |
|---|---|---|
| $R_c$ | Macrocell Radius | 1000 m |
| $R_f$ | Femtocell Radius | 30 m |
| $f_c$ | Carrier Frequency | 2000 MHz |
| $P_c$ | Max. Transmission Power at macrocell | 43 dBm |
| $P_c$ | Max. Transmission Power at femtocell | 23 dBm |
| $\beta$ | Target SIR | 5 dB |
| $\epsilon$ | QoS requirement | 0.1 |
| $P_{dB}$ | Partition Loss | 10 dB |
| $\alpha_c$ | Outdoor path-loss exponent | 4 |
| $\alpha_{fo}$ | Indoor to Outdoor path-loss exponent | 4 |
| $\alpha_{fi}$ | Indoor path-loss exponent | 3 |

FIG. 28

INTERFERENCE MANAGEMENT AND DECENTRALIZED CHANNEL ACCESS SCHEMES IN HOTSPOT-AIDED CELLULAR NETWORKS

This application is a continuation of U.S. patent application Ser. No. 12/621,781, filed Nov. 19, 2009, entitled "Interference Management and Decentralized Channel Access Schemes in Hotspot-Aided Cellular Networks," and claims benefit of and priority to U.S. Provisional Patent Application Ser. No. 61/116,531, filed Nov. 20, 2008, which are each fully incorporated herein by reference, and made a part hereof.

FIELD

Embodiments of the present methods and system are generally directed toward cellular wireless networks. More specifically, embodiments of the invention are directed toward two-tier cellular networks consisting of a typical macrocell overlaid or underlaid with supplemental infrastructure that has a shorter range than the macrocell base station, and, in particular, toward reducing interference and efficiently accommodating multiple users in these two-tier cellular networks.

BACKGROUND

Wireless communication systems are constantly being pushed to accommodate the conflicting goals of higher data rates per user, and improved coverage area. A primary way to meet both of these desirable goals is by deploying more infrastructures (connected into the wired backbone, and eventually the PSTN and/or Internet). This infrastructure is generally quite expensive, in particular the base stations that comprise most of the infrastructure in cellular networks.

Two-tier networks, comprising a conventional cellular network overlaid with shorter range hotspots (e.g. femtocells, distributed antennas, or wired relays), offer an economically viable way to improve cellular system capacity. Femtocells are recently attracting interest for increasing overall system capacity and coverage, particularly for subscribers who are at home or in another common location. Femtocells are small virtual base stations that are usually deployed by the end user (perhaps with subsidy or logistical help from the service provider). This can result in a win-win: the subscriber gets high speed, reliable access at their most common locations (many subscribers currently complain about their service experience at home), and the service provider unloads considerable traffic off their expensive large-scale network. Because this results in two spatially overlaid networks (Base Stations being tier 1 and femtocells being tier 2), the composite network is often referred to as a "two-tier" network.

Femtocells, also known as home base stations (BTSs) or access point base stations, can connect to a service provider's network via a broadband backhaul connection (such as digital subscriber lines (DSL), cable, or even a radio link). Femtocells can allow service providers to extend service coverage indoors, where access would otherwise be limited or unavailable. Femtocells can incorporate the functionality of a typical base station while allowing for a simpler, self contained deployment.

However, interference between femtocells and macrocells in such networks can be a capacity-limiting factor if the femtocells and macrocells share the same spectrum. The cross-tier interference between macrocells and femtocells can suffocate the capacity due to the near-far problem, so in practice hotspots would typically want to use a different frequency channel than the potentially nearby high-power macrocell users. Centralized or coordinated frequency planning, which is difficult and inefficient, even in conventional cellular networks, is even more difficult, in a two-tier network. Alternatively, using expensive wireless spectrum, to coordinate between the cellular network and hotspots may be self-defeating as it, undermines the principle argument low capital and operating expenditures—for deploying femtocells in the first place.

On the other hand, femtocells and other types of supplemental infrastructure are likely to be deployed either randomly by users of the cellular network, or on an as-needed basis by the sendee provider. Allocating dedicated spectrum just for these devices and the mobile stations (MSs) interacting with them is highly undesirable since they may be sparse in many areas, rolled out slowly, and the demands on the available spectrum are intense, which is largely what motivates these hotspots in the first place. Therefore, methods and techniques that achieve frequency reuse between the two tiers are highly desirable.

In a shared spectrum two-tier network, near-far effects arising from cross-tier inference can create problems due to conventional signal strength based power control and can be particularly severe in a "closed access" deployment, where a femtocell allows only licensed subscribers to communicate with it. The worst-case scenario arises either when a high powered macrocell user on the cell edge causes interference to nearby femtocells, or when cell interior femtocell users [resp. femtocell BSs] create unacceptable interference to the macrocell base station [resp. nearby cellular users].

SUMMARY

Wireless operators are in the process of augmenting the macrocellular network with supplemental infrastructure such as microcells, distributed antennas and relays. An alternative with lower upfront costs is to improve indoor coverage and capacity using the concept of end-consumer installed femtocells or home base stations. A femtocell can serve as a lower power, short range data, access point that provides high quality in-building coverage to home users, while backhauling their traffic over the IP network. The femtocell radio range can be much smaller than the macrocell radius. Users transmitting to femtocells can experience superior indoor signal reception and can lower their transmit power, thus prolonging battery life. The implication is that femtocells can provide higher spatial reuse and cause less cochannel interference (CCI) to other users.

As noted above, however, in a shared spectrum two-tier network, near-far effects arising from cross-tier interference can create problems due to conventional signal strength based power control and can be particularly severe in a "closed access" deployment, where a femtocell allows only licensed subscribers to communicate with it. Embodiments of the present invention provide solutions to tackle cross-tier interference in such a network—with two sets of users with dramatically uneven channel powers in their BSs—including: (1) enabling femtocell users to decrease their target data rates or employ adaptive power strategies such as decreasing their target data rate in the presence of a nearby cellular user, (2) employing interference avoidance through "time-hopping" (or frequency hopping) for both macrocell and femtocell users in order to "avoid" transmitting in the same time (frequency) interval, (3) requiring femtocells to perform "open-access" through vertical handoffs by servicing outdoor cellular users with poor channel powers to their central macrocell, (4) eliminating cross-tier interference by assigning macrocell and femtocell users with orthogonal frequency resources using a spectrum partitioning strategy, (5) providing multiple transmit antennas at femtocells and utilizing the extra spatial degrees of freedom to eliminate interference to cellular users (through beamforming techniques) and tackling cross-tier interference from the macrocell, and/or (5) utilizing techniques for handoffs (in open access) and adaptive power control at femtocells (in closed access) when multiple antennas are used at femtocells.

In particular, according to one aspect, a system is provided that comprises one or more femtocell base stations deployed within a range of a cellular base station, wherein the cellular base station utilizes a frequency band and respective femtocell base stations utilize a frequency band that is substantially the same as as the cellular base station frequency band. In one embodiment, each femtocell base station is configured to employ one or more interference avoidance techniques such that coexistence between the cellular base station and the corresponding femtocell base station is enabled. According to embodiments described herein, the interference avoidance techniques employed may include use of randomized time or frequency hopping when transmitting signals to and from one or more femtocell users, randomly selecting a predetermined number of available frequency subchannels for transmitting signals to and from the femtocell users, identifying one or more unutilized frequency subchannels for transmitting signals to and from the femtocell users, using two or more transmit and two or more receive antennas, nulling one or more transmissions in a direction of a nearby cellular base station user, handing off at least one user associated with the cellular base station to one of the femtocell base stations and vice versa 'and/or reducing the transmission power of at least one of the femtocell base stations.

According to another aspect, a method of operating one or more femtocell base stations in conjunction with a cellular base station is provided. In one embodiment, the method may include: (1) establishing one or more femtocell base stations within a range of a cellular base station, wherein the cellular base station utilizes a frequency band and wherein respective femtocell base stations utilize a frequency band that is substantially the same as the cellular base station frequency band; and (2) employing, by respective femtocell base stations, one or more interference avoidance techniques such that coexistence between the cellular base station and the corresponding femtocell base station is enabled. According to embodiments described herein the interference avoidance techniques may include any one or more of the techniques mentioned above and described in more detail below.

Additional advantages will be set forth in part in the description which follows or may be learned by practice. The advantages will be realized and attained by means of the elements and combinations particularly pointed out in the appended claims. It is to be understood that both the foregoing general description and the following detailed description are examples and explanatory only and are not restrictive, as claimed.

BRIEF DESCRIPTION OF THE DRAWINGS

The accompanying drawings, not drawn to scale, which are incorporated in and constitute a part of this specification, illustrate embodiments and together with the description, serve to explain the principles of the methods and systems:

FIG. 5 illustrates a table of system parameters;

FIG. 23 illustrates another table of system parameters;

FIG. 28 illustrates system parameters;

DETAILED DESCRIPTION

Figure 1:
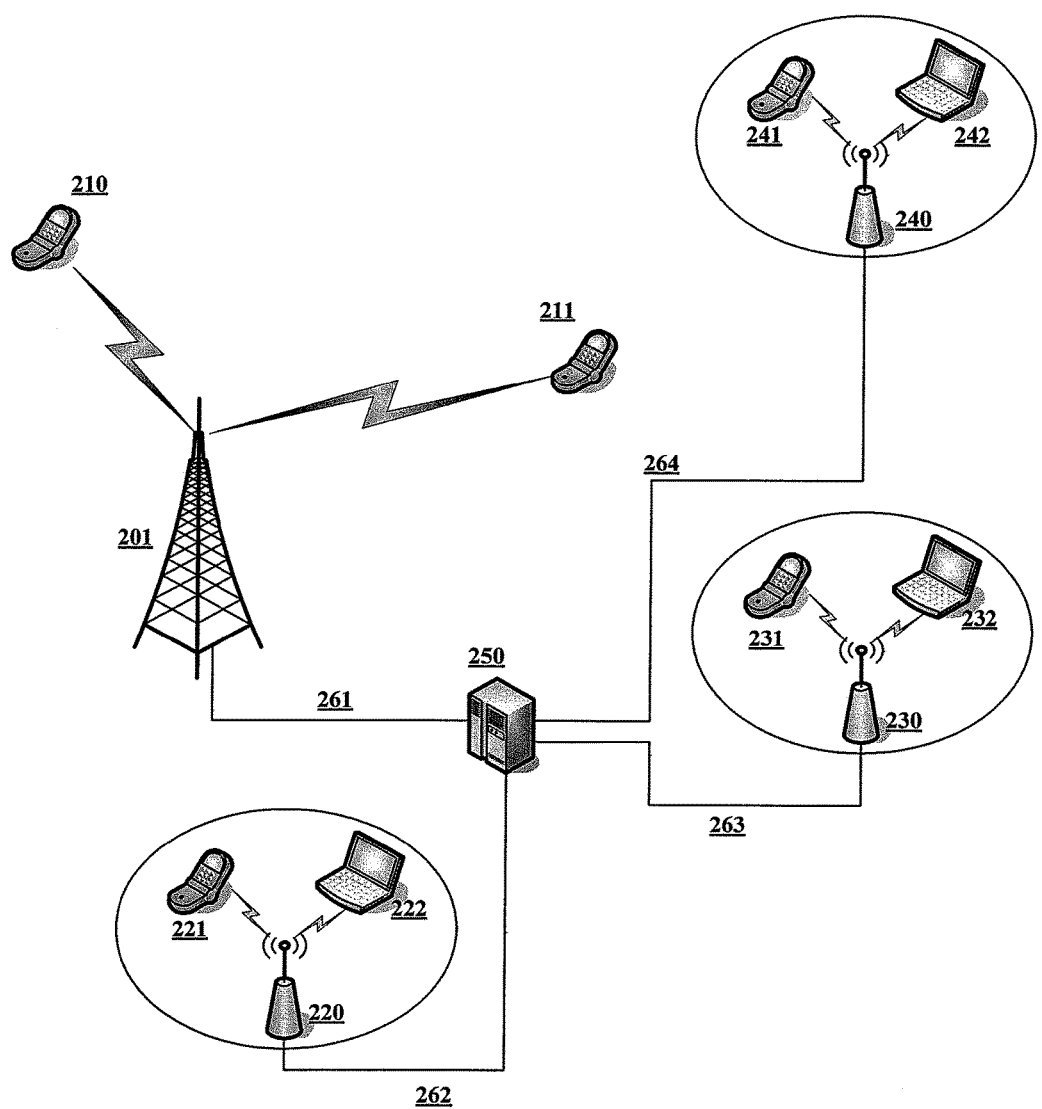
FIG. 1 illustrates an example of a cellular system with macrocells and femtocells.

Before embodiments of the present methods and systems are disclosed and described, it is to be understood that the methods and systems are not limited to specific methods, specific components, specific systems or to particular compositions. It is also to be understood that the terminology used herein is for the purpose of describing particular embodiments only and is not intended to be limiting.

As used in the specification and the appended claims, the singular forms "a", "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent, "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

"Exemplary" means "an example of" and is not intended to convey a meaning of an ideal or preferred embodiment. Further, the phrase "such as" as used herein is nor intended to be restrictive in any sense, but is merely explanatory and is used to indicate that the recited items are just examples of what is covered by that provision. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

Embodiments of the present methods and systems in ay be understood more readily by reference to the following detailed description of embodiments and the examples included therein and to the figures and their previous and following description.

Overview

In general, embodiments of the present invention provide an improvement over the known prior art by providing, among other things, several techniques for reducing or managing the interference associated with two-tier cellular networks consisting of a central macrocell and one or more femtocells, or other similar supplemental infrastructure. Further, embodiments of the present invention are practically implementable in two-tier networks irrespective of whether they employ a "closed-access" scheme (i.e., wherein each femtocell provides service to a few licensed privileged in-home users), or an "open-access" scheme (i.e., wherein a cellular user experiencing a poor channel to its macrocell may perform vertical handoff and receive service from a nearby femtocell).

Where Underlay operation (universal frequency reuse) is employed, in one embodiment of the invention, co-channel interference between the outdoor cellular macrocell transmissions and indoor femtocell transmissions may be reduced by employing directional antennas at each femtocell. Directional femtocell antennas may reduce the geographic region within which a femtocell user "sees" cross-tier interference from cellular users. In another embodiment of the invention, a randomized time-hopped (TH) or frequency hopped (FH) transmission strategy in each tier can be used to reduce interference. Since TH uses randomized channel access, the probability that a cellular user and a femtocell user accessing a common frequency resource at the same time instant may be significantly reduced. Additionally, a TH strategy can be augmented with additional interference suppression in the form of code-division-multiple-access (CDMA) to further reduce co-channel interference. Similarly, a FH-CDMA strategy may divide a given region of spectrum into multiple subchannels. Randomized frequency sub channel access by cellular [resp. indoor femtocell] users may significantly reduce the probability of collision—and hence cross-tier interference caused by simultaneous cellular and femtocell transmissions—in the same subchannel.

With Overlay operation (when macrocell and femtocells operate in separate regions of the spectrum) in a two-tier network with frequency division multiple access (FDMA) transmission, in one embodiment of the invention, spectrum allocation or partitioning can be employed. Spectrum partitioning can provide an efficient method for allocating spectrum between tiers by taking into account the loading of users at each tier. As users move between the macrocell (cellular) network to the femtocell network and vice versa, the methods and systems can dynamically load balance spectrum by varying allocated spectrum between the microcell and femtocell networks. In another embodiment of the invention, Frequency-ALOHA (distinguishable from the conventional ALOHA, which refers to transmissions conducted in the time domain) can be employed. By taking into account the means number of femtocells at each cell-site, the terrestrial propagation parameters, such as path-loss exponents and wall partition losses, and the characteristics of wireless channels, the yield in the optimal portion of spectrum which can be accessed by each femtocell to order to maximize the spatial reuse of spectrum among co-channel femtocells can be determined. In yet another embodiment of the invention, carrier sensed spectrum access can be employed to enable a femtocell to opportunistically detect and transmit over unutilized subchannels in order to avoid interfering with nearby femtocells.

Yet another embodiment of the invention proposes use of multiple antennas—also called Multiple-Input-Multiple-Output (MIMO) transmission—at the central macrocell/femtocells. MIMO can provide extra degrees of freedom (spatial diversity) to combat cross-tier interference in a two-tier network with universal frequency reuse. Specifically, using multiple antennas may enable a femtocell to (a) eliminate cross-tier interference to nearby cellular users in a closed-access system by nulling their beams in the direction of a nearby cellular user, (b) handoff nearby cellular users and boost their signal strength through array processing, (c) utilize the extra spatial degrees of freedom to eliminate interference to cellular users (through beamforming techniques) and tackle cross-tier interference from the macrocell and/or (d) use techniques for handoffs (in open access) and adaptive power control at femtocells (in closed access).

Overall System & Femtocell Base Station

FIG. 1 is a simplified illustration of a two-tier cellular system according to one embodiment of the present invention. As shown, a macrocell 201 is a cell in a cellular network that provides radio coverage serve by a power cellular base station 201 (tower) to one or more wireless devices 201, 211 (e.g., cellular telephones, personal digital assistants (PDAs), laptops, etc.). Each cell within the cellular network typically employs a standardized method for each distributed station to distinguish the signal emanating from its own transmitter from the signals received from other transmitters. Two standards known to those of ordinary skill in the art, are frequency division multiple access (FDMA) and code division multiple access (CDMA). FDMA uses a channel access method in multiple-access protocols as a channelization protocol. FDMA can give users an individual allocation of one or several frequency bands, allowing them to utilize the allocated radio spectrum without interfering with each other. CDMA employs spread-spectrum technology and a special coding scheme (where each transmitter is assigned a code) that can allow multiple users to be multiplexed over the same physical channel.

Macrocells generally provide the widest geographic area coverage. However, some locations at the boundaries of an individual macrocell's geographic area of a plurality of macrocells of within the boundaries (such as inside a home or business) can suffer from low signal strength. To improve coverage at these locations, femtocells 220, 230, 240 can be deployed. Femtocells 220, 230, 240, sometimes referred to as access point, base stations, can be small cellular base stations designed for use in residential or small business environments. Each femtocell may provide coverage to one or more wireless devices 221, 222, 231, 232, 241, 242. Femtocells can connect to a service provider's network 250 via a broadband backhaul connection 262, 263, 264 (such as DSL, cable or radio link). A femtocell can allow service providers to extend service coverage indoors, where access would otherwise be limited or unavailable. Femtocells can incorporate the functionality of a typical base station with a simpler, self contained deployment. However, because femtocells use the same transmission frequencies as macrocells, interference can occur.

Figure 2:
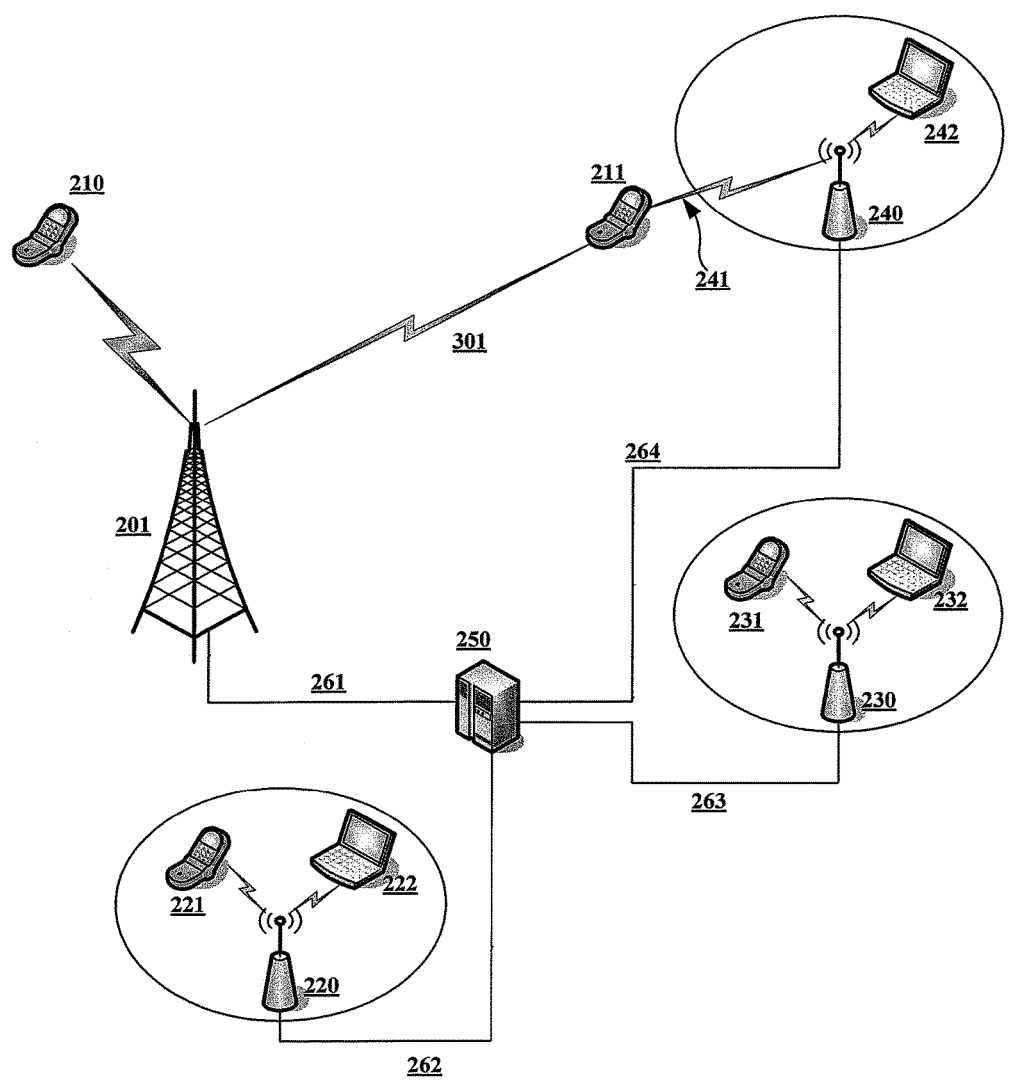
FIG. 2 illustrates potential interference between macrocell and femtocell transmissions.

FIG. 2 is a simplified illustration of when interference can occur. If femtocell 240 and macrocell 201 are using the same frequencies, as a user 211 travels to the boundary of a macrocell 201 the signal 301 from macrocell 201 and the signal 241 from femtocell 240 can interfere with each other, causing problems with communication with both macrocell 201 and femtocell 240. Similarly, while not specifically shown, interference may occur from macrocell 201 at femtocell 220, which is very close to central macrocell 201) or 230, affecting users 221, 222, 231 and 232.

As discussed below, according to embodiments of the present invention, each femtocell may be configured to manage/reduce this type of interference using one or more interference avoidance techniques. Accordingly, each femtocell may comprise, among other things, a processor configured to perform the interference management techniques described herein and/or memory storing an application which, when executed, causes the processor to perform some combination of those techniques.

Figure 3:
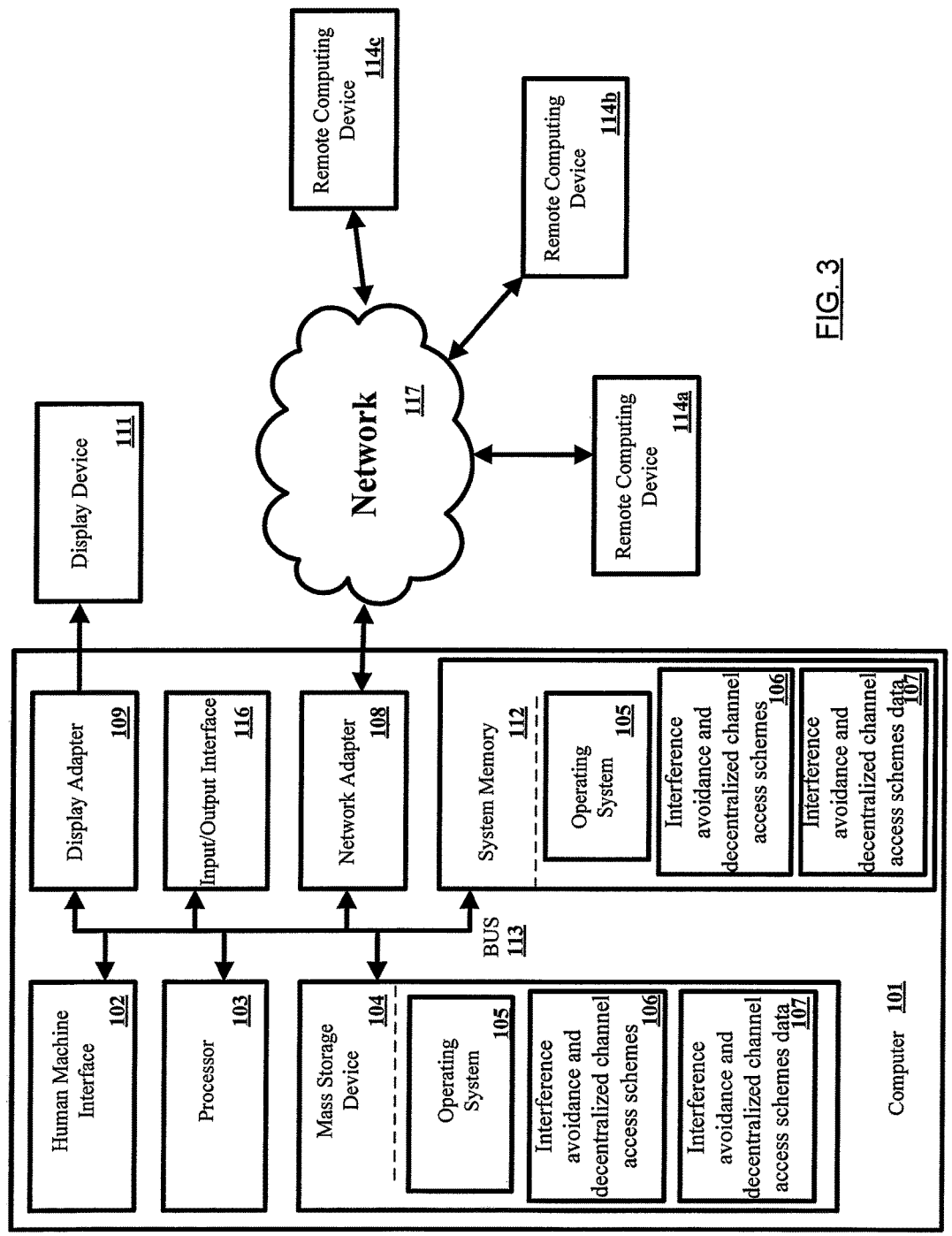
FIG. 3 illustrates an exemplary operating environment for performing the methods of embodiments of the present invention.
Figure 13:
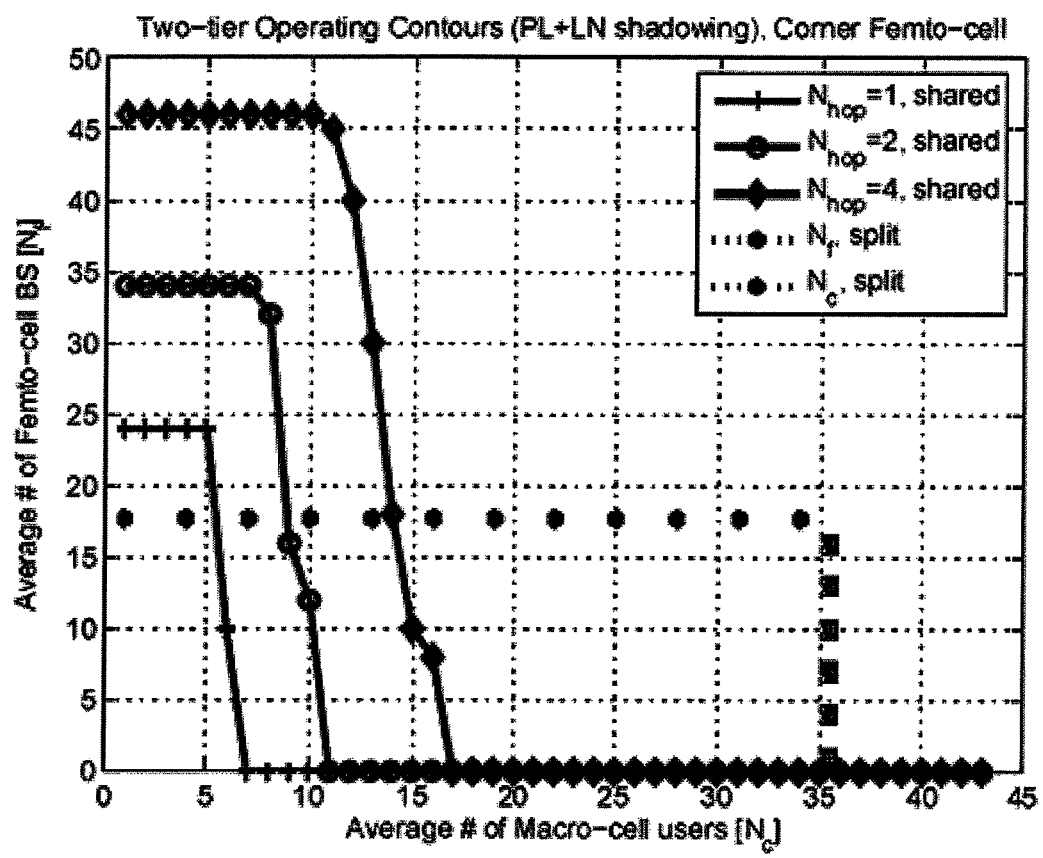
FIG. 13 illustrates network OCs with different hopping slots and corner femtocell reference.

According to one embodiment, the femtocell base station may comprise a computer 101 like the one shown in FIG. 3. Referring to FIG. 3, one skilled in the art will appreciate that provided herein is a functional description, and that respective functions can be performed by software, hardware, or a combination of software and hardware associated with the femtocell base station. A unit can be software, hardware, or a combination of software and hardware operably connected to a base station. The units can comprise interference avoidance and decentralized channel access schemes software 104 as illustrated in FIG. 13 and described below.

FIG. 3 is a block diagram illustrating an exemplary operating environment for performing the disclosed method. The exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

Embodiments of the present methods and systems can be operational with numerous other general purpose or special purpose computing system environments or configurations. Examples of well known computing systems, environments, and/or configurations that can be suitable for use with the system and method comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed system and methods can be described in the general context of computer—executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further one skilled in the art will appreciate that the system and method disclosed herein can be implemented via a general—purpose computing device in the form of a computer 101. The components of the computer 101 can comprise, but are not limited to, one or more processors or processing units 103, a system memory 112, and a system bar 113 that couples various system components including the processor 103 to the system memory 112. The processor 103 can contain non-identical multiple cores. Such a processor 103 is referred to as a heterogeneous multi-core processor. In the case of multiple processing units 103, the system can utilize parallel computing.

The system bus 10 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnects (PCI) bus, a PCI-Express bus, a Personal Computer Memory Card Industry Association (PCMCIA) bus, Universal Serial Bus (USB) and the like. The bus 113, and all busses specified in this description can also be implemented over a wired or wireless network connection and each of the subsystems, including the processor 103, a mass storage device 104, an operating system 105, interference avoidance and decentralized channel recess schemes software 106, interference avoidance and decentralized channel access schemes data 107, a network adapter 108, system memory 112, an Input/Output Interface 116, a display adapter 109, a display device 111, and a human machine interface 102, can be contained within one or more remote computing devices 114a,b,c at physically separate locations, connected through bases of this form, in effect implementing a fully distributed system.

The computer 101 typically comprises a variety of computer readable media. Exemplary readable media can be any available media that is accessible by the computer 101 and comprises, for example and not meant to be limiting, both volatile and non-volatile media, removable and non-removable media. The system memory 112 comprises computer readable media in the form of volatile memory, such as random access memory (RAM), and/or non-volatile memory, such as read only memory (ROM). The system memory 112 typically contains data such as interference avoidance and decentralized channel access schemes data 107 and/or program modules such as operating system 105 and interference avoidance and decentralized channel access schemes software 106 that are immediately accessible to and/or are presently operated on by the processing unit 103.

In another aspect, the computer 101 can also comprise other removable/non-removable, volatile/non-volatile computer storage media. By way of example, FIG. 3 illustrates a mass storage device 104 which can provide non-volatile storage of computer code, computer readable instructions, data structures, program modules, and other data for the computer 101. For example and not means to be limiting, a mass storage device 104 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored in the mass storage device 104, including by way of example, an operating system 105 and interference avoidance and decentralized channel access schemes software 106. Each of the operating system 105 and interference avoidance and decentralized channel access schemes software 106 (or some combination thereof) can comprise elements of the programming. Interference avoidance and decentralized channel access schemes data 107 can also be stored on the mass storage device 104. Interference avoidance and decentralized channel access schemes data 107 can be stored in arty of one or mote databases known in the art. Examples of such databases compose, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 101 via an input device (not shown). Examples of such input devices comprise, but are not limited to, a keyboard, pointing device (e.g., a "mouse"), a microphone, a joystick, a scanner, tactile input devices such as gloves, and other body coverings, and the like Those and other input devices can be connected to the processing emit 103 via a human machine interface 102 that is copied to the system bus 113, but can be connected by other interface and bus structures, such as a parallel port, game port, an IEEE 1394 Port (also known as Firewire port), a serial port, or a universal serial bus (USB).

In yet another aspect, a display device 111 can also be connected to the system bus 113 via an interface, such as a display adapter 109. It is contemplated that the computer 101 can have more than one display adapter 109 and the computer 101 can have more than one display device 111. For example, a display device can be a monitor, an LCD (Liquid Crystal Display), or a projector. In addition to the display device 111, other output peripheral devices can comprise components such as speakers (not shown) and a printer (not shown) which can be connected to the computer 101 via Input/Output Interface 116. Any step and/or result of the methods can be output in any form to an output device. Such output can be any form of visual representation, including, but not limited to, textual, graphical, animation, audio, tactile, and the like.

The computer 101 can operate in a networked environment using logical connections to one or more remote computing devices 114a, b, c. By way of example, a remote computing device can be a personal computer, portable computer, a server, a router, a network computer, a peer device or other common network node, and so on. Logical connections between the computer 101 and a remote computing device 114a, b, c can be made via a local area network (LAN) and a general wide area network (WAN). Such network connections can be through a network adapter 108. A network adapter 108 can be implemented in both wired and wireless environments. Such networking environments are conventional and commonplace in offices, enterprise-wide computer networks, intranets, and the Internet 117.

For purposes of illustration, application programs and other executable program components such as the operating system 105 are illustrated herein as discrete blocks, although it is recognized that such programs and components reside at various times in different storage components of the computing device 101, and are executed by the data processor(s) of the computer. An implementation of interference avoidance and decentralized channel access schemes software 106 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any method or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert interference rules generated through a neural network or production rules from statistical learning).

Computer processor are often designed with multiple processor cores. A plurality of computer programs may run on a computer and an operating system on the computer can be tasked with determining which program runs on which core. In one embodiment of the methods and systems a mathematical system that analyzes programs to determine which core they should be assigned to. The mathematical system, referred to as a fuzzy system or fuzzy logic, can be utilized to determine a desired assignment of applications to cores.

Techniques for Reducing Interference in CDMA Cellular Network

According to embodiments of the present invention, in a two-tier network with universal frequency reuse, such as a two-tier network employing code division multiple access (CDMA) transmission (e.g., IS-95, CDMA2000, UMTS, etc.), several techniques may be used to enable femtocells to eliminate interference from conventional signal-strength based cellular power control. In particular, according to one embodiment, directional antennas at the femtocells may be used. As one of ordinary skill in the art can recognize, directional antennas refer to antennas which radiate greater power in one or more directions allowing for increased performance on transmit and receive, and reduced interference from unwanted sources.

While using directional antennas at the macrocell base station level may be known to those of ordinary skill in the art, this embodiment of the invention utilizes directional antennas at the femtocell base station level. Additionally, by using directional antennas at the femtocell level, the cross-tier cochannel interference (CCI) caused by nearby macrocellular users which can lead to outage performance over the femtocell uplink can be reduced.

Providing directional antennas may benefit indoor femtocell users by restricting the region within which they experience interference from co-channel outdoor cellular transmissions. In addition, there may be zero associated protocol overhead.

According to another embodiment, randomized time-hopping may be used. In general, in time-hopped CDMA, the CDMA duration $G \cdot T_c$ where G can be the processing gain and $T_c$ can be the chip period, can be divided into $N_{hop}$ hopping slots, where each user can randomly select a hopping slot for transmission and remain silent during the remaining slots.

According to embodiments of the present invention, use of randomized time-hopping may enable users to avoid rather than suppress mutual interference in a decentralized manner. Since time hopping uses randomized channel access, the probability that a cellular user and a femtocell user will access the common frequency resource as the same time instant may be significantly reduced. According to one embodiment, time hopping may be augmented with additional interference suppression in the form of CDMA to further reduce co-channel interference.

According to yet another embodiment, frequency hopping may be used. In particular, according to one embodiment, the femtocell may rapidly, and randomly, switch carriers among many frequency channels using a pseudorandom sequence known to both the transmitter and the receiver.

The following provides a more detailed description and analysis of the use of directional antennas and randomized time hopping in a two-tier network employing CDMA in order to reduce interference, in accordance with embodiments of the present invention.

1. System Model

Figure 4:
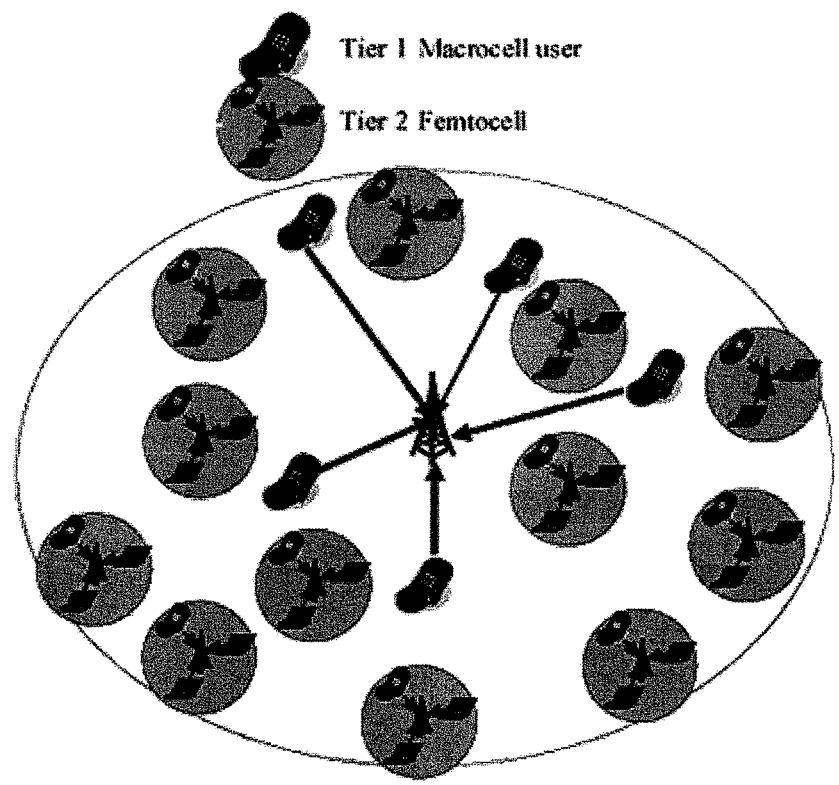
FIG. 4 illustrates a two-tier femtocell network with OS-CDMA transmissions.

Referring to FIG. 4, which illustrates a two-tier femtocell network with direct sequence (DS) CDMA, according to one embodiment, $H \subset R^2$ may be denoted as the interior of a reference hexagonal macrocell C of radius $R_e$. The tier 1 network can consist of low density macrocellular users that are communicating with the central base station in each cell site The macrocellular users are distributed on $R^2$ according to a homogeneous SPPP $\Omega_C$ of intensity $\lambda_c$. The overlaid tier 2 network containing the femtocell base stations forms a homogeneous SPPP $\Omega_f$ with intensity $\lambda_f$ (the system model allows a macrocellular user to be present inside a femtocell as the governing process $\Omega_c$ is homogeneous). Each femtocell hotspot includes a Poisson distributed population of actively transmitting users with mean $U_f$ in a circular coverage area of radius $R_f$, $R_f \ll R_c$ (a hard handoff may be assumed to allocate subscribed hotspot users to a femtocell, provided they fall within its radio range). To maximize user capacity per cell site, it may be desirable to have $\lambda_f \gg \lambda_c$; as will be shown, cross-tier CCI at a macrocell base station limits $\lambda_f$ for a given $\lambda_c$. Defining $|H| \triangleq 2.6 R_c^2$ as the area of the hexagonal region H, the mean number of macrocell users and femtocell base station's per cell site are given as $N_c = \lambda_c \cdot |H|$ and $N_f = \lambda_f \cdot |H|$ respectively. FIG. 5 shows an exemplary summary of system parameters and typical values for them, which are used later in numerical simulations.

According to the embodiments described herein, users in each tier employ DS-CDMA with processing gain G. Uplink power control adjusts for propagation losses and log-normal shadowing, which is standard in contemporary CDMA networks. The macrocell and femtocell receive powers as denoted as $P_r^c$ and $P_r^f$ respectively. Any power control errors and short-term fading effects are ignored for analytical convenience. Thus assumption has been affirmed as reasonable, especially in a wideband system with significant frequency diversity and robust reception (through RAKE receiver, coding and interleaving).

A. TH-CDMA and Antenna Sectoring

In one embodiment, suppose that the CDMA period $T = C \cdot T_C$ is divided into $N_{hop}$ hopping slots, each of duration $T/N_{hop}$. Macrocell user and femtocells users (active users within a femtocell may transmit in the same hopping slot) can independently choose to transmit over any one slot, and remain silent over the remaining $N_{hop}-1$ slots. The resulting intra-tier and cross-tier interference can be "thinned" by a factor of $N_{hop}$. Using Time Hopping—CDMA (TH-CDMA), users in each tier can effectively sacrifice a factor $N_{hop}$ of their processing gain, but benefit by thinning the interfering field by the same factor.

Figure 6:
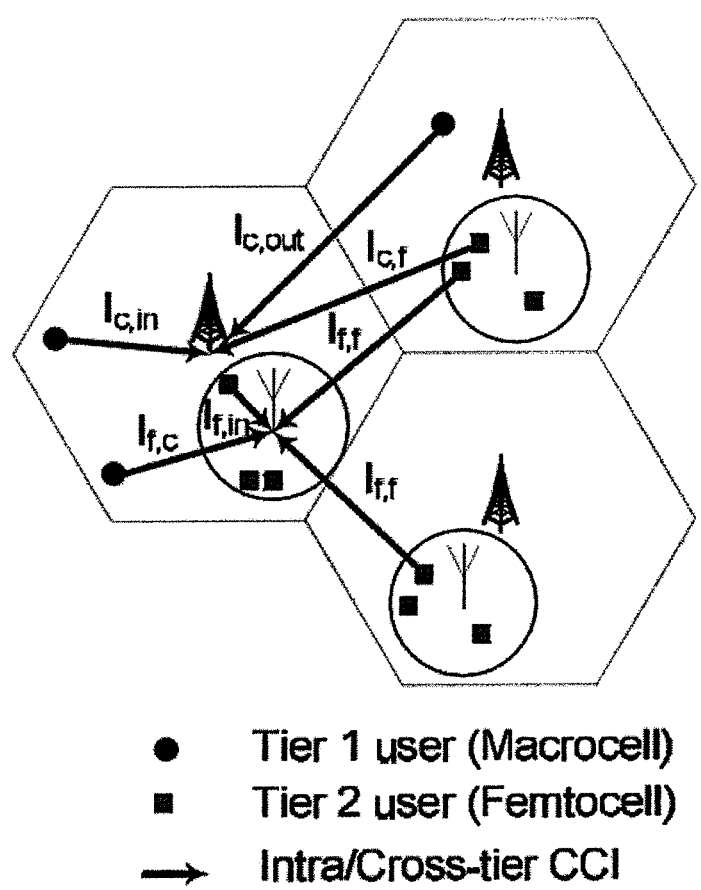
FIG. 6 illustrates intra-tier and cross-tier co-channel interference (CCI) at each tier.

Referring to FIG. 6, which illustrates intra-tier and cross-tier CCI at each tier and in which the arrows denote the CCI arising from either tier 1 (i.e., the macrocell) or tier 2 (i.e., the femtocell), assume sectored antenna reception in both the macrocell and femtocell base station, with antenna alignment angle θ and sector width equaling $2\pi/N_{sec}$. While antenna sectoring is a common feature at the macrocell BS in practical cellular systems, embodiments of the present invention use sectored antennas at femtocell BS's as well. One reasons is that the cross-tier CCI caused by nearby macrocellular users can lead to unacceptable outage performance over the femtocell uplink; this may motivate the need for directed femtocell antennas. The spatial thinning effect of TH-CDMA transmission and antenna sectoring may be derived in the following lemma.

Lemma 1 (Spatial thinning by interference avoidance): With TH-CDMA transmission over $N_{hop}$ slots and antenna sectoring with $N_{sec}$ directed base station antennas in each tier, the interfering field at a given base station antenna sector can be mapped to the Spatial Poisson Point Process (SPPP) $\Phi_C$ and $\Phi_f$ on $\mathbb{R}^2$ with intensities $\eta_c = \lambda_C/(N_{hop} \cdot N_{sec})$ and $\eta_f = \lambda_f(1-e^{-U_f})/(N_{hop} \cdot N_{sec})$ respectively. The SPPP is a natural model arising from mobility of macrocellular users and placement of femtocell bas station in densely populated areas, and has been confirmed in empirical studies and used by those of ordinary skill in the art.

The following definitions may be useful.

Definition 1: Denote $\mathcal{H}_{sec} \subseteq \mathcal{H}$ as the region within $\mathcal{H}$ covered by a base station antenna sector corresponding to a macrocell base station or a femtocell base station within the reference cellsite. For example $\mathcal{H}_{sec} = \mathcal{H}$ for an omnidirectional femtocell located at the corner of the reference macrocell.

Definition 2: Denote $\hat{\Omega}_C$ and $\hat{\Omega}_f$ as the heterogeneous SPPPs composed of active macrocell and femtocell interferers as seen at a base station antenna sector in each tier, whose intensities are given by $\hat{\lambda}_C$ and $\hat{\lambda}_f$. Denote the equivalent mapped homogeneous SPPPs over $\mathbb{R}^2$, $\Phi_C$ and $\Phi_f$ whose intensities are given by $\eta_C$ and $\eta_f$ respectively.

Definition 3: Denote the restriction of $\hat{\Omega}_C$ and $\hat{\Omega}_f$ to $\mathcal{H}$ by the SPPPs $\pi_C$, $\pi_f$ respectively.

B. Channel Model & Interference

In an embodiment of the invention, the channel can be represented as a combination of path-loss and log-normal shadowing. The path-loss exponents are denoted by $\alpha$ (outdoor transmission) and $\beta$ (indoor femtocell transmission) while lognormal shadowing can be parameterized by its standard deviation $\sigma_{dB}$.

Through uplink power control, a macrocell user transmitting at a random position X with respect to the reference macrocell base station C can choose a transmit power level $P_t^c = P_r^c 1 g_c(|X|)$. Here $g_c(|X|)$ can be the attenuation function defined as $g_c(|X|) = K_c(d_{0c}/|X|)^\alpha \Theta_C$ where $10 \log_{10} \Theta_C \sim N(0, \sigma_{dB}^2)$ is the log-normal shadowing from user to C. $K_c \triangleq [c/(4\pi f_c d_{0c})]^2$ can be a unitless constant that depends on the wavelength of the RF carrier $c/f_c$ and outdoor reference distance $d_{0c}$. Similarly, a femtocell user at a random position Y within a femtocell base station F chooses a transmit power $P_t^f = P_r^f/g_f(|Y|)$, where $g_f(|Y|) = K_f(d_{0f}/|Y|)^\beta \Theta_F$, $10 \log_{10} \Theta_f \sim N(0, \sigma_{dB}^2)$ and $K_f \triangleq [c/(4\pi f_c d_{0f})]^2$. Here $d_{0f}$ is the reference distance for calculating the indoor propagation loss. Note that $K_c$ and $K_f$ can be empirically determined. The interference in each tier (FIG. 6) can be grouped as:

Macrocell interference at a macrocell base station ($I_{c,in}$, $I_{c,out}$): Through power control, all macro-cell users within $\mathcal{H}_{sec}$, can be received with constant power $P_r^c$, so the in-cell interference equals $(N-1) \cdot P_r^c$, where $N \sim \text{Poisson}(N_u/N_{hop})$. As such, inferring the exact statistics of out-of-cell macrocellular interference $I_{c,out}$ is analytically intractable. It can be assumed that $I_{c,out}$ can be distributed according to a scaled Gaussian pdf. Defining $\mu$ and $\sigma^2$ to be the empirically determined parameters of the Gaussian, the pdf of $I_{c,out}$ can be given as $$f_{I_{c,out}}(y) = \frac{2e^{-\frac{1}{2}(y-\mu)^2/\sigma^2}}{\sqrt{2\pi\sigma^2}\left[2 - \text{erfc}\left(\frac{\mu}{\sqrt{2}\sigma}\right)\right]},$$

where $$\text{erfc}(t) \triangleq \sqrt{\frac{2}{\pi}} \int_{t\sqrt{2}}^{\infty} e^{-x^2/2} dx.$$

Femtocell interference at a macrocell base station ($I_{c,f}$): In an embodiment of the invention, femtocell $F_i$ with $U_i \sim \text{Poisson}(U_f)$ users can be located at random position $X_i$ with respect to reference macrocell base station C. Inside $F_i$, a randomly placed Tier 2 user j at distance $Y_j$ from the femtocell base station can transmit with power $P_i^f(j) = P_r^f/g_f(Y_j)$. The interference caused at C from user j inside $F_i$ can be given as:

$$I_{c,f}(F_i,j) = P_i^f g_c(|X_i + Y_j|)/g_f(|Y_j|) \approx P_r^f g_c(|X_i|)/g_f(R_f) = Q_f \Theta_{j,C}/\Theta_{j,F_i}|X_i|^{-\alpha}. \quad (1)$$

Where $$Q_f \triangleq P_r^f R_f^\beta \frac{K_c d_{0c}^\alpha}{K_f d_{0f}^\beta}.$$

In doing so, two assumptions can be made:

Assumption 1: For small sized femtocells ($R_f \ll R_c$), a femtocell or macrocell BS can see CCI from other femtocells as a point source of interference, implying $g_c(|X_i + Y_j|) \approx g_c(|X_i|)$.

Assumption 2: When analyzing the interference caused by a random femtocell $F_i$ at any other location, the $U_i$ femtocell users can be modeled as transmitting with maximum power, so that $g_f(|Y_j|) \approx g_f(R_f)$. This can be for analytical tractability and modeling worst-case interference. Summing equation (1) over all femtocells over an antenna sector at a macrocell base station, the cumulative cross-tier CCI at the reference macrocell base station C can be represented by the Poisson SNP, $$I_{c,f} = \sum_{F_i \in \hat{\Omega}_f} Q_f \Psi_i |X_i|^{-\alpha} \quad (2)$$

where $$\Psi_i \triangleq \sum_{l=1}^{U_i} \Theta_{l,C}/\Theta_{l,F_i}$$

can define the cumulative shadowing gain between actively transmitting users in femtocell $F_i$ and macrocell base station C.

Neighboring femtocell interference at a femtocell base station ($I_{f,f}$): By a similar argument as above, in another embodiment of the invention, the interference caused at a base station antenna sector of femtocell $F_j$ from other femtocells $F_i$, where $i \neq j$, can be a Poisson SNP given by $$I_{f,f} = \sum_{F_i \in \hat{\Omega}_f} Q_f \Psi_i |X_i|^{-\alpha},$$

where $|X_i|$ refers to the distance between ($F_i$, $F_j$) and $$\Psi_i \triangleq \sum_{l=1}^{U} \Theta_{l,F_j}/\Theta_{l,F_i}.$$

Interference from active users within a femtocell ($I_{f,in}$): In yet another embodiment, conditioned on the femtocell containing $U \geq 1$ actively transmitting users, the intra-tier CCI experienced by the user of interest arising from simultaneous transmissions within the femtocell can equal $$(U-1) \cdot P_r^f, E[U] = \frac{U_f}{1 - e^{-U_f}}.$$

Macrocell interference at a femtocell BS ($I_{fc}$): In another embodiment, outage probability at a femtocell base station $F_j$, located on the hexagonal axis, can be analyzed by considering the effect of in-cell macrocellular CCI. The interference $I_{fc}^{lb}$ arising from users in $\pi_c$ can form a lower bound on the cumulative tier 1 CCI $I_{fc}$ and represented as $$I_{f,c} \geq I_{f,c}^{lb} = \sum_{i \in \Pi_c} P_r^c \Psi_i \left(\frac{|X_i|}{|Y_i|}\right)^\alpha,$$

where $\Psi_i \triangleq \Theta_{i,F}/\Theta_{i,C}, 10 \log_{10} \Psi_i \sim N(0, 2\sigma_{dB}^2)$ can be the LN shadowing term and $|X_i|$, $|Y_i|$ can represent the distances of macrocell user i to the macrocell base station and femtocell base station respectively. Observe that a corner femtocell can experience a significantly higher macrocell CCI relative to an interior femtocell, therefore the cdf.. $F_{I_{fx}}(\cdot)$ may not be a stationary distribution.

II. Per Tier Outage Probability

In an embodiment of the invention, to derive the operating contours (OC), an uplink outage probability constraint can be formulated in each tier. $N_f$ and $N_c$ can be defined as the average number, of femtocell base stations and macrocell users per cellsite respectively. A user can experience outage if the received instantaneous Signal—to—Interference Ratio (SIR) over a transmission is below a threshold γ. Any feasible ($\tilde{N}_f$, $\tilde{N}_c$) can satisfy the outage probability requirements $\mathbb{P}_{out}^f \leq \epsilon$, $\mathbb{P}_{out}^c \leq \epsilon$ in each tier. The outage probabilities $\mathbb{P}_{out}^c(N_f, N_c)_{[resp. } \mathbb{P}_{out}^f(N_f, N_c)]$ can be defined as the probabilities that the despread narrowband SIR for a macrocell user [femtocell user] at the Tier 1 [Tier 2] base station antenna sector is below γ. Assuming the PN code cross—correlation equals $N_{hop}/G$ (with $N_{hop}=G=1$, the model reduces to a non CDMA narrowband transmission; with $N_{hop}=G \gg 1$, the model reduces to a time slotted ALOHA channel), define $$\mathbb{P}_{out}^c(N_f, N_c) = Pr\left(\frac{G/N_{hop}P_r^c}{I_{c,in} + I_{c,out} + I_{c,f}} \leq \gamma \,\Big|\, |\hat{\Omega}_c| \geq 1\right) \quad (3)$$

$$\mathbb{P}_{out}^f(N_f, N_c) = Pr\left(\frac{G/N_{hop}P_r^f}{(U-1) \cdot P_r^f + I_{f,f} + I_{f,c}} \leq \gamma \,\Big|\, U \geq 1\right)$$

where $|\hat{\Omega}_c|$ can denote the number of points in $\hat{\Omega}_c$ and the unconditioned $U \sim$ Poisson($U_f/N_{sec}$). The OCs for the macrocell [resp. femtocell] can be obtained by computing the highest $N_f[N_c]$ for a given $N_c[N_f]$, which satisfy a target outage constraint $\in$. More formally, $$\tilde{N}_f(N_c) = \sup\{N_f: \mathbb{P}_{out}^c(N_f,N_c) \leq \epsilon\}, \tilde{N}_c(N_f) = \sup\{N_c: \mathbb{P}_{out}^f(N_f,N_c) \leq \epsilon\}. \quad (4)$$

The OCs for the two-tier network can be obtained corresponding to those feasible combinations of ($\tilde{N}_c$, $\tilde{N}_f$) that simultaneously satisfy $\mathbb{P}_{out}^f \leq \epsilon$ and $\mathbb{P}_{out}^c \leq \epsilon$ respectively. In doing so, the following theorems can be derived which can quantify the outage probabilities and CCI statistics in each tier.

Theorem 1: For small femtocell sizes, the statistics of the cross-tier femtocell CCI $I_{c,f}$ (and intra-tier femtocell CCI $I_{f,f}$) at a base station antenna sector can be given by a Poisson SNP $Y = \sum_{i \in \Phi_f} Q_f \Psi_i |X_i|^{-\alpha}$ with iid $\Psi_i = \sum_{j=1}^{U_i} \Psi_{ij}$, 10 $\log_{10} \Psi_{ij} \sim N(0, \sigma_{dB}^2)$, $U_i \sim U|U \geq 1$ and $U \sim$ Poisson ($U_f$). In particular, if the outdoor path-loss exponent $\alpha=4$, then Y follows a Lévy-stable distribution with stability exponent ½, whose pdf and cdf can be given as:

$$f_Y(y) = \sqrt{\frac{\kappa_f}{\pi}} y^{-3/2} e^{-\kappa_f/y}. \quad (5)$$

$$F_Y(y) = \text{erfc}\left(\sqrt{\frac{\kappa_f}{y}}\right)$$

where $\kappa_f \triangleq \eta_f^2 \pi^3 Q_f (E[\Psi^{1/2}])^2/4$.

In an embodiment of the invention, increasing femtocell size ($R_f$) can increase the outage probabilities arising from the femtocell CCI $I_{f,f}$ and $I_{c,f}$ in a two-tier network. To elucidate this, observe that an increase in $R_f$ can cause $\kappa_f$ to increase by a factor $R_f^\beta$. By monotonicity of erfc(•), the cdf's $F_{I_{f,f}}(\bullet)$, $F_{I_{c,f}}(\bullet)$ can decrease as $\kappa_f$ increases, causing a higher outage probability per tier. Intuitively, a femtocell user located on the edge of a femtocell can cause excessive CCI at a nearby femtocell base station. The effect of the CCI can appear as a power control penalty factor in equation $R_f^\beta$ equation (5).

Tier 2 users within a femtocell can be assumed to jointly choose a hopping slot. Comparing this against an independent hopping protocol, where users within a femtocell are independently assigned a hopping slot. With independent hopping, the intensity of $\Phi_f$ can equal $$\vec{\eta}_f = \frac{\lambda_f}{N_{sec}} \cdot (1 - e^{-U_f/N_{hop}})$$

(note the difference of $\vec{\eta}_f$ from $\eta_f$ in Lemma 1) and the average number of interfering users in an actively transmitting femtocell can equal $$\frac{U_f/N_{hop}}{1 - e^{-U_f/N_{hop}}}.$$

Figure 7:
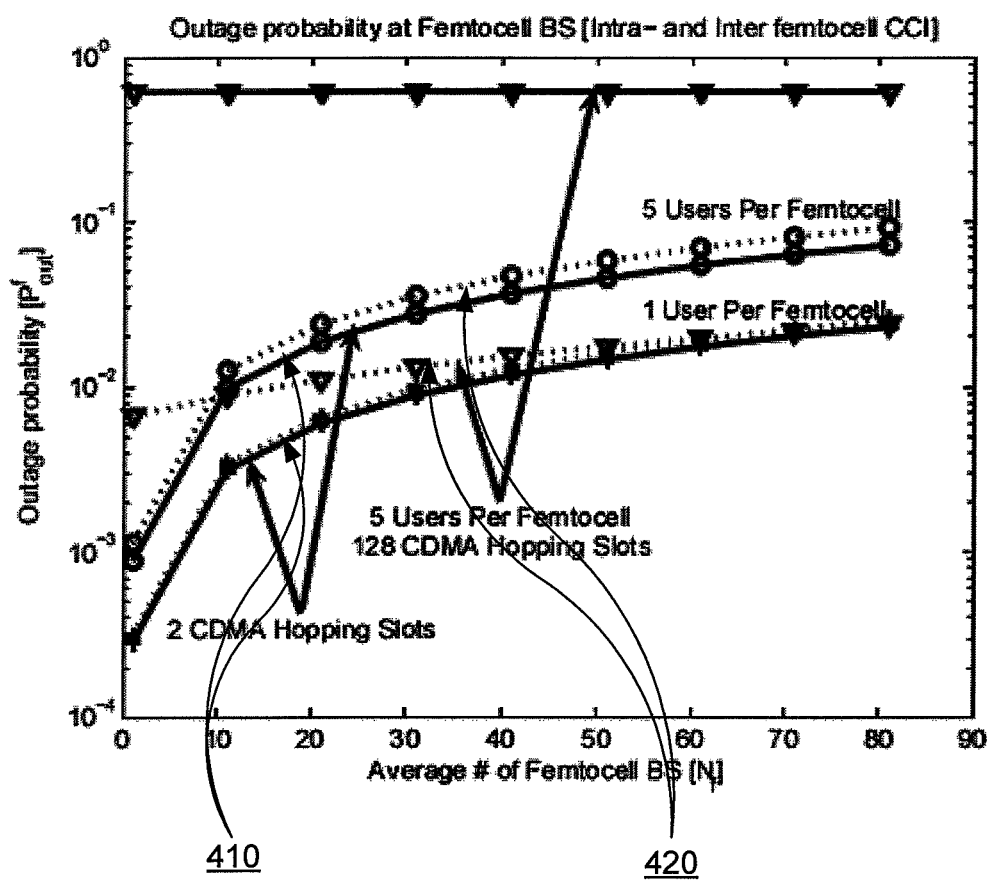
FIG. 7 illustrates a comparison of joint and independent hopping protocols at a femtocell base station with antenna sectoring.

With an outage threshold $P_r^f G/(N_{hop} \gamma)$ (equation (3)) at a femtocell base station, two observations are in order:

TH-CDMA transmission: When $$\frac{G}{N_{hop}} \gg 1,$$

joint hopping can be preferable from an outage probability perspective. Intuitively, joint hopping reduces $\lambda_f$ by a factor $N_{hop}$, which can cause a quadratic decrease in $\kappa_f$ in equation (5); independent hopping can decrease the number of interfering users per active femtocell, causing a sub-quadratic decrease in $E[\Psi^{1/2}]^2$. The consequence can be that joint hopping can result in a greater decrease in $\mathbb{P}_{out}^f$. Using $N_{hop}=2$, FIG. 7 illustrates this intuition, where the gap in outage performance can be dictated by the hotspot user density. In FIG. 7, the solid lines 410 represent the joint hopping performance when all users within a femtocell share a common hopping slot. The dotted lines 420 indicate the performance when every femtocell user is assigned an independent CDMA hopping slot. In heavily loaded femtocells ($U_f \gg 1$), a joint hopping scheme can be desirable. For lightly loaded femtocells $$\eta_f \simeq \tilde{\eta}_f \approx \frac{\lambda_f U_f}{N_{sec} \cdot N_{hop}},$$

implying that independent and joint hopping schemes can have nearly identical performance.

Random Access transmission: When $N_{hop}=G \gg 1$, the femtocell outage threshold can be $P_r^f/\gamma$. In this case, it may be preferable to use independent hopping across the tier 2 network. With joint hopping, even a single interferer within a femtocell can cause outage for the user of interest as there may be no interference averaging as illustrated in FIG. 7. An independent hopping scheme can offer increased interference avoidance since the likelihood of two femtocell users sharing a hopping slot can be negligible. Consequently, in non-CDMA two-tier cellular networks employing interference avoidance, independent assignment of hopping slots may be preferable from an outage viewpoint. Using Theorem 1, the macrocellular outage probability can be formulated.

Theorem 2 (Macrocell outage probability): Let outdoor path-loss exponent $\alpha=4$. With Poisson in-cell macrocell CCI $I_{c,in}$, Gaussian out-of-cell CCI $I_{c,out}$ and Lévy-stable femtocell CCI $I_{c,f}$ given by equation (5), the outage probability at the macrocell base station antenna sector can be given as:

$$\epsilon \geq \tilde{\epsilon}_{out}^c = 1 - \frac{1}{1-e^{-\eta_c|\mathcal{H}|}} \sum_{m=1}^{\lfloor \rho_r P_r^c \rfloor} \frac{e^{-\eta_c|\mathcal{H}|}(\eta_c|\mathcal{H}|)^m}{m!} G_c(\tilde{\rho}_c) \quad (6)$$

where $$\eta_c = \frac{\lambda_c}{N_{hop} \cdot N_{sec}},$$

$$\rho_c = \frac{P_r^c G}{N_{hop} \cdot \gamma}, \tilde{\rho}_c = \rho_c - (m-1)P_r^c$$

and $$G_c(t) \triangleq \int_0^t f_{I_{c,out}}(t-y) F_{I_{c,f}}(y) dy.$$

Theorems 1 and 2 can provide the tools to quantify the largest $N_f$ that can be accommodated at a given $N_c$ subject to an outage constraint $\in$. The next step is to compute the outage probability at a femtocell as defined in equation (3). To do so, assume that the femtocell is located on the axis at a distance $R_0$ from the macrocell center and the receive antenna at the femtocell base station is aligned at angle $\Theta$ with respect to the hexagonal axis (FIG. 6). The following theorem can be used to derive a lower bound on the statistics of the tier 1 CCI $I_{f,c}$ at any femtocell located along the hexagonal axis.

Theorem 3 (Lower bound on Macrocellular CCI): For any femtocell base station, antenna sector located at distance $0 < R_0 \leq R_c$ from the macrocell base station along the hexagonal axis:

1) The ccdf of the macrocellular interference $I_{f,c}$ over a femtocell base station antenna sector can be lower bounded as $\bar{F}_{I_{f,c}}(y) \geq 1 - F_{I_{f,c}}^{lb}(y)$, where:

$$F_{I_{f,c}}^{lb}(y) = \exp\left\{-\frac{\lambda_c}{N_{hop}} \int\int_{\mathcal{H}_{sec}} S(r \cdot \phi; y) r dr d\phi\right\} \quad (7)$$

where $S(r, \varphi; y) \triangleq \bar{F}\Psi[y/P_r^c \cdot (r/|re^{i\varphi}+R_0|)^\alpha]$, $\bar{F}_\Psi$ is the ccdf of $\Psi$: $10 \log_{10} \Psi \sim N(0, 2\sigma_{dB}^2)$, $\Theta$ is the femtocell base station antenna alignment angle $\mathcal{H}_{sec} \subseteq \mathcal{H}$ and denotes the region inside the reference macrocell enclosed between $\Theta \leq \varphi \leq \Theta + 2\pi/N_{sec}$.

2) For a corner femtocell $R_0=R_c$ with an omnidirectional femtocell antenna $N_{sec}=1$, the ccdf of $I_{f,c}$ can be lower bounded as $\bar{F}_{I_{f,c}}(y) \geq 1 - F_{I_{f,c}}^{lb}(y)$, where $$F_{I_{f,c}}^{lb}(y) = \exp\left\{-3\frac{\lambda_c}{N_{hop}} \int\int_{\mathcal{H}} S(r \cdot \phi: y) r dr d\phi\right\} \quad (8)$$

For a path-loss model, the lower bounds on the femtocell outage probability can be derived analogously as stated in the following corollary.

Figure 8:
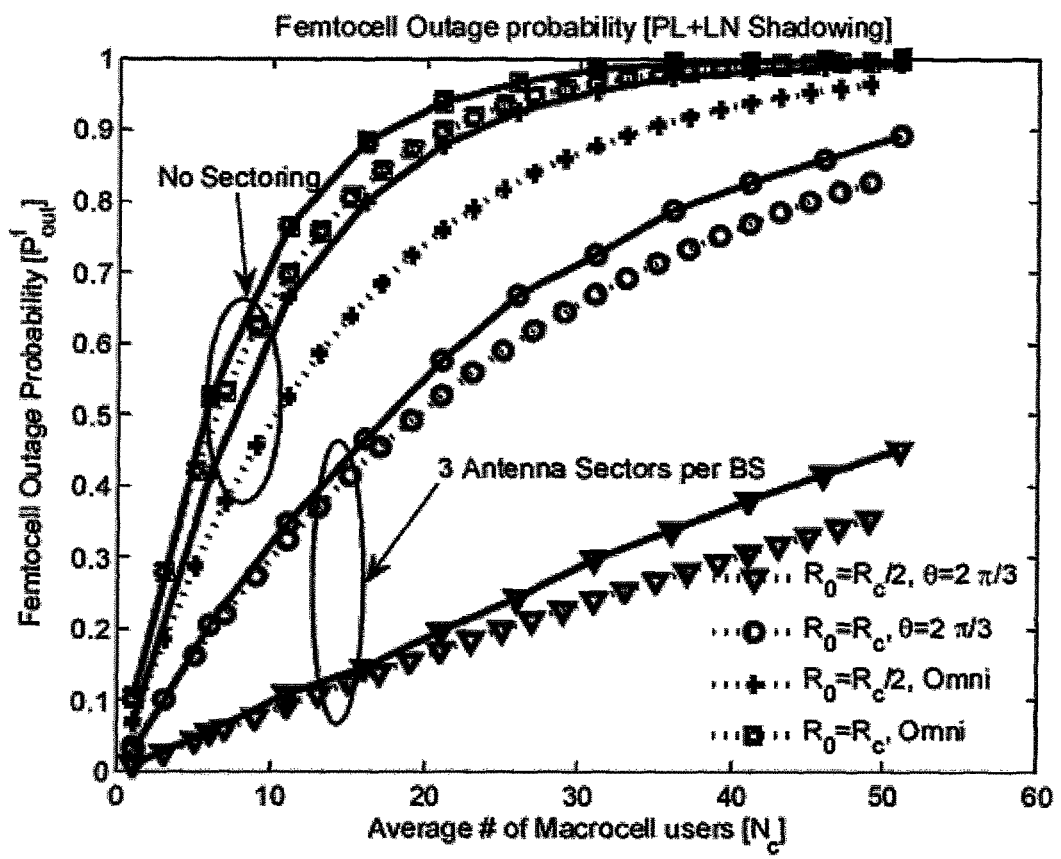
FIG. 8 illustrates outage lower bounds for interior and corner femtocells.

Corollary 1. With the above definitions, assuming a pure path-loss model with no shadowing, equations (7) and (8) hold with $S(r, \phi: y) \triangleq 1[P_r^c \cdot (|re^{i\varphi}+R_0|/r)^\alpha \geq y]$. Theorem 3 can characterize the relationship between the intensity of macrocell users and the femtocell outage probability. Observe that the outage probability $F_{I_{f,c}}^{lb} \to 1$ exponentially, as $\lambda_c \to \infty$. Furthermore, increasing $N_{hop}$ can "thin" the intensity of $\pi_c$, thereby mitigating cross-tier CCI at the femtocell base station. FIG. 8 depicts the outage lower bounds to evaluate the impact of macrocellular CCI $I_{f,c}$. Corresponding to an interior and corner femtocell location, the lower bounds can be computed when the femtocell base station antenna is either sectored $N_{sec}=3$ with antenna alignment angle $\theta=2\pi/3$, or when the base station antenna is omnidirectional. No hopping is used ($N_{hop}=1$), while a unity power ratio ($P_r^f/P_r^c=1$) is maintained. Two observations can be made:

Tightness of lower bound: In one embodiment, the tightness of equations (7) and (8) can show that the cross-tier CCI $I_{f,c}$ can primarily be impacted by the set of dominant macrocellular interferers. One implication is that one can perform accurate outage analysis at a femtocell by considering only the nearest tier 1 users that individually cause outage.

Infeasibility of omnidirectional femtocells: In another embodiment, the benefits of sectored antennas for CCI mitigation at the femtocell base station can be evident; with a sectored base station antenna, a corner femtocell (worst-case macrocell CCI) can perform considerably better than an interior omnidirectional femtocell. Using Theorems 1 and 3, the femtocell outage probability in equation (3) is stated in theorem 4.

Theorem 4 (Femtocell outage probability): Let outdoor path-loss exponent $\alpha=4$. For small $\lambda_c$, the femtocell outage probability $\tilde{\epsilon}_{out}^f$ can be lower bounded as:

$$\epsilon \geq \tilde{\epsilon}_{out}^{f,lb} \approx 1 - \frac{e^{-U_{f,sec}}}{1-e^{-U_{f,sec}}} \sum_{m=1}^{\lfloor \rho_r/P_r^f \rfloor} \frac{U_{f,sec}^m}{m!} \cdot G_c(\tilde{\rho}_f). \quad (9)$$

Where $$U_{f,sec} \triangleq \frac{U_f}{N_{sec}},$$

$$\rho_f \triangleq \frac{GP_r^f}{N_{hop} \cdot \gamma},$$

$$\tilde{\rho}_f = \rho_f - (m-1) \cdot P_r^f$$

and $$G_f(t) \triangleq F_{I_{f,f}}(t) + \int_0^t f_{I_{f,f}}(t-y)\ln(F_{I_{f,c}}^{lb}(y))dy.$$

For a given $N_f$, Theorem 4 can compute the largest $N_c$ which can ensure the SIR threshold $\gamma$ can be satisfied for a fraction $(1-\in)$ of the time. Furthermore, the lower bound $F_{I_{f_k}}^{lb}(\bullet)$ can be shown to be tight, hence the computed $N_c$ is not overly optimistic. Using Theorems 2 and 4, the OCs for the two-tier network with interference avoidance can now be readily obtained.

IV. Femtocell Exclusion Region and Tier Selection

Suppose the reference macrocell BS has a femtocell exclusion region $R_f^{exc} \subset H$ surrounding it. This idea may be motivated by the need to silence neighboring femtocell transmissions which may be strong enough to individually cause outage at a macrocell base station; similar schemes have been proposed and adopted in the CSMA scheduler in the 802.11 standard. The tier 2 femtocell network may then form a heterogeneous SPPP on H with the average number of femtocells in each cell-site equaling $\lambda_f(|\mathcal{H}|-|R_f^{rr}|)$. The following theorem derives a lower bound on the ccdf of the cross-tier femtocell interference $I_{c,f}$ considering the effect of a femtocell exclusion region.

Lemma 2 (Femtocell exclusion region): With a femtocell exclusion region of radius $R_f^{exc}$ around the reference macrocell base station, the ccdf of cross-tier femtocell CCI $I_{c,f}$ is lower bounded as:

$$\overline{F}_{I_{c,f}}(y) \geq 1 - e^{-\pi \eta_f H(y)} \quad (10)$$

where $$\delta = \frac{2}{\alpha},$$

$$u = y \cdot \frac{(R_f^{exc})^{2/\delta}}{Q_f},$$

$$H(y) \triangleq \left(\frac{Q_f}{y}\right)^\delta (E[\Psi^\delta] - \overline{F}_\Psi(u)E[\Psi^\delta \mid \Psi \leq u]) - \overline{F}_\Psi(u)(R_f^{exc})^2,$$

$$\Psi \triangleq \sum_{i=1}^U \Psi_i,$$

$$10\log_{10}\Psi_i \sim \mathcal{N}(0, 2\sigma_{dB}^2)$$

and $$U \sim X \mid X \geq 1 \cdot X \sim \text{Poisson}(U_f).$$

Figure 9:
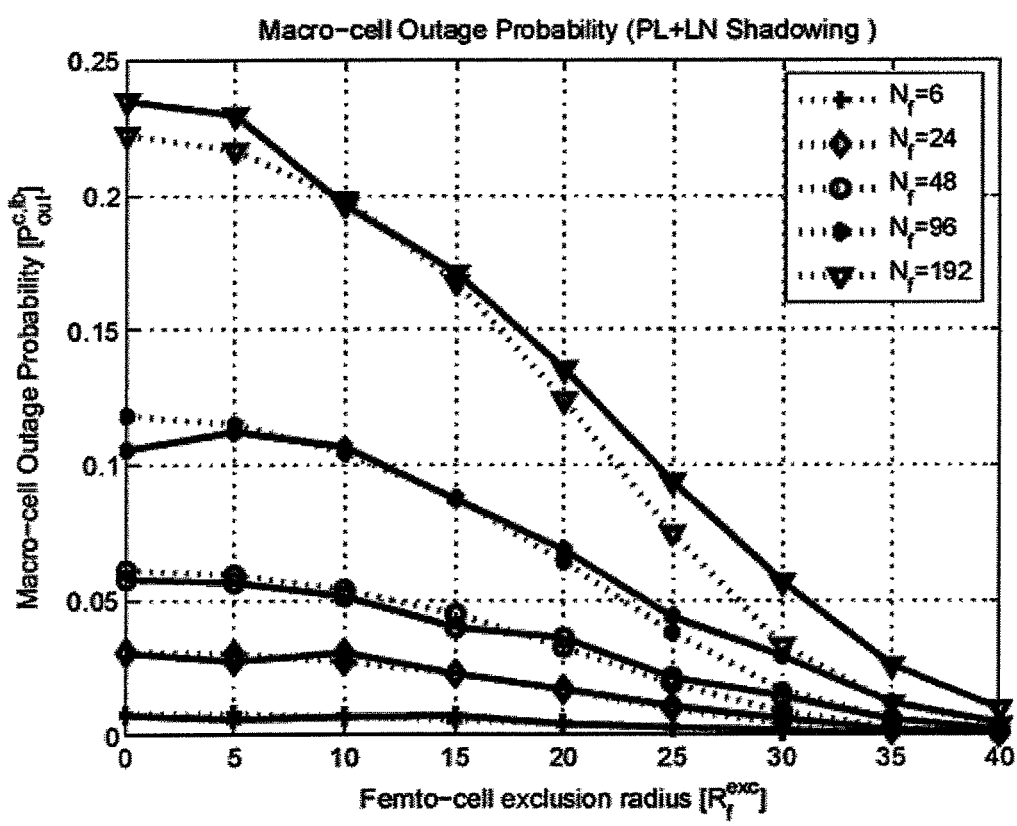
FIG. 9 illustrates macrocell outage performance with femtocell exclusion.

FIG. 9 depicts the macrocell outage performance as a function of the femtocell exclusion radius, assuming $N_c=1$, $P_r^f/P_r^c=1$. Notice that even a small exclusion radius $R_f^{exc}$ may result in a significant decrease in $\mathbb{P}_{out}^c$. One implication is that a femtocell exclusion region can increase the number of simultaneous active femtocell transmissions, while satisfying the macrocell outage constraint $\mathbb{P}_{out}^c \leq \in$. Once again, the close agreement between analysis and simulation shows that only the nearby dominant femtocell interferers influence outage events at the macrocell base station.

Corollary 2. With no femtocell exclusion ($R_f^{exc}=0$), the ccdf of the cross-tier femtocell CCI $I_{c,f}$ at a macrocell is lower bounded as $\overline{F}_{I_{c,f}}(y) \geq 1 - e^{-\pi \eta_f Q_f^\delta E[\Psi^\delta]y^{-\delta}}$.

The influence of a femtocell tier selection based handoff policy wherein any tier 1 macrocellular user within the radius $R_f$ of a femtocell base station undergoes handoff to the femtocell will now be considered. In essence, the CCI caused by the nearest macrocell users is mitigated, as these users now employ power control to the femtocell base station.

Lemma 3: With a tier selection policy in which any user within a radius $R_f$ of a femtocell undergoes handoff to the femtocell BS, the intensity of tier 1 users within H after handoff may be given as $\lambda_c^{TS}(r) = \lambda_c \cdot e^{-\lambda_f \pi R_f^2}$ whenever $r > R_f^{exc}$, where $R_f^{exc}$ is the femtocell exclusion radius.

In one embodiment, for small $\lambda_f$ and $r > R_f^{exc}$, a first order Taylor approximation may show that $\lambda_c^{TS} \approx \lambda_c \cdot (1-\lambda_f \pi R_f^2)$. One interpretation is that tier-selection offers marginal benefits for small femtocell sizes ($R_f \ll R_c$). Intuitively, a small sized femtocell does not cover "enough space" for significant numbers of macrocellular users in $\Omega_2$ to accomplish femtocell handoff. However, Theorem 1 shows that a small femtocell size does lead to a lower uplink outage probability.

In another embodiment, the network OCs considering the effects of a femtocell exclusion region and tier selection can be obtained by applying Lemmas 2 and 3 in Theorems 2 and 4 respectively. In doing so, we approximate $I_{f,f}$ as a Poisson SNP whose cdf is described by equation (1).

V. Numerical Results

The following provides the numerical results of an emulation performed in accordance with an embodiment of the present invention. System parameters are given in Table 1, shown in FIG. 5, and the LabVIEW environment was used for numerical simulations. The setup consists of the region H surrounded by 18 macrocell sites to consider two rings of interferers and $2\pi/3$ sectored antennas at each base station. In equation (10), the statistics of the shadowing gain $\Psi$ were empirically estimated using the MATLAB functions ksdensity and ecdf respectively. The OCs were analytically obtained using Theorems 1-4 for an outage constraint $\epsilon=0.1$ in equation (4). The following plots compare the OCs for a shared spectrum network with interference avoidance against a split spectrum network with omnidirectional femtocells.

Figure 10:
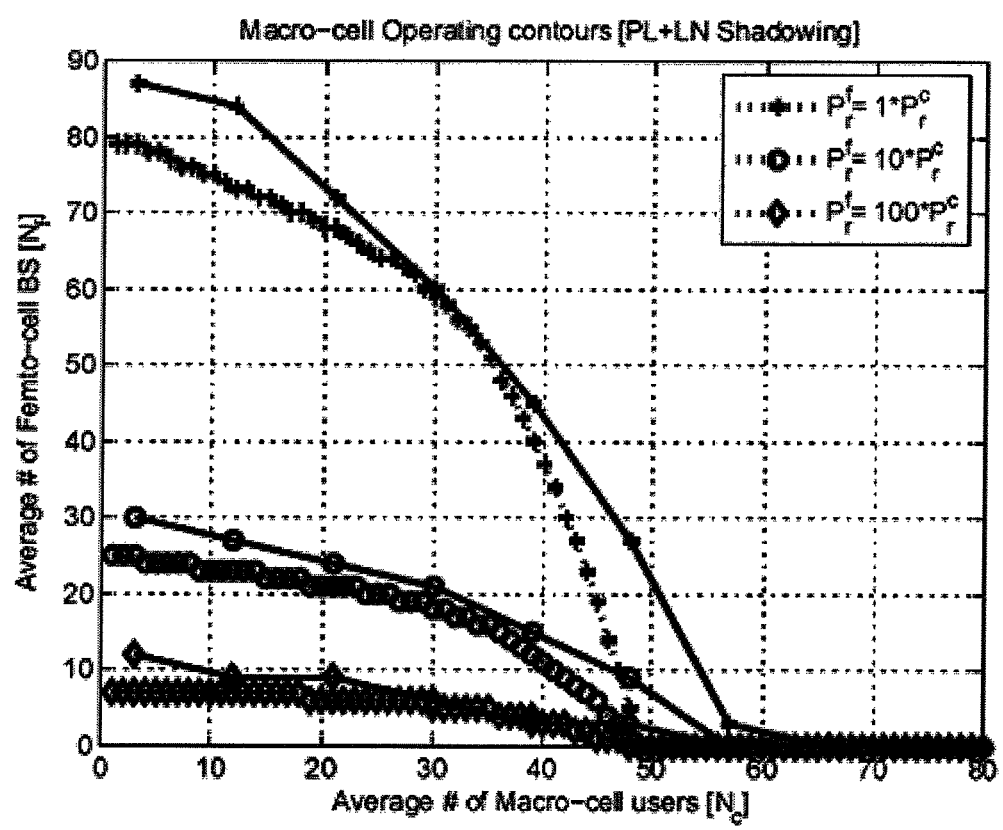
FIG. 10 illustrates a macrocell operating contour (OC)
Figure 11:
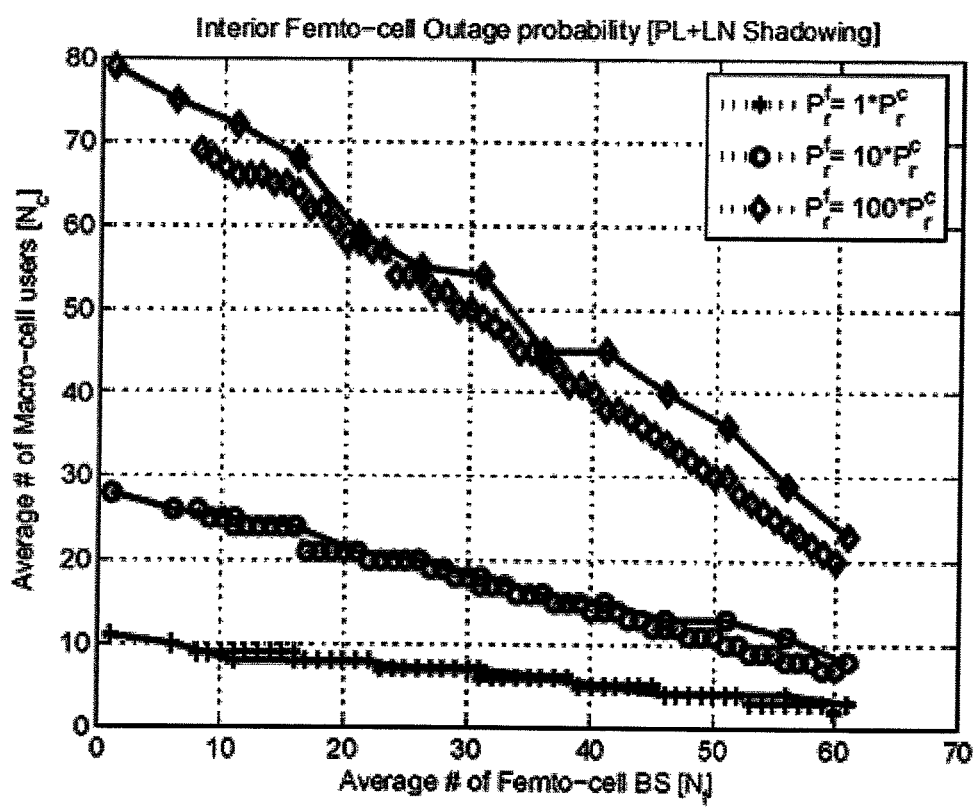
FIG. 11 illustrates interior femtocell OC.

FIGS. 10 and 11 plot OCs for a macrocell and interior femtocell, respectively, for $P_r^f/P_r^c=1$, 10, 100 and $N_{hop}=1$. The femtocell may use a sectored receive antenna with $N_{sec}=3$, $\theta=2\pi/3$. The close agreement between the theoretical and empirical OC curves indicates the accuracy of the analysis. Observe that the outage constraints oppose one another: increasing $P_r^f/P_r^c$ decreases the largest $N_f$ sustainable for a given $N_c$ from the macrocell BS perspective. From the femtocell standpoint, increasing $P_r^f/P_r^c$ increases the largest $N_c$ which is sustainable for a given $N_f$.

Figure 12:
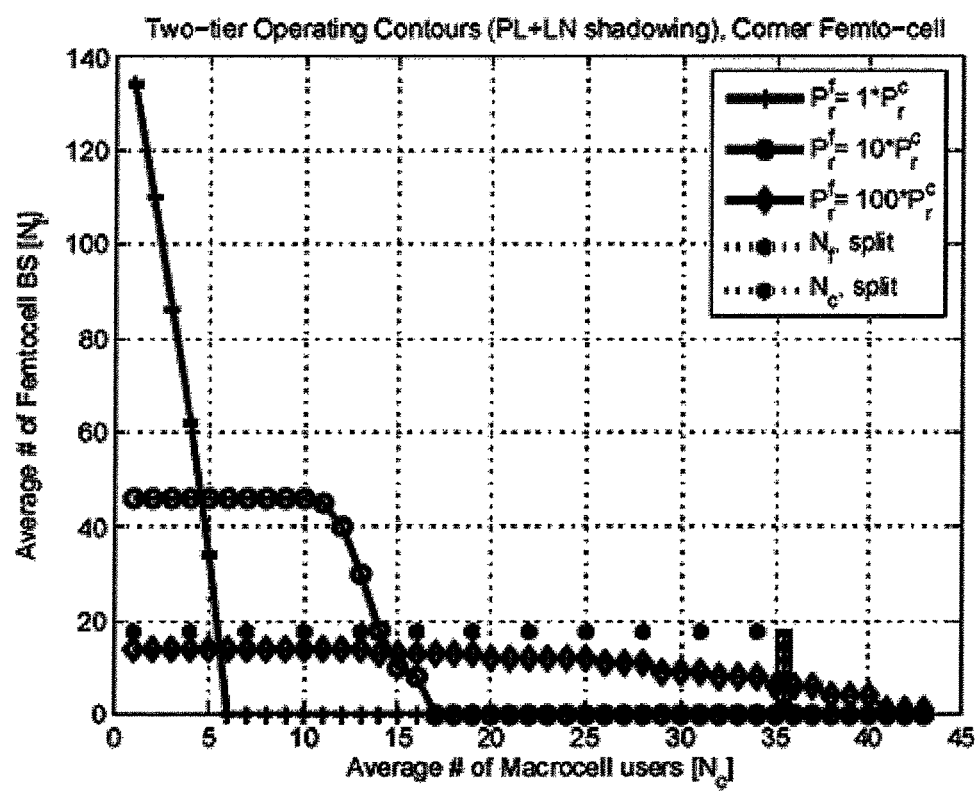
FIG. 12 illustrates network OCs for different macrocell-femtocell received power ratios and fixed hopping slots.
Figure 14:
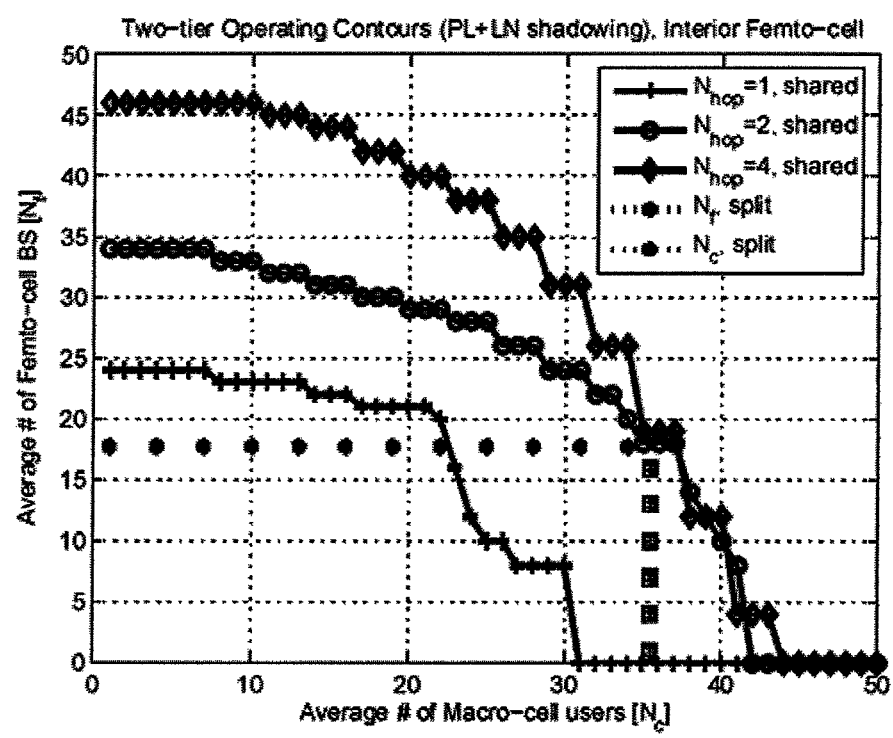
FIG. 14 illustrates network OCs with different hopping slots and interior femtocell reference.

FIGS. 12 through 14 plot the performance of the shared spectrum network employing interference avoidance for a corner and an interior femtocell, as a function of $N_{hop}$ and $P_r^f/P_r^c$. In particular, FIG. 2 illustrates network OC's for different macrocell-femtocell received power ratios and fixed hopping slots, wherein $N_{hop}=4$ and $N_{sec}=3$; and FIGS. 13 and 14 illustrate network OC's with different hopping slots, wherein $P_r^f/P_r^c=10$ and $N_{sec}=3$ for a corner and interior femtocell reference, respectively.

FIG. 12 shows that with $P_r^f/P_r^c=1$ and a lightly loaded tier 1 network, the corner femtocell may achieve greater than 7× improvement in Nf relative to the split spectrum network. Intuitively, with $P^f_r/P^c_r=1$, a macrocell base station tolerates a large cross-tier CCI; one downside being that the femtocell base station may experience higher macrocellular CCI arising from tier 1 users transmitting at maximum power near the cell edge. This may explain why Nf decreases rapidly with increasing $N_c$ in the OC curves for a corner femtocell. With $P^f_r/P^c_r=10$, the OCs for corner and interior femtocells in FIGS. 13 and 14 offer greater than 2.5× improvement in Nf relative to the split spectrum network. Additionally, a greater degree of load balancing can be achieved: with an interior femtocell location, a maximum of $N_c=45$ tier 1 users can be accommodated. The inference is that in a shared spectrum two-tier network, interference avoidance offers considerable improvement in tier 2 femtocell density $N_f$ at low $N_c$; to achieve load balancing by increasing $N_c$ at the expense of $N_f$, an order wise difference in receive power ratio is required. It may be averred that a practical wireless system use a larger $P^f_r/P^c_r$ closer to the corner femtocell relative to the interior; this may ensure that both the interior and corner femtocells can sustain identical number of tier 1 users.

Figure 15:
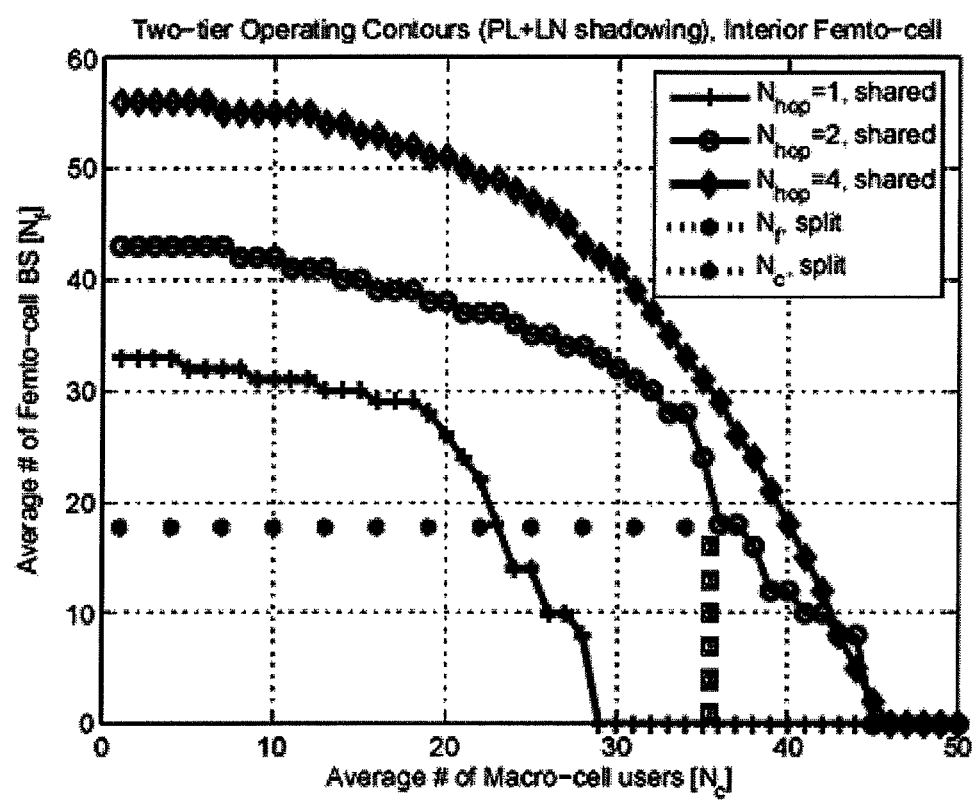
FIG. 15 illustrates network OCs with tier selection and femtocell exclusion and interior femtocell.

FIG. 15 shows the two-tier OCs when users in each tier employ a femtocell exclusion region and a tier selection policy for femtocell handoff ($P^f_r/P^c_r=10$, $N_{sec}=3$, $R^{rr}_f=20$). One can observe an increase in $N_f$ by up to 10 additional femtocells (or $10*U_f=50$ users) for $N_c<30$ users. Both femtocell exclusion and tier selection do not lead to a higher $N_c$. One reason is that a femtocell exclusion region does not alleviate tier 1 CCI at a femtocell. Furthermore, one explanation for the conservative gains in $N_f$ may be that there is a maximum tolerable interference to sustain the outage requirements at a given femtocell, that may prevent a substantial increase in the number of actively transmitting femtocells. Next, owing to small femtocell sizes, a tier selection policy may succeed in curbing tier 1 CCI mainly for a large $N_f$, which may be sustainable when $N_c$ is small (to satisfy $P^c_{out}\leq\epsilon$.). This may explain the dominant gains in $N_f$ at a low-to-moderate $N_c$. A relevant question is to ask: "How does the system capacity with randomly placed users and hotspots compare against a two-tier network with a given configuration?" Results appear to show that there is a decline in the system capacity, because the configuration contains high levels of cross-tier CCI.

It has been proposed to alleviate cross-tier CCI by varying the macrocell coverage region, through exchanging the pilot channel strength with the microcell. Embodiments of the present invention assume that femtocells (placed by end consumer) operate with minimal information exchange with the macrocell base station. Due to reasons of security and scalability—there may be hundreds of embedded femtocells within a densely populated macrocell—handing off unsubscribed users from macrocell to a femtocell hotspot may not be practical. Moreover, femtocell hotspots have a small radio range (<50 meters). This further makes an interference avoidance strategy desirable.

VI. Conclusion

The foregoing has presented an uplink capacity analysis and interference avoidance strategy for a shared spectrum two-tier DS-CDMA network in accordance with one embodiment of the present invention. The exact outage probability at a macrocell base station and tight lower bounds on the ccdf of the CCI at a femtocell were derived. Interference avoidance through a TH-CDMA physical layer coupled with sectorized receive antennas is shown to consistently outperform a split spectrum two-tier network with omnidirectional femtocell antennas. Considering the worst-case interference at a corner femtocell, the network OCs show a 7× improvement in femtocell density. Load balancing users in each tier may be achievable through an order-wise difference in receive powers in each tier. Additional interference avoidance using a femtocell exclusion region and a tier selection based femtocell handoff may offer conservative improvements in the OCs. The message appears clear: Interference avoidance strategies can make shared spectrum two-tier networks a viable proposition in practical wireless systems.

Techniques for Reducing Interference in FDMA Cellular Network

According to embodiments of the present invention, similar techniques may be used to reduce interference associated with two-tier networks employing frequency division multiple access (FDMA) transmission (e.g., 3GPP LTE, 802.16 WiMAX, 3GPP2 UMB, etc.). When FDMA systems use the discrete Fourier transform and/or its inverse to create and decode the frequency tones, it is often referred to as orthogonal frequency division multiple access (OFDMA) or multiuser OFDM. The term FDMA is generally used through this patent with the understanding that OFDMA is a specific type of FDMA and embodiments of the present invention apply to both. According to embodiments of the present invention, one or more of the following techniques may be provided in order to reduce interference in FDMA two-tier networks: (1) a spectrum allocation scheme to partition spectrum between cellular and hotspot, or femtocell, base stations; (2) a decentralized spectrum access protocol by femtocells; and (3) a carrier sensing scheme for femtocells to detect idle, or unoccupied, subchannels and avoid creating mutual interference for neighboring femtocells.

According to the first embodiment, a spectrum allocation scheme may be provided to partition the spectrum between cellular and femtocell base stations. In this embodiment spectrum allocation can maximize the network-wide Area Spectral Efficiency (ASE) in a two-tier network, assuming each macrocell can transmit to a single user per frequency subchannel, while femtocells may access the spectrum using Frequency-ALOHA (F-ALOHA), a method to be discussed below. ASE, which can be measured in $b/s/Hz/m^2$, can be defined as the network-wide spatially averaged throughput per frequency subchannel divided by the product of the subchannel bandwidth and the area over which the transmissions take place. The allocation can be determined by qualifying the per-tier ASEs based on the propagation environment and neighboring cell interference. With an increasing number of macrocell users, the ASE of the macrocell can either be fixed (for a channel blind scheduler) or increasing (by opportunistic scheduling). For the femtocell network, the ASEs can be derived based on the optimal spectrum access using F-ALOHA. Additionally, the optimal allocation can be determined as one that maximizes the weighted mean of the per-tier ASEs. The weights can be given by the fraction of spectrum accessed by each tier.

In an embodiment of the invention, the expected per-tier throughput can be derived for the macrocell and femtocell users accounting for interference from neighboring cells. The maximum ASE of the femtocell network can be shown to be unchanged with addition of hotspots beyond a threshold. At low femtocell densities, a high level of femtocell ASEs can be attained when each femtocell can access most of the available spectrum. In higher densities, femtocells can use a decreasing fraction of the spectrum; e.g. with an average of 100 femtocells in each cell site, each femtocell may access 30% of the available spectrum.

In another embodiment of the invention, the proposed spectrum allocation can allocate the desired level of spatial reuse in a two-tier network, subject to a network-wide QoS requirement, which can create the desirable expected throughput per-user. Differing QoS constraints can produce different spectrum allocations due to the competing spatial coverage scales in each tier. A QoS requiring equal per user throughputs in each tier can mean assigning greater than 90% of spectrum to the macrocell. Conversely, an even division of spectrum can occur when the QoS constraints favor femtocells to provide higher data rates.

Once the spectrum has been allocated, according to one embodiment, a decentralized spectrum access protocol, referred to as Frequency-ALOHA, may be used to access the allocated spectrum. In particular, according to one embodiment, if a femtocell transmits over all its allotted subchannels, it may cause excessive interference to surrounding femtocells; conversely, accessing only a few subchannels can result in a poor spatial reuse. With Frequency-ALOHA, there can be an optimal fraction of spectrum access for each femtocell in order to maximize the spatial reuse of spectrum, or in effect the net number of simultaneous transmissions per unit area. The spatial reuse is readily expressible using the ASE in b/s/Hz/m$^2$.

Alternatively, the spectrum may be allocated based on a carrier sensing scheme, wherein the femtocell may opportunistically detect and transmit over unutilized subchannels, in order to avoid colliding with neighboring femtocells. According to one embodiment, the femtocell may detect unutilized subchannels by using energy detection in each sub band (or source block in commercial OFDMA standards such as 3GPP LTE). According to one embodiment, the energy detection in a frequency subchannel may be conducted by measuring the total power (signal plus interference plus noise) in that subchannel; hypothesis testing can be performed to decide whether the measured power in the subchannel corresponds to an occupied subchannel or not. The null hypothesis corresponds to an unoccupied subchannel which is therefore available for transmission by the femtocell. The Significant hypothesis corresponds to an occupied subchannel (i.e. there is an ongoing transmission intended for either a cellular user or an indoor user in a neighboring femtocell in that subchannel).

The following provides a more detailed description and analysis of using spectrum allocation and access schemes to reduce interference in two-tier networks employing FDMA transmission.

I. System Model

In one embodiment, the cellular system setup can consist of a hexagonal region H of radius $R_c$ with a central macrocell base station C providing coverage area $$|\mathcal{H}| = \frac{3\sqrt{3}}{2} R_c^2,$$

which can be surrounded by two rings of interfering macrocells. The macro-cellular network can be overlaid with femtocell hotspots of radius $R_f$ which can be randomly distributed on $R^2$ according to a homogeneous SPPP $\Omega_f$ with intensity $\lambda_f$. The mean number of femtocells per cell site can be obtained as $N_f = \lambda_f |H|$. Macrocell users can be assumed to be uniformly distributed inside each cell site. Femtocells can be assumed to provide "closed access" to licensed indoor users who fall within the radio range $R_f$ of their respective home base stations. Let $U = U_c + N_f U_f$ denote the average number of users in each cell site. These U users can be distributed into $U_c$ uniformly distributed tier 1 mobile outdoor users and $U_f$ users per femtocell hotspot.

A. Per-Tier Spectrum Access

In one embodiment of the invention, the available spectrum can comprise F frequency subchannels each with bandwidth W Hz. To determine the optimal partitioning ($F_c$, $F_f$), where $F_c$ subchannels can be available for macrocell transmissions and $F_f = F - F_c$ subchannels may be available for femtocell transmissions. Denote $\rho = F_c/F$ as the fraction of spectrum assigned to the macrocell base station with the following assumptions:

Assumption 1. Each femtocell schedules its users in a round-robin (RR) fashion. The macrocell schedules its users according to either a channel blind RR or a channel aware proportional fair (PF) scheduler.

Assumption 2. The fraction $\rho$ takes a continuum of values in [0, 1] and $\rho$ is not quantized for having an integer number of frequency subchannels. Consequently, $F_c = \lfloor \rho F \rfloor$ and $F_f = F - F_c$, where $\lfloor x \rfloor$ may be used to denote the integer part of a number x.

As illustrated in Assumption 1, the long term expected throughput per indoor user equals $1/U_f$ th of the average femtocell throughput. The long term expected macrocell throughput is assumed to be equally divided among the $U_c$ outdoor users with RR and PF scheduling at the macrocell. With a PF scheduler, this assumption may be reasonable considering mobility, which may ensure that all users receive an identical average Signal to Interference Ratio (SIR) over the long term.

If each femtocell transmits over exactly k frequency subchannels among their allotted Ff subchannels, the net portion of accessed spectrum per femtocell equals $\rho_f(1-\rho)$ where $\rho_f \triangleq k/F_f$. If femtocells choose their frequency subchannels independently and with equal probability, F-ALOHA can effectively "thin" the mean number of interfering femtocells in each frequency subchannel. The probability p of a femtocell selecting a given frequency subchannel for transmission can be given as:

$$p = \frac{\binom{F_f}{k} - \binom{F_f - 1}{k}}{\binom{F_f}{k}} = \frac{k}{F_f} = \rho_f. \tag{11}$$

Consequently, the set of interfering femtocells per frequency subchannel can be a marked SPPP $\Lambda_f$ with intensity $\lambda_f \rho_f = \lambda_f k/F_f$. When $p_f = 1$, all femtocells in $\Omega_{f\,can}$ access the entire spectrum but mutually interfere in all subchannels. For $\rho_f \ll 1$, femtocells may transmit in a small region of spectrum and avoid causing mutual interference. This strategy can provide a higher spectral efficiency over each frequency subchannel, but can incur reduced spectrum utilization because femtocells do not transmit over the entire available spectrum.

B. Channel Model & Variable Rate Transmission

In another embodiment, the downlink channel between each base station and its users can be composed of a fixed distance dependent path loss, a slowly varying component modeled by lognormal shadowing and Rayleigh fast fading with unit average power. For simplicity, thermal noise may be neglected at the receiver since cellular systems, by nature, are interference limited. Although imperfect feedback and/or channel estimation may have a potentially big impact on system capacity, the following does not account for these effects for the sake of analytical tractability.

Assumption 3. Each user can be assumed to track their SIR in each subchannel and feedback the instantaneous rate to their base station with zero delay. Further, the channel can support the requested rate as determined by the scheduled user with probability 1.

Assumption 4. Base stations assign equal transmission powers to all subchannels. Each base station may assign rate adaptively based on the received SIR per user. Let G denote the Shannon Gap with variable rate M-QAM transmission. Assume an instantaneous transmission rate of $b_i$ bps/Hz if the instantaneous SIR lies in $[\Gamma_i, \Gamma_{i+1})$. Using adaptive modulation with L discrete rates, the instantaneous rate Wb in a W Hz wide subchannel can be chosen as:

$$b = b_i, \quad (12)$$
when
$$SIR \in [\Gamma_i, \Gamma_{i-1}) \cdot 1 \leq i \leq L$$
$$b_i = \log_2\left(1 + \frac{\Gamma_i}{G}\right) bps/\text{Hz}. \quad (13)$$

Assuming identical statistics over all frequency subchannels, the long term expected throughput (in b/s/Hz) per macrocell/femtocell in each subchannel can be given as:

$$T = \sum_{l=1}^{L-1} l \cdot Pr[\Gamma_i \leq SIR < \Gamma_{i+1}] + L \cdot Pr[SIR \geq \Gamma_L]. \quad (14)$$

The expected throughput provided by each macrocell [resp. femtocell] can be obtained by multiplying the expected throughput in equation (14) by their respective spectrum allocation $\rho$[resp. $\rho_f(1-\rho)$].

II. Spectrum Allocation and Per-Tier Expected Throughputs

In an embodiment of the invention, let spectrum WF be partitioned such that the macrocell base station can transmit over a portion $\rho$, while femtocell base stations may transmit over the remaining $1-\rho$ fraction of the spectrum. Let $T_c(\rho, U_c)$ be the long term throughput (in b/s/Hz) in each subchannel provided by the macrocell. Obtaining $T_c$ can require calculating the average rate per subchannel in equation (14) after spatially averaging the SIR over all locations, and accounting for the interference from two rings of transmitting macrocells.

Let each femtocell access a portion $\rho_f$ of its allotted spectrum using F-ALOHA, servicing its users in a RR schedule. Define $T_f(\rho_f \lambda_f)$ as the expected femtocell throughput in each frequency subchannel, which can be determined by the intensity $\rho_f \lambda_f$ of the marked SPPP $\Lambda_f$. With universal frequency reuse across all macrocells, the ASE of the macrocell (resp. femtocell) network can be given as:

$$ASE_c = \frac{T_c(\rho, U_c)}{|H|}, \quad (15)$$

$$ASE_c = \frac{N_f \rho_f T_f(\rho_f \lambda_f)}{|H|}.$$

The factor $N_f \rho_f$ can represent the mean number of transmitting femtocells in each subchannel. With bandwidth W, the per-tier throughputs (in b/s) per subchannel can be calculated by multiplying the ASEs in equation (15) by W |H|. The network-wide ASE can therefore be given as:

$$ASE = \rho ASE_c + (1-\rho)ASE_f \quad (16)$$
$$= \frac{1}{|H|}\rho T_c(\rho, U_c) + (1-\rho)N_f \rho_f T_f(\rho_f \lambda_f).$$

The expected network throughput (in b/s) over the WF wide spectrum can be obtained by multiplying equation (16) by WF |H|. Before determining the spectrum allocation, QoS may first be stipulated to require $\eta$, which can ensure that users in either tier are guaranteed a minimum expected throughput. By implication, $\eta$ also can regulate the maximum amount of spectrum that any tier can receive.

Definition 1. The QoS parameter $\eta$ can guarantee that the expected throughput per user in one tier is at least $\eta/(1-\eta)$ with respect to the other tier. Choosing a different $\eta$ can enable assigning different priorities (QoS) to one tier relative to the other. For example, setting $\eta=0.5$ can ensure that users in both tiers obtain identical expected rates. On the other hand, decreasing $\eta$ can favor assigning greater spectrum to the tier providing a higher expected throughput per active user.

Given a total available spectrum of 1 Hz, the problem can be to determine the optimal spectrum allocation $\eta$ over all possible spectrum partitioning strategies $\omega \in [0, 1]$ between the macrocell and femtocells. In an embodiment, the spectrum allocation can maximize the network-wide ASE with a QoS constraint $\eta$ on the minimum expected per-tier throughput/user, as shown below:

$$\rho = \frac{1}{|H|} \arg\max_{0 \leq \omega \leq 1} \omega T_c(\omega, U_c) + (1-\omega)N_f \rho_f T_f(\rho_f \lambda_f) \quad (17)$$

subject to min (18)
$$\{T_{c,u}(\omega), T_{f,u}(\omega)\} \geq \eta T_{c,u}(\omega) + T_{f,u}(\omega))$$
where
$$T_{c,u}(\omega) \triangleq \frac{\omega T_c(\omega, U_c)}{U_c}$$
and
$$T_{f,u}(\omega) \triangleq \frac{(1-\omega)\rho_f T_f(\rho_f \lambda_f)}{U_f}.$$

Here $T_{c,u}(\omega)$ and $T_{f,u}(\omega)$ are the expected throughputs for a macrocell and femtocell user respectively. Whenever the average subchannel throughput $T_c(\omega, U_c)$ is independent of the spectrum $\omega$ assigned to the macrocell, the objective function in equation (17) can be an affine function with respect to $\omega$. The following proposition derives the optimizing $\rho$ considering the maximum may be obtained at the extremal points of the constraint set.

In an embodiment, if the expected macrocell throughput per subchannel is independent of the total spectrum allocated to the macrocell $\omega$, i.e. $T_c(\omega, U_c)=T_c(U_c)\forall \omega \in [0, 1]$, the optimizing $\rho$ in equation (17) can satisfy the QoS constraint with equality, belonging to a set with two candidate spectrum allocation assignments can be given as:

$$\rho^* \in \{x, 1-x\}, \quad (19)$$

$$x \triangleq \left[1 + \frac{1-\eta}{\eta} \frac{T_c(U_c)}{U_c} \frac{U_f}{\rho_f T_f(\rho_f \lambda_f)}\right]^{-1}.$$

Since $T_c(\omega, U_c)=T_c(U_c) \forall \omega \in [0, 1]$, the optimization problem in equation (17) may be to determine the optimal $\rho$ which can maximize a convex combination of $T_c$ and $N_f \rho_f T_f$ ($\rho \lambda_f$) with a linear constraint. Consequently, the argument maximizer can be located at the external points of the constraint set in equation (18). Solving for the $\rho$ which satisfies equation (18) with equality can yield equation (19).

Without a QoS requirement (allowing $\eta \to 0$), the objective function in equation (17) can be a convex combination of the macrocell and femtocell throughputs which can be maximized at the extreme points $\rho \in \{0, 1\}$. Such a partitioning can be unfair since it can result in a greedy allocation of the entire spectrum to one tier. For a generic macrocell scheduler-when the foregoing proposition maybe applicable—equation (17) is one dimensional optimization problem that can be solved efficiently for a given $\eta$ using a numerical search.

A. Macrocell Throughput: RR Scheduling.

Assuming that the central macrocell base station $C_0$ in the hexagonal region H is placed at the origin, the normalized positions of the interfering base stations $C_k \in \beta$, k=1 ... 18 are represented in polar form $b_k$, $k \in \beta$ using MATLAB notation as:

$$b_k/R_c \in \{\sqrt{3}e^{i(\pi/6+[0:5]\pi/3)}\} \cup \{3e^{i([0:5]\pi/3)}\} \cup \{2\sqrt{3}e^{i(\pi/6+[0:5]\pi/3)}\} \quad (20)$$

Let $h_0$ denote the Rayleigh fast fade (with exponentially distributed channel power $|h_0|^2$ with unit mean) between the central macrocell base station $C_0$ and its scheduled user 0. Denoting the Euclidean norm by $\|\cdot\|$, the expression for the received SIR for macrocell user 0 at position r may be given as:

$$SIR_c(r) = \frac{\Theta_0}{\Psi_I(r)} |h_0|^2 \|r/R_c\|^{-\alpha_c} \quad (21)$$

where $$\Psi_I(r) = \sum_{k \in \beta} \left\|\frac{r-b_k}{R_c}\right\|^{-\alpha_c} |h_{0k}|^2 \Theta_{0k} \quad (22)$$

Here $\alpha_c$ represents the outdoor path loss exponent and $|h_{0k}|^2 \sim \exp(1)$ is the exponentially distributed channel power between interfering BS Ck and the user of interest. The RV $\Theta_0$ [resp. $\Theta_{0k}$] is the lognormal shadowing between the central BS [resp. interfering BSs] and the desired user, which are distributed as $LN(\zeta \mu_{c,dB}, \zeta^2 \sigma_{c,dB}^2)$, where $\zeta=0.1$ In 10 is a scaling constant. For analytical tractability the following assumption may be made regarding the distribution of a composite lognormal-exponential RV:

Assumption 5: The distribution of a composite lognormal-exponential RV $\Theta_k |h_{0k}|^2$ is modeled as a lognormal distribution using Turkmani's approximation:

$$f_{\Psi_i}(x) = \frac{1}{x \sigma_i \sqrt{2\pi}} \exp\left[\frac{-(\ln x - \mu_i)^2}{2\sigma_i^2}\right] \quad (23)$$

$$\mu_i = \zeta(\mu_{c,dB} - 2.5),$$
$$\sigma_i = \zeta\sqrt{\sigma_{c,dB}^2 + 5.57^2} \quad (24)$$

Assumption 6: For a fixed r, using the moment generating function based technique described in N. B. Mehta J. Wu, A. F. Molisch, and J. Zhang, "Approximating a sum of random variables with a lognormal," *IEEE Trans. On Wireless Communication.*, vol. 6, no. 7, pp. 2690-2699, July 2007 (Mehta et al.), the contents of which are hereby incorporated herein by reference in their entirety, the sum of $|\beta|$ independent, but not identically distributed lognormal RVs in the expression $\Psi_I(r)=\sum_{k \in C} \beta(\|r-b_k\|/R_c)^{-\alpha_c}\Psi_k$ can be approximated by a single lognormal RV with parameters $LN(\mu_I(r); \sigma_I^2(r))$. Using Assumptions 5-6 and equation (21), $SIR_c(r)$ may be distributed according to a lognormal RV $LN(\mu_C(r), \sigma_C^2(r))$ where $\mu C(r)=\mu_S(r)-\mu_I(r)$ and $\sigma_C(r)=\sqrt{\sigma_S^2(r)+\sigma_I^2(r)}$. Then, the distribution of the SIR for a mobile tier 1 user at position r with respect to the central BS may be given by $$Pr[SIR_c(r) \leq \Gamma | r] = 1 - Q\left[\frac{\ln(\Gamma \|r/R_c\|^{\alpha_c}) - \mu_C}{\sigma_C}\right] \quad (25)$$

where $$Q(x) \triangleq \frac{1}{\sqrt{2\pi}} \int_x^\infty e^{-t^2/2} dt$$

is the complementary cumulative distribution function (CCDF) of a standard normal. Defining $$a(r) \triangleq \frac{\ln \Gamma - \mu_C(r)}{\sigma_C(r)}$$

and $$b \triangleq \frac{\alpha_c}{\sigma_C(r)},$$

equation (25) simplifies to $$Pr[SIR_c(r) \leq \Gamma[r]=1-Q[a(r)+b(r)\ln|[r/R_c|]] \quad (26)$$

Averaging equation (26) over a hexagonal cell region may be difficult. Alternatively, the spatially averaged CDF of $SIR_c$ can be obtained approximately by considering a circular region of radius $$\sqrt{\frac{|\mathcal{H}|}{\pi}},$$

which results in the same area as the cell site H. To calculate the spatial throughput inside this circular region, the region may be divided into M non-overlapping annuli. For tractability, a simplifying assumption is that all users inside an annulus experience identical shadowing statistics (i.e. identical $\mu_C(r)$ and $\sigma_C(r)$). Denoting the distance of the user from $C_0$ by $\|r\|=R$, the following lemma derives the expected spatial throughput by averaging $SIR_c(R)$ inside a circular annulus with inner radius $R_1$ and outer radius $R_2$.

Lemma 1: The spatially averaged SIR distribution inside a circular annulus with inner radius $R_1$ and outer radius $R_2$ may be given as:

$$\mathbb{E}_R[Pr(SIR_c \leq \Gamma | R_1 \leq R \leq R_2)] = \quad (27)$$
$$1 - \frac{1}{(R_2^2 - R_1^2)}[R_2^2 C(a_2, b) - R_1^2 C(a_1, b)]$$

where $$C(a, b) \triangleq Q(a) + \exp\left(\frac{2-2ab}{b^2}\right)Q\left(\frac{2-ab}{b}\right) \quad (28)$$

$$a \triangleq \frac{\ln\Gamma - \mu_C(R_2)}{\sigma_C(R_2)}, \quad (29)$$

$$b \triangleq \frac{\alpha_c}{\sigma_C(R_2)}$$

$$a_2 = a + b\ln(R_2/R_c), \quad (30)$$
$$a_1 = a + b\ln(R_1/R_c),$$

Lemma 1 provides a simple method for estimating the cell-averaged macrocell throughput per sub-channel. The probability that a user lies in an annulus with inner radius $R_{m-1}$ and outer radius $R_m$ ($1 \leq m \leq M$ with $R_0=0$) equals $$\frac{\pi(R_m^2 - R_{m-1}^2)}{|\mathcal{H}|}.$$

Assumptions 5 through 6 may be used for computing the shadowing parameters $\sigma_C$ and $\mu_C$ at discrete locations $R_{m,i} \leq m \leq M$ where $$R_M = \sqrt{\frac{|\mathcal{H}|}{\pi}}.$$

The spatially averaged SIR distribution for a macrocell user may therefore, be approximated as follows:

$$Pr(SIR_c \leq \Gamma) = \mathbb{E}_R[Pr(SIR_c(R) \leq \Gamma)] \quad (31)$$

$$= 1 - \frac{\pi R_1^2}{|\mathcal{H}|} C\left(a_1 + b_1 \ln\frac{R_1}{R_c}, b_1\right) \quad (32)$$

$$= \sum_{m=2}^{M} \frac{\pi}{|\mathcal{H}|} \left[R_m^2 C\left(a_m + b_m \ln\frac{R_m}{R_c}, b_m\right) - R_{m-1}^2 C\left(a_m + b_m \ln\frac{R_{m-1}}{R_c}, b_{m+1}\right)\right] \quad (33)$$

where $$a_m \triangleq \frac{\ln\Gamma - \mu_C(R_m)}{\sigma_C(R_m)}$$

and $$b_m \triangleq \alpha_c / \sigma_C(R_m),$$

where (32) approximates (31) by spatially averaging $SIR_c$ over M different annulus. Equation (33) is obtained by substituting (27) inside the conditional expectation in (32) and the corresponding probability that the user lies in annulus m, $1 \leq m \leq M$. Combining equations (14) and (31), the average macrocell throughput $T_c$ in a given subchannel is expressed as $$T_c = \sum_{l=1}^{L-1} l \cdot \mathbb{E}_R[Pr(\Gamma_l \leq SIR_c(R) < \Gamma_{l+1})] + \quad (34)$$

$$L \cdot \mathbb{E}_R[Pr(SIR_c(R) \geq \Gamma_L)]$$

$$= \sum_{l=1}^{L-1} l \cdot (\mathbb{E}_R[Pr(SIR_c(R) \leq \Gamma_{l+1})] - \mathbb{E}_R[Pr(SIR_c(R) < \Gamma_l)]) + L \cdot \mathbb{E}_R[Pr(SIR_c(R) > \Gamma_L)]$$

Figure 16A:
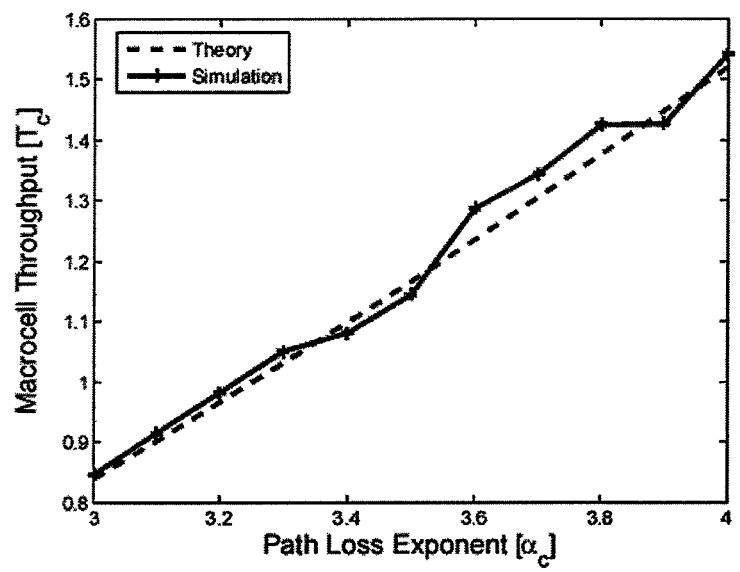
FIGS. 16A and 16B illustrate spatially averaged macrocell subchannel throughput.

FIG. 16(a) plots $T_c$ (in b/s/Hz) with RR scheduling as a function of the outdoor path-loss exponent $\alpha_c$ for the system parameters in FIG. 23. The close agreement between theory and numerical simulations indicates that the theoretically obtained SIR distribution is an accurate approximation for practical throughput in a macrocellular environment.

B. Macrocell Throughput: PF Scheduling.

In another embodiment of the invention, in contrast to a RR scheduler, a PF scheduler can enable macrocell users to compete for resources based on their requested rates normalized by their average throughput. Consequently, the macrocell can select the user with the highest rate relative to their average rate. During the transmission interval n in subchannel m, denote $R_k[m, n]$ as the requested rate for user k, $1 \leq k \leq U_C$, located at position $r_k$ with respect to the central macrocell C. Let $\bar{R}_k[n]$ windowed mean throughput obtained by user k over the $F_c$ frequency subchannels allocated for macrocell transmission. The PF scheduler can select the k whose current supportable rate may be high relative to their mean rate. The scheduling policy per subchannel m with equal per-subchannel transmission powers (Assumption 4) can be described as:

$$\tilde{k}(m, n) = \arg\max_{1 \leq k \leq U_C} \frac{R_k[m, n]}{\bar{R}_k[n]}. \quad (35)$$

Note that mobile user k calculates $R_k[m, n]$ using equations (12) and (21), respectively. The windowed throughput per user prior to transmission interval (n+1) can be updated according to the following rule, $$\bar{R}_k[n+1] = \left(1 - \frac{1}{N}\right)\bar{R}_k[n] + \frac{1}{N}\sum_{m=1}^{F_C} R_k[m, n]1[k = \tilde{k}(m, n)], \ 1 \leq k \leq U_C, \quad (36)$$

where $1[\cdot]$ is the indicator function determining whether user k is scheduled during transmission interval n in frequency link or not. The window size N can be a parameter that can be selected considering the delay tolerance for each user. Choosing a smaller N can enable a given user to be scheduled more often, whereas choosing larger N can relax the fairness constraint and can allow the scheduler to wait longer before scheduling a user. By the strong law of large numbers, the average throughput per frequency subchannel for a given set of user positions can be obtained from the sample average over a long duration and expressed as:

$$\mathbb{E}[\bar{R}(F_C, U_C)|r_1, \ldots r_{U_C}] = \lim_{n \to \infty} \frac{1}{n}\sum_{j=1}^{n}\sum_{m=1}^{F_C} \frac{R_{\tilde{k}}[m, j]}{F_C}, \quad (37)$$

$$\tilde{k} \in \{1, 2, \ldots U_C\},$$

where the expectation on the left hand side can be over the joint pdf of all channel gains between users and their serving and interfering base stations. The spatial averaged subchannel macrocell throughput can be obtained by averaging equation (37) with respect to the joint pdf $f_{R_1, \ldots, R_{U_c}}(\cdot)$ and can be given as:

$$T_C(\rho, U_C) = E_{R_1, \ldots, R_{U_c}} |E|\overline{R}(F_C, U_C)R_1 = r_1, \ldots R_{U_c} = r_{U_c}|. \tag{38}$$

Figure 16B:
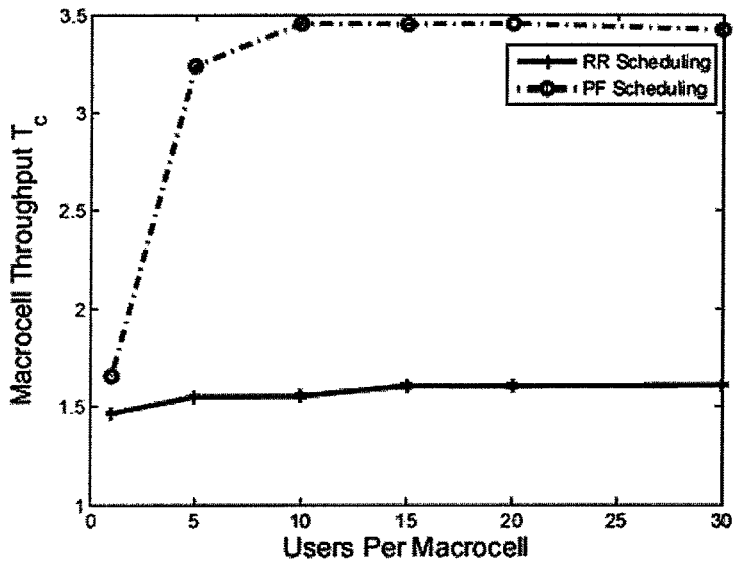

Using equation (38) to compute $T_c(\rho, U_c)$ can be analytically intractable. In an embodiment of the invention, numerical simulation can be used to empirically estimate Tc($\rho$, $U_c$), which can be used to derive the bandwidth partitioning. In the simulation, the number of subchannels can be set as $F_c=1$ with a link bandwidth W=15 KHz and a PF window parameter N=500 OFDM symbols. Each mobile can be moving at v=13.34 m/s (30 mph) and the per-link throughput of equation (37) can be averaged over 500 drops, with 8000 trials/drop for modeling time-varying Rayleigh fading—which can model propagation environments with scattering and no direct line-of-sight component. The Rayleigh fading can be held fixed over a duration Tc=0.4/$f_d$ where $$f_d = \frac{vf_c}{3 \times 10^8}$$

is the Doppler frequency at a carrier frequency $f_c$=2 GHz. FIG. 16(b) compares the performance of PF (numerically evaluated) versus RR scheduling for different $U_c$ (with $\alpha_c$=4). Exploiting channel variations through proportional fairness can roughly double the expected subchannel throughput.

C. Femtocell Throughput

In another embodiment, since femtocells can be modeled as randomly placed on $R^2$ according to a SPPP $\Phi_f$ with intensity $\lambda_f$, the interference experienced by a femtocell user can depend on the distances of these interfering base stations relative to the user and their respective channel gains. Using F-ALOHA, the interfering femtocells can form a marked SPPP $\Lambda_f \subseteq \Phi_f$ with intensity $\rho\lambda_f$. In a given frequency subchannel, the cochannel interference $I_{f,f}$ experienced by a user 0 within femtocell $F_0$ can be given as:

$$I_{f,f} = \sum_{k \in \Lambda_f} A_f \Theta_{0k} |h_{0k}|^2 |x_{0k}|^{-\alpha_f}, \tag{39}$$

where $\Theta_{0k} \sim LN(\zeta\mu_{fo,dB}, \zeta^2\sigma_{fo,dB}^2)$ represents the lognormal shadowing from femtocell $F_k$ to user 0 and $|h_{0k}|^2$ is the exponentially distributed channel power between interfering femtocell $F_k$ and user 0 inside $F_0$. Denoting the exponentially distributed channel power between $F_0$ and user 0 as $|h_0|^2$, the received SIR can be given as:

$$SIR_f = \frac{B_f \Theta_0 |h_0|^2 |R_f|^{-\beta_f}}{\sum_{k \in \Lambda_f} A_f \Theta_{0k} |h_{0k}|^2 |x_{0k}|^{-\alpha_f}}. \tag{40}$$

Here, user 0 is assumed to be on the edge of the home femtocell $F_0$ and $x_{0k}$ represents the locations of the interfering femtocells $F_k$ with respect to user 0. The term $\Theta_0 \sim LN(\zeta\mu_{fi,dB}, \zeta^2\sigma_{fi,dB}^2)$ is the indoor lognormal shadowing, and $\Psi_0 \triangleq \Theta_0 |h_0|^2$ [resp. $\Psi_{0k} \triangleq \Theta_{0k} |h_{0k}|^2$] is the effective channel gains from the desired [resp. interfering base station]. The terms $\alpha_f$ [resp. $\beta_f$] represent the path-loss exponents resulting from interfering transmissions [resp. in-home transmissions] to the user of interest. A simple model can be used to distinguish between the fixed losses arising from in-home and interfering transmissions. Specifically, home users can be insulated against interfering femtocell transmissions through double penetration losses arising from external wall partitions. Consequently, $A_f$ and $B_f$ (in dB) are related as $A_{f,dB} = B_{f,dB} + 2P_{f,dB}$ where $$P_f = \sqrt{\frac{A_f}{B_f}}$$

is the wall penetration loss.

Using Assumption 5. The channel gain $\Theta_0 |h_0|^2$ can be approximated as a lognormal rv $\Psi_0 \sim LN(\mu_S, \sigma_s^2)$. Similarly, the channel gains $\Theta_{0k} |h_{0k}|^2 \square k$ can be approximated as iid rv's distributed as $\Psi_0 \sim LN(\mu_I, \sigma_I^2)$. Equation (40) then can be simplified to:

$$SIR_f = \frac{\Psi_0 |R_f|^{-\beta_f}}{\sum_{k \in \Lambda_f} P_f^2 \Psi_{0k} |x_k|^{-\alpha_f}}. \tag{41}$$

The closed form distribution of the Poisson SNP $$I_{f,f} = \sum_{k \in \Lambda_f} P_f^2 \psi_{0k} |x_k|^{-\alpha_f}$$

is known when $\alpha_f$=4. However, tight lower bounds on $Pr(I_{f,f} > y)$ can be obtained by considering femtocells whose interference individually exceeds y. Using this idea, the following lemma can provide an asymptotically tight lower bound on the tail distribution of $I_{f,f}$.

Lemma 2. With randomized transmissions and lacking power control, the lower bound on distribution $I_{f,f}$ can be given as:

$$Pr(I_{f,f} > y) \geq 1 - \exp|-\pi\lambda_f \rho_f E |\Psi_I^{\delta_f}| P_f^{2\delta_f} y^{-\delta_f}|, \tag{42}$$

where $$\delta_f \triangleq \frac{2}{\alpha_f}.$$

When $\alpha_f$=4, $I_{f,f}$ can be distributed as:

$$Pr(I_{f,f} > y) = 1 - erfc\left(\frac{\pi^{3/2} \lambda_f \rho_f P_f E |\Psi^{1/2}|}{2\sqrt{y}}\right). \tag{43}$$

Lemma 2 can provide the relationship between the density $\lambda_f \rho_f$ of interfering femtocells in $\Lambda_f$ and the distribution of the CCI at a femtocell. For fixed y, as $\rho_f \to 0$, the tail probability $Pr(I_{f,f} > y) \to 0$ in equation (42) indicating that selecting fewer subchannels using F-ALOHA transmission can provide greater resilience against persistent collisions from nearby femtocells. The distribution of the femtocell SIR in equation (40) can be obtained as:

$$Pr(SIR_f \leq \Gamma) = Pr\left(\frac{\Psi_0 |R_f|^{-\beta_f}}{\sum_{k \in \Lambda_f} P_f^2 \Psi_{0k} |x_k|^{-\alpha_f}} \leq \Gamma\right) = \quad (44)$$

$$E_{\Psi_0}\left[Pr\left(\sum_{k \in \Lambda_f} P_f^2 \Psi_{0k} |x_k|^{-\alpha_f} \geq \frac{\psi_0 |R_f|^{-\beta_f}}{\Gamma}\middle| \Psi_0 = \psi_0\right)\right] \geq \quad (45)$$

$$1 - E_{\Psi_0}\left\{\exp\left[-\pi\lambda_f \rho_f E\left|\Psi_I^{\delta_f}\right|\left(\frac{P_f^2 \Gamma}{\Psi_0 |R_f|^{-\beta_f}}\right)^{\delta_f}\right]\right\} = \quad (46)$$

$$1 - E_{\Psi_0}\left|\exp\left(-\rho_f k_f \Gamma^{\delta_f} \Psi_0^{-\delta_f}\right)\right| \quad (47)$$

where, $\kappa_f \triangleq \pi\lambda_f E|\Psi_f^{\delta_f}|(P_f^2|R_f|^{\rho_f})^{\delta_f}$, where equations (45) and (46) follow by conditioning on $\Psi_0$, assuming independence of $\Psi_0$ and $\Psi_{0k}$ $\forall k{:}{\in}\Lambda_f$, and applying equation (42). Although it may not be possible to obtain a closed form expression for the expectation in equation (47), the distribution $SIR_f$ can be calculated numerically. The mean subchannel throughput $T_f$ can be calculated by combining equations (14) and (47):

$$T_f(\rho_f \lambda_f) = \sum_{l=1}^{L-1} l \cdot Pr(\Gamma_l \leq SIR_f < \Gamma_{l+1}) + L \cdot Pr(SIR_f \geq \Gamma_{l+1}) \approx \quad (48)$$

$$\sum_{l=1}^{L-1} l \cdot E_{\Psi_0}\left|\exp\left(-\rho_f \kappa_f \Gamma_{l+1}^{\delta_f} \Psi_0^{-\delta_f}\right) - \exp\left(-\rho_f \kappa_f \Gamma_l^{\delta_f} \Psi_0^{-\delta_f}\right)\right| + \quad (49)$$

$$L \cdot E_{\Psi_0}\left|\exp\left(-\rho_f \kappa_f \Gamma_l^{\delta_f} \Psi_0^{-\delta_f}\right)\right|.$$

Figure 17:
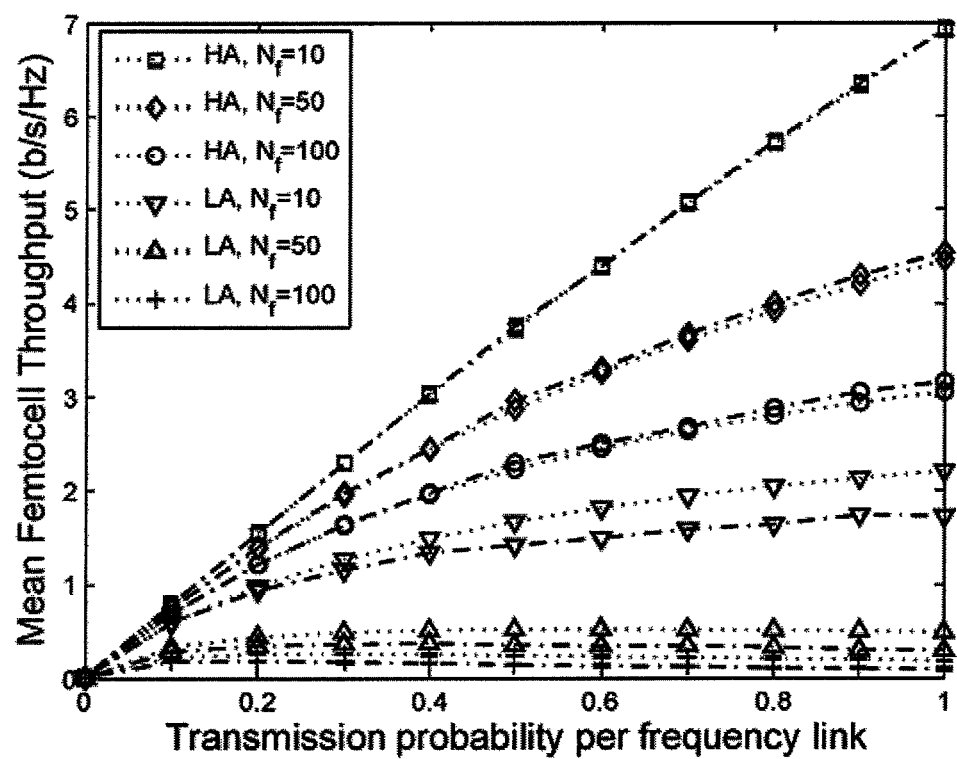
FIG. 17 illustrates theoretical and empirical throughput per femtocell $\rho_1 T_1$.

The approximation in equation (48) is because the right-hand side in equation (47) is a lower bound on $Pr(SIR_f \leq \Gamma)$. FIG. 17 plots the femtocell throughput $(1-\rho)\rho_f T_f$ (in b/s/Hz) assuming the entire bandwidth is allocated to femtocells ($\rho=0$). Two cases are considered, namely (1) high attenuation (marked "HA" with $\alpha_f=4$, $P_{f,dB}=10$) and (2) low attenuation (marked "LA" with $\alpha_f=3.5$, $P_{f,dB}=2$) from neighboring femtocells. Setting $\rho_f=1$ and assuming $N_f=50$ femtocells/cell site, the femtocell throughput falls from approximately 4.5 b/s/Hz in a HA environment to nearly 0.5 b/s/Hz in an LA scenario, including the sensitivity of femtocell throughput to propagation from nearby femtocells.

To calculate the optimum $\rho_f$, the maximum ASE per subchannel may be maximized. This can be analogous to answering the question: What fraction of subchannels should each femtocell access to maximize spatial reuse? At this $\rho_f$, the F-ALOHA access by each femtocell can be optimally traded off against neighboring femtocell interference in each subchannel. Mathematically, $\rho_f$ is the solution to the following optimization problem:

$$\rho_f^* = \lambda_f \arg\max_{0 \leq \theta \leq 1} \theta T_f(\theta \lambda_f) \quad (50)$$

$$ASE_f^* = \rho_f^* \lambda_f T_f(\rho_f^* \lambda_f). \quad (51)$$

To justify equation (50), observe that there can be an average of $|H|\rho\lambda_f$ transmitting femtocells per subchannel. With F-ALOHA access of $0<\Theta\leq 1$, each femtocell can obtain an average subchannel throughput of $T_f(\Theta)$, which can result in $ASE_f$ equaling $\lambda_f \Theta \cdot T_f(\Theta \lambda_f)$. Alternatively, given any allocation $\rho$, equation (50) can compute the F-ALOHA spectrum access $\rho_f$ which can maximize the mean overall throughput $(1-\rho)\rho_f T_f(\rho_f \lambda_f)$ per femtocell.

In one embodiment, the ASE in equation (50) only depends on the effective intensity $\lambda_f \Theta$ of interfering femtocells per subchannel. With increasing $\lambda_f$, provided $\rho^*_f<1$, the intensity of $\Lambda_f$ can be given as $\lambda_f \rho^*_f$ and remains constant, implying that the optimal $\rho_f$ is a monotone decreasing function of $\lambda_f$. Consequently, if $\rho_f<1$ for a given $\lambda_f$, the maximum ASE per subchannel is fixed. This means that with increasing $\lambda_f$, the network-wide femtocell throughput equaling $|\mathcal{H}|W$ F·$(1-\rho)$ASE$^*_f$ grow linearly with $(1-\rho)$.

Figure 18A:
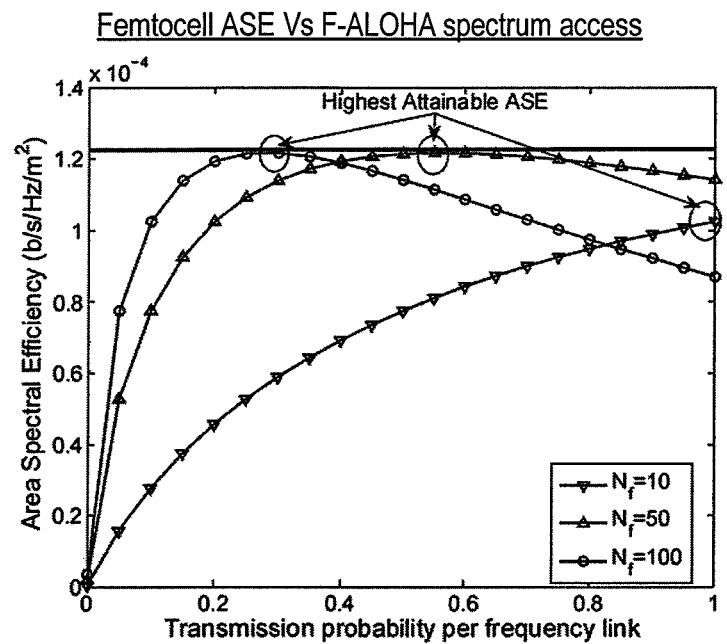
FIGS. 18A and 18B illustrate femtocell area spectral efficiencies.
Figure 18B:
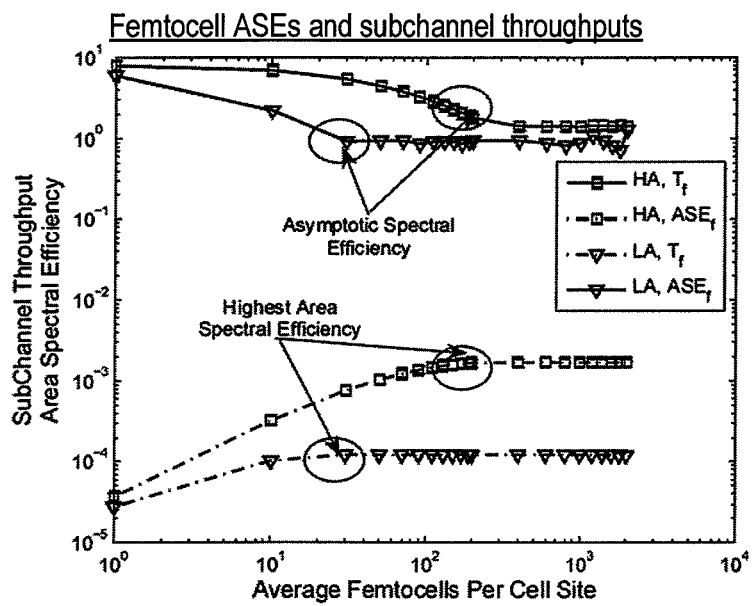

FIG. 18a illustrates a plot of equation (50) for different $N_f$ with $\alpha_f=3.5$ and $P_{f,dB}=2$. In all cases, the highest ASE is fixed at nearly 0.000121 b/s/Hz/m$^2$, indicating that the spatial reuse provided by femtocells does not increase further when the number of femtocells increases from an average of 50 femtocells/cell site to 100 femtocells/cell site. With a low femtocell density ($N_f=10$), a desirable strategy can be to access the entire spectrum from bandwidth partitioning. In a dense network ($N_f=100$), the ASE can be maximized when each femtocell accesses approximately 30% of the available spectrum. Furthermore, in equation (50), as long as $\rho^*_f=1$, each femtocell can access the entire available spectrum $(1-\rho)$, consequently Tf decreases with addition of femtocells. However, if $\rho^*_f<1$, $T_f=ASE_f/(\lambda_f \rho^*_f)$ remains constant with increasing $\lambda_f$ (see FIG. 18(b)). However, as $\lambda_f \to \infty$, since $\rho \in (0, 1)$, the mean overall throughput per femtocell approaches zero, as the following limit shows:

$$\lim_{\lambda_f \to \infty} T_f(1-\rho)\rho_f \leq \lim_{\lambda_f \to \infty} T_f \rho_f = 0. \quad (52)$$

One may explore the dependence of the mean overall femtocell throughput $T_f \rho_f (1-\rho)$ on the spectrum allocation $\rho$ and F-ALOHA access $\rho_f$. Equivalently: With increasing femtocell density $\lambda_f$, can increasing allocated spectrum $(1-\rho)$ to femtocells counterbalance decreasing spectrum access $\rho_f$ to result in a higher mean femtocell throughput?

In an embodiment, given an allocation $\rho_t$ at femtocell density let $\lambda_f$, $T_{f,t}$ and $\rho_{f,t}$ be the mean subchannel throughput and the optimal F-ALOHA access respectively. On increasing $\lambda_f$ by $\delta \lambda_f$ with allocation $\rho_h$, let the corresponding quantities equal $T_{f,h}$ and $\rho_{f,h}$. The femtocell network can be defined as fully-utilized [resp. sub-utilized] if a marginal increment in the femtocell density reduces [resp. improves] the mean throughput per femtocell as given below:

$$(1-\rho_t)\rho_{f,t}T_{f,t} \gtreqless (1-\rho_h)\rho_{f,h}T_{f,h} \Leftrightarrow \quad (53)$$

$$(1-\rho_t)\frac{ASE_{f,t}}{\lambda_f} \gtreqless (1-\rho_h)\frac{ASE_{f,h}}{\lambda_f + \delta\lambda_f} \Leftrightarrow$$

$$\frac{1-\rho_h}{1-\rho_t} \gtreqless \frac{ASE_{f,t}}{ASE_{f,h}} \cdot \frac{\lambda_f + \delta\lambda_f}{\lambda_f} = \frac{T_{f,t}}{T_{f,h}} \frac{\rho_{f,t}}{\rho_{f,h}}.$$

Equation (53) reflects the competing effects of increasing allocation $(1-\rho)$ and decreasing F-ALOHA access $\rho_f$ (or increasing $\lambda_f$) in determining the net femtocell throughput.

IV. Numerical Results

The following provides the results of a simulation of embodiments of the present invention. Results are presented in FIGS. 19 through 22 with the system parameters in FIG. 23. The number of users in each tier is controlled by varying $N_f$. To model varying data-rate requirements inside femtocells relative to the central macrocell, QoS values of $\eta=0.5$ (equal per-user throughputs in each tier) and η=0.01 (favoring 100× higher throughput/femtocell user relative to macrocell users) are considered. Two propagation scenarios are presented namely 1) High Attenuation (HA) of neighboring femtocell transmissions-modeling low interference—with parameters $\alpha_f$=4 and $P_{f,dB}$=10 and 2) Low Attenuation (LA) scenario by setting $\alpha_f$=3.5 and $P_{f,dB}$=2.

Figure 19:
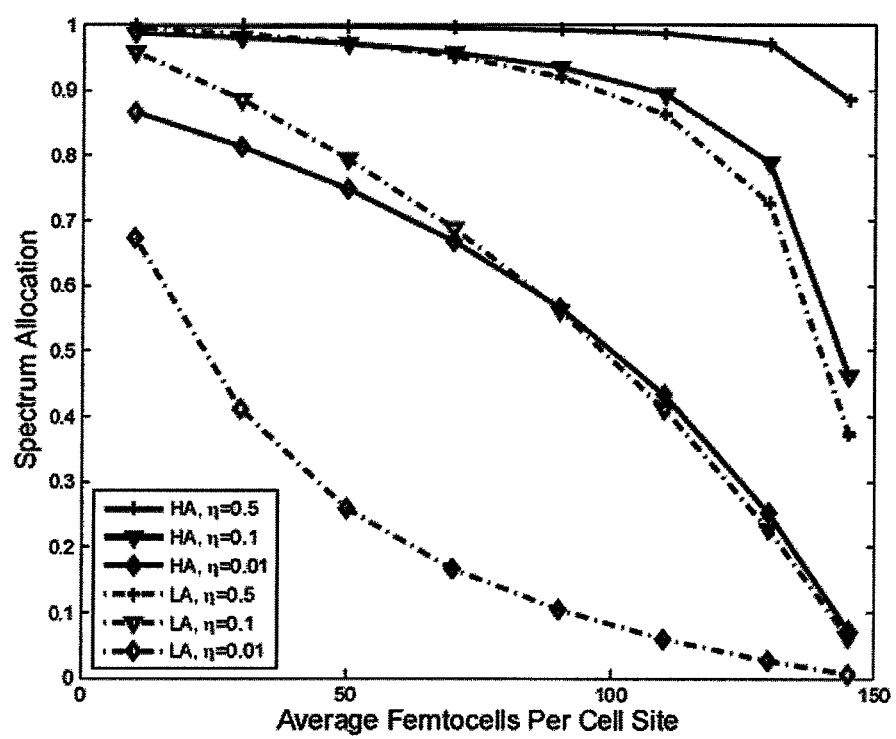
FIG. 19 illustrates optimal spectrum allocation p for varying Quality of Service (QoS) parameter $\eta$.

FIG. 19 shows the allocation using (19) with RR scheduling per-tier for varying QoS parameter η. With equal average per-user throughputs (η=0.5), nearly 90% of the overall bandwidth is assigned to the macrocell. The central macrocell serves a higher number of users, who experience relatively poor reception. Equalizing per-user throughputs consequently requires a significantly higher allocation to the macrocell. As η decreases, femtocells require more spectrum for providing greater indoor capacity; e.g. in a LA scenario with η=0.01 and $N_f$=50 femtocells/cell site, nearly 70% of spectrum is allocated to femtocells.

Figure 20:
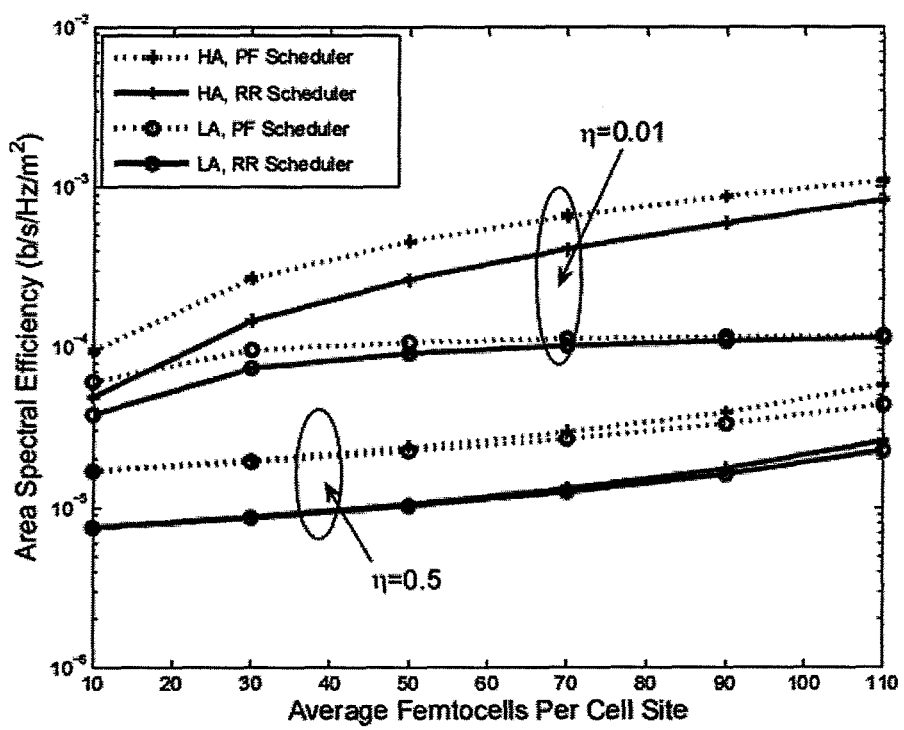
FIG. 20 illustrates area spectral efficiencies in a two-tier network for varying QoS parameter $\eta$.

FIG. 20 plots the ASEs of the two-tier network using (16) for varying QoS parameter η. In a LA scenario with η=0.01, the high degree of co-channel interference results in the ASE maximized with fewer than $N_f$=50 femtocells. Following Remark 2, this indicates that adding more femtocells does not provide additional spatial reuse. In all other cases, the ASEs monotonically increase with $N_f$ indicating increasing spatial reuse with addition of femtocells. To show benefits of opportunistic scheduling, a PF scheduler provides nearly 2.3× [resp. 1.35×] ASE gains relative to a RR scheduler in a HA scenario with QoS parameter η=0.5 [resp. η=0.01] and $N_f$=110 femtocells/cell site.

Figure 21:
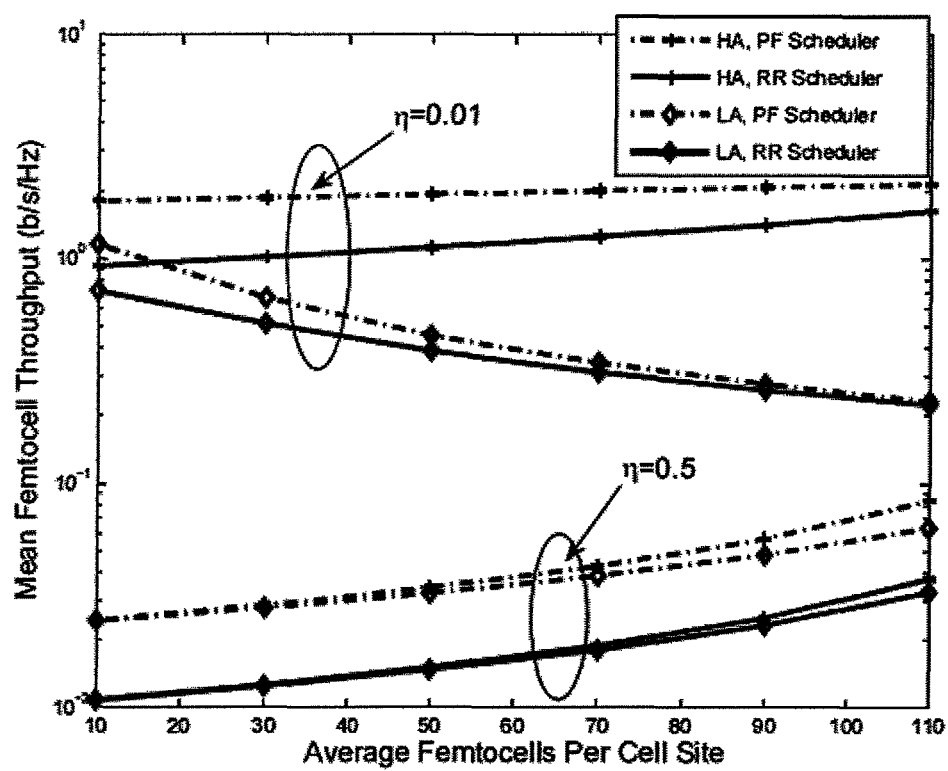
FIG. 21 illustrates the average network-wide throughput $\rho_1 T_1 (1-\rho)$ provided by femtocells in their allocated spectrum $(1-\rho)$.

FIG. 21 plots the expected throughput per femtocell $(1-\rho)\rho_f T_f$ as a function of $N_f$ and η. For η=0.5, the throughputs monotonically increase with $N_f$ indicating that increasing spectrum allocation $(1-\rho)$ counteracts the effects of decreasing $\rho_f T_f$; in effect, the femtocell network is sub-utilized. With η=0.01 in a LA environment however, the femtocell throughputs decrease with increasing $N_f$, indicating that the femtocell network is fully-utilized.

Figure 22:
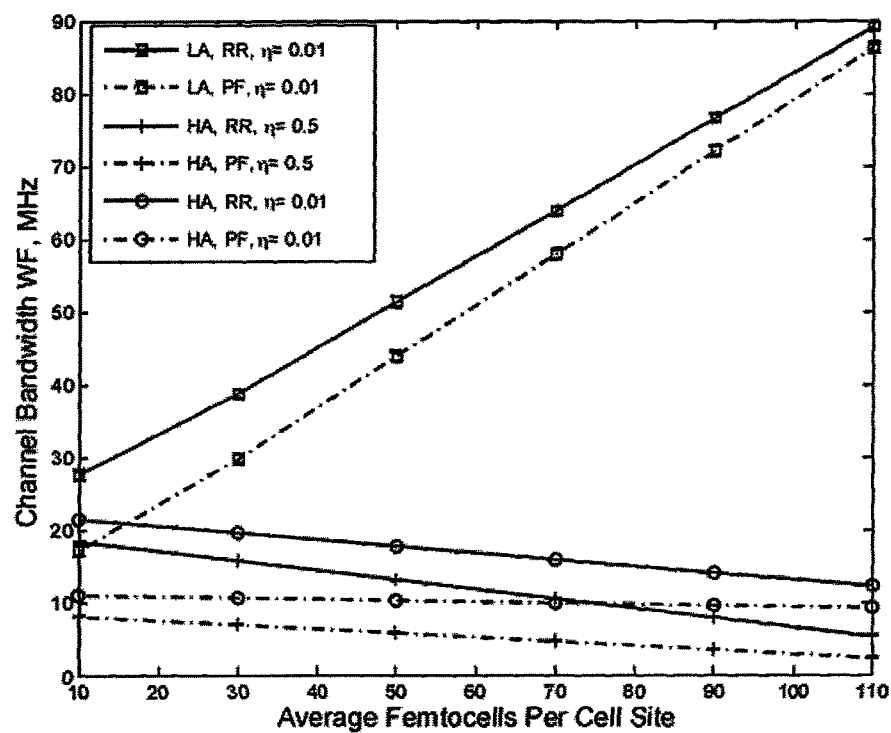
FIG. 22 illustrates the spectrum WF meeting a target average data rate of $D_c=0.1$ Mbps for each macrocell user, given Round-Robin and Proportional-Fair scheduling at the macrocell.

FIG. 22 plots the minimum required spectrum WF, which satisfies a target average data rate of $D_c$=0.1 Mbps for each macrocell user, given RR and PF scheduling at the macrocell. For each femtocell, corresponding to QoS parameter values η=0.5 and η=0.01, target average data rates $D_f$=$D_c$ $(1-\eta)/\eta$ equaling 0.1 and 10 Mbps/user are considered. Since Proposition 1 ensures that the QoS constraint in (17) is binding, the required spectrum WF is given as:

$$WF = \frac{U_c}{\rho T_c}D_c = \frac{U_f}{(1-\rho)\rho_f T_f}D_f \qquad (54)$$

Two key observations are: First, a channel aware macrocell may provide significant savings in the spectrum necessary to meet $D_f$ and $D_c$; e.g., with η=0.01 and $N_f$=50 femtocells/cell site in a HA scenario, the spectrum reduction is nearly 50% (10 MHz). Next, spatial reuse and spectrum requirements with the addition of femtocells may be markedly different depending on attenuation from neighboring femtocells. For example, in a LA [resp. HA] scenario, the spectrum requirement WF increases [resp. decreases] with increasing hotspot density indicating the femtocell network is fully-utilized [resp. sub-utilized] with the per-tier spectrum allocation in equation (19).

V. Conclusions

Embodiments of the present invention propose a decentralized spectrum allocation strategy as an alternative to centralized/coordinated frequency assignment in a two-tier network. The proposed allocation may depend on the per-tier throughputs, the loading of users in each tier and the QoS requirements, accounting for co-channel interference and path-losses. With a randomized spectrum access strategy, femtocells should, according to one embodiment, access a decreasing fraction of their allocated spectrum with increasing femtocell density, in order to maximize spatial reuse. Spatial reuse benefits derived from channel aware macrocell scheduling result in nearly 50% spectrum reduction for meeting target per-tier data rates. In a low interference scenario where addition of hotspots provides increased spatial reuse, the spectrum requirement is unchanged up to 110 femtocells/cell site. On the other hand, the limited spatial reuse in high interference scenarios may necessitate increasing spectrum with addition of femtocells. These insights provide guidelines on performance of decentralized spectrum allocation in the two-tier networks.

Techniques for Reducing Interference in a Two-Tier MIMO Cellular Network

Another embodiment of the invention proposes use of multiple antennas—also called Multiple-Input-Multiple-Output (MIMO) transmission—at the central macrocell/femtocells. As noted above, MIMO provides extra degrees of freedom (spatial diversity) to combat cross-tier interference in a two-tier network with universal frequency reuse. Specifically, using multiple antennas may enable a femtocell to either (a) eliminate cross-tier interference to nearby cellular users in a closed-access system by nulling their beams in the direction of a nearby cellular user, or (b) handoff nearby cellular users and boost their signal strength through array processing.

With MIMO, another embodiment of the invention may enable a group of geographically close femtocells—to reduce communication latency—to combine their antenna resources for collaboratively canceling cross-tier interference to nearby cellular user(s). So, even if a single femtocell cannot cancel its interference because it does not have sufficient antennas (i.e., degrees of freedom), if there are too many cellular users in its vicinity, this technique may overcome this difficulty as the collaborating femtocells possess extra degrees of freedom to eliminate cross-tier interference. This technique may require the collaborating femtocells to exchange their respective channel information (CI) with a nearby cellular user over the backhaul network.

With MIMO, yet another embodiment of the invention may provide an adaptive power control technique (with closed-access) and a handoff policy to femtocells (with open access) in a two-tier MIMO cellular system with universal frequency reuse. With closed access, this technique may enable femtocells to determine their maximum transmit power in order to guarantee a certain minimum Quality-of-Service (QoS) to a nearby cellular user. The transmit power may be derived as a function of the number of antennas at the macrocell/femtocells, fixed and variable components of indoor and outdoor path-losses which arise during terrestrial propagation of wireless signals, and fast fading channel scenarios (e.g. Rayleigh fading). In open access systems, the same embodiment may be used to determine the locations of cellular users with respect to their central macrocell, wherein a nearby femtocell may provide the outdoor cellular user with better QoS (through a handoff of the cellular user to the nearby femtocell).

Yet another embodiment of the invention with MIMO may provide a policy to handoff an indoor user from its femtocell to the central macrocell as a function of the number of antennas at the macrocell/femtocells, fixed and variable components of indoor and outdoor path-losses which arise during terrestrial propagation of wireless signals, and fast fading channel scenarios (e.g. Rayleigh fading). Such a scenario may arise because a femtocell which is located geographically close to the central macrocell may experience unacceptable cross-tier interference; consequently an indoor user may receive better Quality-of-Service by communicating with the central macrocell.

The following provides a more detailed description of this embodiment of the present invention.

Interference Mitigation using Spatial Diversity in Two-Tier Networks

I. Motivation

Figure 24:
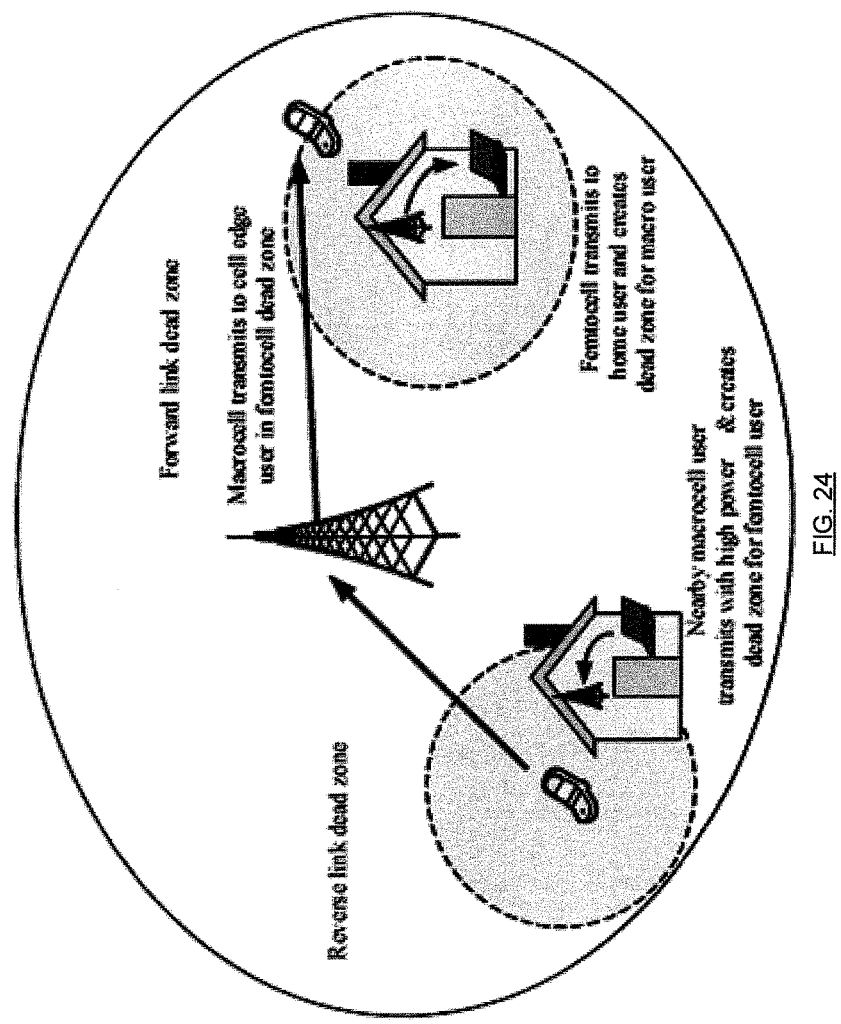
FIG. 24 illustrates dead zones caused by cross-tier interference in a shared spectrum two-tier network.

In a co-channel deployment of femtocells (also known as a femtocell underlay), cross-tier interference may become a capacity-limiting factor. With closed access, a cellular user (communicating with the central macrocell) in the vicinity of an active femtocell may suffer unacceptable interference. The ensuing "dead zone" around the femtocell, which is illustrated in FIG. 24, can result in poor outdoor cellular reception.

Embodiments of the present invention propose two prior approaches to tackle cross-tier interference in a shared spectrum two-tier network namely 1) interference avoidance and 2) interference aware power control schemes at each femtocell. Employing multiple antennas at a femtocell base station (BS) can offer a third possibility namely to utilize the available spatial degrees of freedom at the femtocell to serve multiple indoor users and eliminate interference at outdoor cellular users.

According to one embodiment, multiple antennas at femtocells can be used to serve multiple indoor users—providing multiplexing gain, and eliminating cross-tier interference by nulling transmissions in the direction of a nearby cellular user. Consequently, an outdoor cellular user can obtain reliable reception even though it is in the vicinity of an active femtocell. Additionally, indoor users can continue to experience the superior reception which was a primary reason why they installed a femtocell in the first place.

Since a femtocell may have only a limited number of antennas, sacrificing these degrees of freedom for interference cancellation may result in a tradeoff due to smaller multiplexing gain. On the other hand, the co-channel interference at a nearby cellular user may be severe enough to force femtocells to expend resources to tackle the interference issue. The questions to be addressed are as follows:

1) Given a performance metric which is the weighted sum of the achievable rates provided by the macrocell and femtocell respectively, to how many cellular users should a femtocell cancel its interference? Alternatively, how many users should a femtocell serve in each signaling interval? How does this depend on the path losses between the femtocell and the macrocell to the cellular user?

2) With a small number of transmit antenna per femtocell, the available degrees of freedom at each femtocell may not be sufficient to perform interference cancellation. How can multiple femtocells "group" to cooperatively cancel their interference to nearby cellular users?

II. System Model

Figure 25:
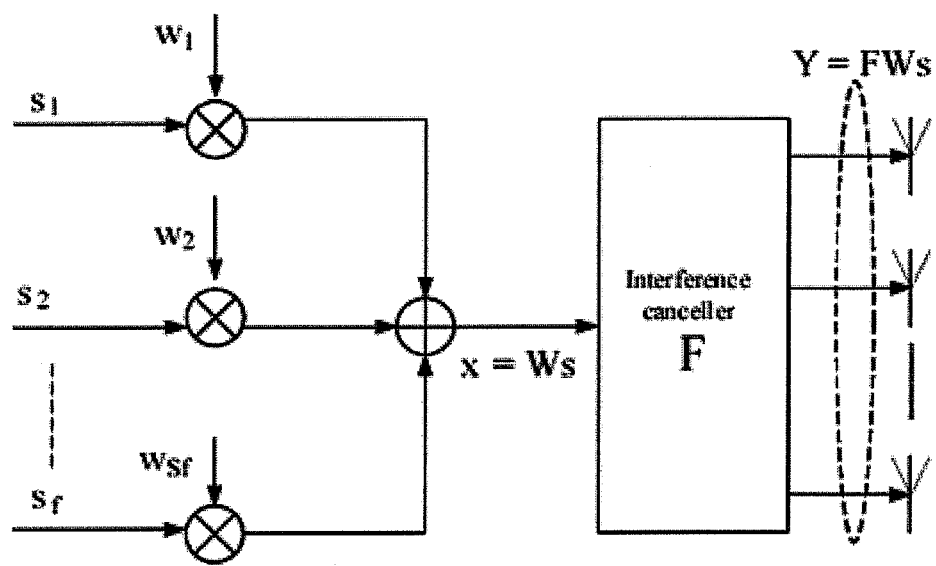
FIG. 25 illustrates transmission scheme at femtocell.

For simplicity, assume a single central macrocell $B_0$ with $T_c$ antennas and a single femtocell $B_1$ with $T_f$ antennas. Assume that $B_0$ transmits to a set $S_c$ consisting of $S_c$ users ($1 \leq S_c \leq T_c$) users/slot. As illustrated in FIG. 25 (in which $S_f$ refers to the number of active users in femtocell, $s_f$ is the data symbol for indoor user f, w represents the beamforming vector per femtocell user, and F represents the linear pre-canceler to null interference to cellular user), the femtocell transmits to a set $S_f$ consisting of $S_f$ users/slot where $1 \leq S_f \leq T_f$. Here the term "slot" can refer to a time/frequency/orthogonal code resource.

Assume femtocell $B_1$ cancels its interference to a subset $S_{c,f} \subseteq S_c$ consisting of $S_{c,f} = |S_{c,f}|$ cellular users. Because of the dimensionality constraint, the number of scheduled indoor users $S_f$ can be no more than $T_f - S_{c,f}$.

Assumption 1: Perfect channel information is assumed at the femtocell regarding its channels to users in $S_f$ as well as $S_{c,f}$.

Designate the matrix $Q^{\dagger} = [g_1 \ g_2 \ \ldots \ g_{S_{c,f}}]$ to consist of the vector channels between $B_1$ and each user in $S_f$. For canceling interference, $B_1$ designs a precoder F which lies in the $T_f - |S_f|$ dimensional null space of $Q \in \mathbb{C}^{S_{c,f} \times T_f}$. For example, if $S_f = 1$ (one user per femtocell), the precoder F can be chosen to be the orthogonal projector $$I - \frac{g_1 g_1^{\dagger}}{\|g\|^2}.$$

In the general case, one chooses $F \in \mathbb{C} \ T_f \times (S - S_{c,f})$ to equal the $T_f - S_{c,f}$ right singular vectors in the full SVD decomposition of $Q \in \mathbb{C}^{S_{c,f} \times T_f}$.

Assume that $B_1$ serves multiple indoor users by designing unit-norm beamforming vectors $\{w_i\}$ which lie in the null space of Q. In addition, the symbol vector s consisting of the information symbols to the $S_f$ indoor users satisfies the individual power constraint $\mathbb{E}[\|s\|^2] = P_f$. Ignoring cross-tier interference from the macrocell $B_0$ at each indoor user, the received signal model for a femtocell user can be represented as:

$$y_i = \sqrt{\gamma} \ g_i^{\dagger} F \sum_{j=1}^{S_f} w_j s_j + n_i, \qquad (55)$$

$$\forall \ i \in S_{c,j}$$

where γ is the channel power from the femtocell to indoor users.

Assuming $S_f \leq T_f - S_{c,f}$ active indoor users at femtocell $B_1$, the ergodic sum rate provided by $B_1$ is given as:

$$R_{Femto}[S_f] = S_f \cdot \mathbb{E}\left[\log_2\left(1 + \frac{\gamma \frac{P_f}{S_f} |w_1^{\dagger} g_1|^2}{\sum_{j \neq i} \gamma \frac{P_f}{S_f} |w_j^{\dagger} g_1|^2 + \sigma^2}\right)\right] \qquad (56)$$

As seen in equation (56), setting $S_{c,f} = S_f$ can allow a femtocell to achieve its full multiplexing gain but can result in maximum cross-tier interference to cellular users. Conversely, setting $S_{c,f} = 1$ allows a femtocell to cancel cross-tier interference to $S_f - 1$ cellular users, but can allow a multiplexing gain of just 1.

From the macrocell $B_0$'s perspective, there are two sets of cellular users namely 1) the $|S_{c,f}|$ cellular users to which $B_1$ cancels its interference, and 2) the remaining $|S \setminus S_{c,f}|$ cellular users who communicate with $B_0$ but experience cross-tier interference (given two sets A and $B \subseteq A$, the notation $A \setminus B$ denotes the set $A \cap_B C$).

Assumption 2: All cellular users experience identical channel powers $\alpha$ and $\beta$ to the macrocell $B_0$ and femtocell $B_1$ respectively.

Figure 26:
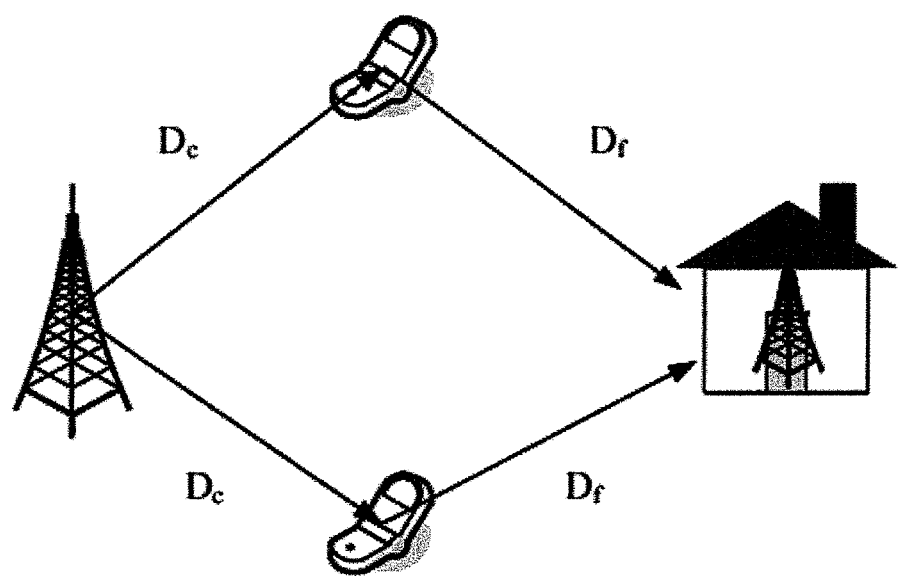
FIG. 26 illustrates examples showing two cellular users experiencing equal path-losses to $B_0$ and $B_1$ respectively.

Assumption 2 can be justified if one assumes that users in $S_{c,f}$ are situated in the vicinity of a femtocell (see FIG. 26 for example wherein $D_c$ represents the distance of cellular user to macrocell, and $D_f$ represents the distance of cellular user to femtocell), or alternatively assuming that these users are co-located from each BS's perspective.

Designate the matrix $H^\dagger = [h_1 \ h_2 \ \ldots \ h_{S_c}]$ consisting of the $(T_c \times 1)$ vector channels between the central macrocell $B_0$ and each cellular user in $S_c$. Assume that $B_0$ employs a set of beamforming vectors $\{v_j\}, \|v_j\|=1$ to serve multiple cellular users. With zero-forcing beamforming (ZFBF) for example, $\{v_j\}$ are chosen as the normalized columns of the matrix $H^\dagger(HH^\dagger)^{-1}$. The received signal for a cellular user in $S_{c,f}$ [resp. $S \backslash S_{c,f}$] can be given as:

$$y_i = \sqrt{\alpha} \, h_i^\dagger \sum_{j=1}^{S_c} v_j s_j + n_i \ \forall \ i \in S_{c,f} \quad (57)$$

$$y_i = \sqrt{\alpha} \, h_i^\dagger \sum_{j=1}^{S_c - S_{c,f}} v_j s_j + \sqrt{\beta} \, g_i^\dagger F \sum_{k=1}^{S_f} w_k s_k + n_i \ \forall \ i \in S \backslash S_{c,f}$$

For a given set of channel powers $\alpha$ and $\beta$ and a representative user 1 in $S_{c,f}$ [resp. 2 in $S_c \backslash S_{c,f}$] and assuming equal power allocation, the ergodic sum rate for the macrocell can be given as:

$$R_{Macro} = S_{c,f} \cdot \mathbb{E} \left[ \log_2 \left( 1 + \frac{\frac{\alpha P_c}{S_c}|v_i^\dagger h_1|^2}{\sum_{j \neq i} \frac{\alpha P_c}{S_c}|v_j^\dagger h_1|^2 + \sigma^2} \right) \right] + (S_c - S_{c,f}) \cdot \mathbb{E} \left[ \log_2 \left( 1 + \frac{\frac{\alpha P_c}{S_c}|v_i^\dagger h_2|^2}{\sum_{j \neq i} \frac{\alpha P_c}{S_c}|v_j^\dagger h_2|^2 + \sum_{l=1}^{S_f} \frac{\beta P_f}{S_f}|w_l^\dagger F g_2|^2 + \sigma^2} \right) \right] \quad (58)$$

$$= R_{Macro}(S_{c,f}) + R_{Macro}(S_c \backslash S_{c,f})$$

where $R_{Macro}(S_{c,f})$ and $R_{Macro}(S \backslash S_{c,f})$ designate the ergodic sum rates obtained by cellular users in $S_{c,f}$ and $S \backslash S_{c,f}$ respectively.

A. Served Users Per Femtocell to Maximize Weighted Ergodic Sum Rate

One objective is to determine the optimal number of femtocell users that should be scheduled in order to maximize the weighted ergodic sum rates provided to indoor users and cellular users in Sc,f. Allocate weights $\theta$, $0 \leq \theta \leq 1$ and $1-\Theta$ to the femtocell and macrocell rates in equations (56) and (58) respectively. Then, maximizing the convex combination of the per-tier rates results in the Pareto-frontier of the system. One question posed herein is: Given pathlosses $\alpha$ and $\beta$ and a weighting parameter $\theta$, how many users should a femtocell serve? According to embodiments of the present invention, the number of served indoor users may be given as the solution to the following optimization problem:

$$\tilde{S}_{c,f}(\theta) = \underset{1 \leq S_f \leq T_f}{\operatorname{argmax}} \theta R_{Femto}[S_{c,f}] + 1(1-\theta) R_{Macro}(S_{c,f}) \quad (59)$$

In (59), the quantity $\hat{S}_f(\theta)$ is a function of the channel powers parameterized by $\alpha$ and $\beta$, respectively.

B. Maximize Instantaneous Weighted Sum Rate with User Selection and Limited Feedback The scenario considered here is that a femtocell decides a certain set of indoor users $S_f$ and a set of cellular users $S_{c,f}$, in order to maximize the instantaneous sum rate. The user selection may be conducted either with full CSIT at the femtocell, or assuming limited feedback from indoor users to the femtocell using Random Vector Quantization (RVQ) based code-books.

One idea here is that a femtocell should select the cellular users for interference cancellation and indoor users for multiplexing, such that the overall weighted sum rate can be maximized. Mathematically, this selection procedure can be given as the optimization problem:

$$(\tilde{S}_{c,f}, \tilde{S}_f) = \operatorname{argmax} \theta \cdot \sum_{i \in S_f} \log_2 \left( 1 + \frac{\gamma \frac{P_f}{S_f}|w_i^\dagger g_i|^2}{\sum_{j \neq i, j \in S_f} \gamma \frac{P_f}{S_f}|w_j^\dagger g_i|^2 + \sigma^2} \right) + \quad (60)$$

$$(1-\theta) \cdot \sum_{i \in S_{c,f}} \log_2 \left( 1 + \frac{\frac{\alpha P_c}{S_c}|v_i^\dagger h_i|^2}{\sum_{k \neq i, k \in S_c} \frac{\alpha P_c}{S_c}|v_k^\dagger h_i|^2 + \sigma^2} \right)$$

III. Distributed MIMO by Femtocell Coordination Across Backhaul

In this final embodiment, consider the scenario when there are more cellular users in the vicinity of each femtocell relative to the available degrees of freedom available to each femtocell. In such a scenario, embodiments of the present invention propose that neighboring femtocells communicate (possibly with a centralized entity over the internet backhaul) and use distributed MIMO to form a "meta-femtocell" which can cancel interference to both cellular users simultaneously.

Figure 27:
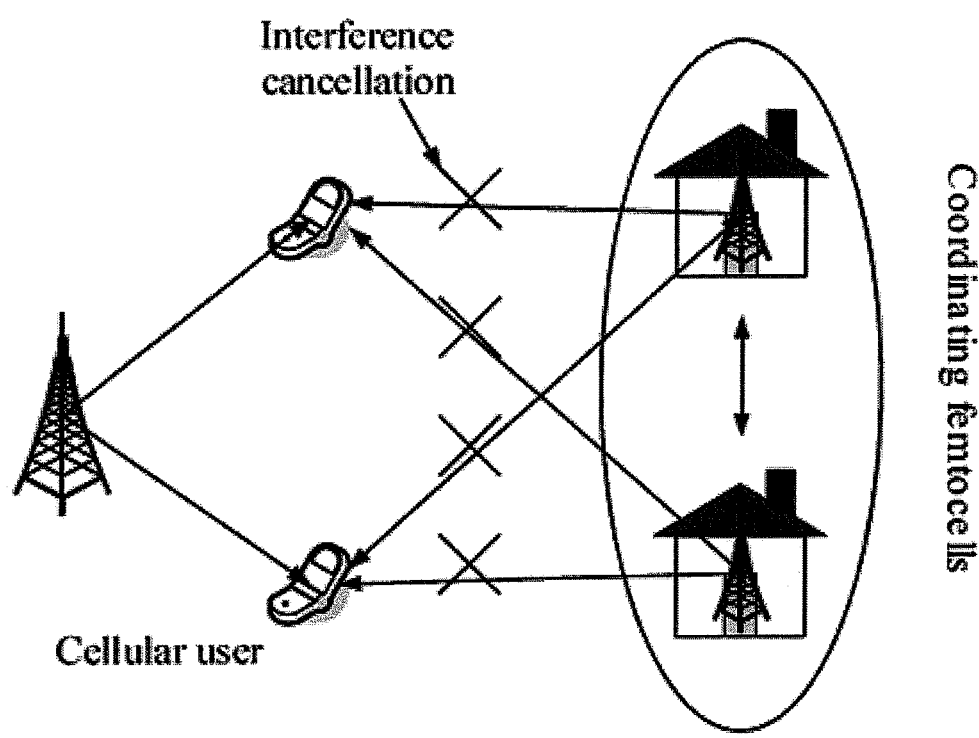
FIG. 27 illustrates two antennas per femtocell and one indoor user served per femtocell, cancelling cross-tier interference requires coordinated design of precoder F.

For example, with 2 antennas per femtocell and 1 active indoor user per femtocell, each femtocell can cancel interference to just 1 cellular user. By jointly designing the precoder F, resulting 4 antenna BTS can cancel interference to both cellular users simultaneously (see FIG. 27). More generally, deploying more femtocells may strategically help an operator reduce interference caused by a rogue femtocell, by inducing that femtocell to coordinate with other femtocells in its immediate vicinity. Perfect synchronization is assumed here which, along with IP latency, may be one of the key issues facing a practical implementation.

Outage Probability and Threshold Distances in Two-Tier Networks with Spatial Diversity I. Motivation As noted above, in a co-channel deployment of femtocells (also known as a femtocell underlay), cross-tier interference may become a capacity-limiting factor. With closed access, a cellular user (communicating with the central macrocell) in the vicinity of an active femtocell may suffer unacceptable interference. The ensuing "dead zone" (FIG. 24) around the femtocell can result in poor outdoor cellular reception.

This embodiment of the present invention considers a scenario wherein the central macrocell and the femtocells share a common region of spectrum and transmit using multiple antennas to their respective users. Femtocells are assumed to be randomly located on the plane according to a Spatial Poisson Point Process (SPPP) $\Lambda_f$ with intensity $\lambda_f$ which describes the mean number of femtocells per unit area. Assuming perfect channel state information (CSIT) at each base station (BS) to its respective users and assuming that each BS transmits using beamforming to a single user (SUBF), this embodiment contains at least the following two contributions:

1) The locations of cellular user with respect to its central macrocell beyond which a certain minimum Quality-of-Service (QoS) requirement (outage probability) likely cannot be satisfied because of excessive cross-tier interference from cochannel femtocells.

2) The locations of a femtocell with respect to the central macrocell wherein cross-tier interference from the macrocell may be significant enough to cause outage at the femtocell.

The above expressions may be used in practical deployments of a two-tier network to either perform adaptive power control at femtocells in closed-access schemes, or perform handoff from the central macrocell to a nearby femtocell in a open-access scheme.

II. System Model

According to one embodiment, for simplicity, assume a single central macrocell $B_0$ using M antennas to service a geographical region C. The macrocell is underlaid with randomly located femtocells distributed according to a SPPP $\Lambda_f$ of intensity $\lambda_f$. Consequently, in the region C with area $|C|$, there are an average of $N_f = \lambda_f |C|$ cochannel femtocells per cell site. In addition, each femtocell is assumed to have F antennas. All cellular and indoor femtocell users are assumed to have exactly one antenna at their handset.

Each BS transmits to exactly one user per slot—WLOG, the slot may refer to either a time or frequency or an orthogonal code resource—for transmission by beamforming (abbreviated as SUBF) in the direction of the vector channel to its user.

Assumption 1: Perfect channel information is assumed at the central macrocell [resp. femtocells] regarding the channels to their individual users.

The terrestrial propagation losses between each BS to surrounding users can be modeled using the IMT-2000 channel model. Embodiments of the present invention consider the following scenarios:

Macrocell to Cellular Users. The path loss between $B_0$ and cellular users can be modeled as:

$$PL_{C,dB} = 10\alpha_c \log_{10}(D) + 30 \log_{10} f_c - 71 \quad (61)$$

$$= A_{c,dB} + 10\alpha_c \log_{10} D \quad (62)$$

where $PL_{C,dB}$=Path losses between $B_0$ to cellular user
$\alpha_c$=Outdoor path-loss exponent
D=Distance of cellular user to $B_0$
$f_c$=Carrier frequency in MHz Macrocell to Indoor Femtocell Users. The path loss between the central macrocell to indoor femtocell users can be modeled as:

$$PL_{F,C,dB} = 10\alpha_c \log_{10}(D) + 30 \log_{10} f_c - 71 \quad (63)$$

$$= A_{f,c,dB} + 10\alpha_c \log_{10} D \quad (64)$$

where $PL_{F,C,dB}$=Path losses between $B_0$ to indoor user
$P_{dB}$=Wall partition loss to indoor user Femtocell to Outdoor Cellular Users. The path loss between a femtocell to a cellular user can be modeled as:

$$PL_{C,F,dB} = 37 + 10\alpha_{fo} \log 10(D) + P_{dB} \quad (65)$$

$$= A_{c,f,dB} + 10\alpha_{fo} \log_{10}(D) \quad (66)$$

where $PL_{C,F,dB}$=Path losses between femtocell to a cellular user
$\alpha_{fo}$=Indoor to outdoor path-loss exponent Path-loss between a given femtocell to a neighboring femtocell can be obtained by adding an extra $P_{dB}$ term to model the double wall partition losses during indoor-to-indoor propagation.

Femtocell to In-home Users. The path loss between a femtocell to indoor users can be modeled as:

$$PL_{F,F,dB} = 37 + 10\alpha_{fi} \log_{10}(R_F) \quad (67)$$

$$= A_{fi,dB} + 10\alpha_{fi} \log_{10}(D) \quad (68)$$

where $PL_{F,F,dB}$=Path losses between a femtocell to its indoor users
$R_F$=Radio range of a femtocell
$\alpha_{fi}$=Indoor path-loss exponent A. Outage Probability for a Cellular User Assume that the macrocell $B_0$ selects user $\mathbf{0}$ for transmission. The beamforming vector $w_0$ can be chosen to be unit norm and in the direction of the vector downlink channel $h_0$ whose entries are distributed as CN(0, 1). With the assumption of perfect CSIT, $$w_0 = \frac{h_0}{\|h_0\|}.$$

The received signal for a cellular user $\mathbf{0}$ at distance D to the central macrocell $B_0$ can be written as:

$$y_0 = \sqrt{A_c} D^{-\alpha_c/2} h_0^\dagger w_0 s_0 + \sum_{i \in \Lambda_f} \sqrt{A_{c,f}} |X_{0,i}|^{-\alpha_{fo}/2} e_{0,i}^\dagger w_i r_i \quad (69)$$

where $s_0$ refers to the data symbol intended for cellular user $\mathbf{0}$ with $\mathbb{E}[|s_0|^2] = P_c$. Similarly, $r_i, \forall i \in \Lambda_f$ refers to the data symbol for the scheduled user in femtocell $F_i$ with $\mathbb{E}[|r_i|^2] = P_f$.

Assuming that all receivers are interference limited (as may be the case in a well-designed cellular network), the Signal-to-Interference (SIR) ratio for the cellular user $\mathbf{0}$ can be given as:

$$SIR_{C,CSIT-SUBF}(D) = \frac{A_c P_c \|h_0\|^2}{\sum_{i \in \Lambda_f} A_{c,f} P_f |e_{0,i}^\dagger v_i|^2 |X_{0,i}|^{-\alpha_{fo}}} \quad (70)$$

Assuming a target SIR equaling $\beta$, a Quality-of-Service (QoS) requirement for user $\mathbf{0}$ stipulates that the target SIR is satisfied with a probability of at least 1−$\epsilon$. In the small $\epsilon$ regime, one can derive the outage probability using (62) which can be given as:

$$\tilde{P}_{out}^\epsilon(\beta, D) = Pr(SIR_{C,CSIT-SUBF}(D) \leq \beta) \quad (71)$$

$$= \lambda_f C(\beta Q_D)^{2/\alpha_{fo}} \left(1 + \sum_{k=0}^{M-1} \frac{\prod_{l=0}^{k-1}(l - 2/\alpha_{fo})}{k!}\right)$$

where $$Q_D = \frac{A_{f,c}}{A_c}\frac{P_f}{P_c}$$

and $$C = \frac{2\pi}{\alpha_{fo}}\Gamma(2/\alpha_{fo})\Gamma(1-2/\alpha_{fo})$$

respectively.

Consequently, in order to satisfy the QoS requirement of $\epsilon$ for a given intensity of interfering femtocells $\lambda_f$, one can obtain the following condition for D:

$$\mathcal{P}_{out}(\beta, D) \le \epsilon \Rightarrow D \le D_{max} = \left[\frac{A_c}{A_{c,f}}\frac{P_c}{P_f}\epsilon^{\alpha_{fo}/2}\right]^{1/\alpha_c} \cdot \left\{\lambda_f C\beta^{2/\alpha_{fo}}\left[1 + \sum_{k=0}^{M-1}\frac{\prod_{l=0}^{k-1}(l-2/\alpha_{fo})}{k!}\right]\right\}^{-\frac{\alpha_{fo}}{2\alpha_c}} \quad (72)$$

Given M antennas at the macrocell, a target SIR $\beta$, a QoS requirement $\epsilon$ and an average of $N_f = \lambda_f |C|$ femtocells per cell site, (72) can provide the threshold distance of a cellular user to its macrocell $D_{max}$ beyond which the cellular user suffers unacceptable cross-tier interference.

The foregoing results may motivate the following two embodiments of the present invention:

Handoff with Open Access Scheme. Hand off all cellular users located at $D > D_{max}$ to a nearby femtocell.

Power control with Closed Access Scheme. Given a cellular user at distance D to its BS, use (72) to determine the transmit power $P_f$ for neighboring femtocells, in order that user 0 obtains an SIR of $\beta$ with a probability greater than $1-\epsilon$.

B. Outage Probability of a Femtocell User

In this section, a reference femtocell $F_0$ at distance D from the central macrocell $B_0$ is considered. The outage probability at $F_0$ may be computed considering only the cross-tier interference from $B_0$. The signal received at user 0 inside femtocell $F_0$ can be given as:

$$y_0 = \sqrt{A_{fi}}R_f^{\alpha_{fi}/2}g_0^\dagger w_0 r_0 + \sqrt{A_{f,c}}D^{-\alpha_c/2}f_c^\dagger w_0 s_0 \quad (73)$$

where $g_0$ [resp. $f_c$] are the vector downlink channels from femtocell $F_0$ [resp. macrocell $B_0$].

The received SIR for the in-home user 0 from the transmitted signal at $F_0$ is upper bounded as:

$$SIR_{F,CSIT-SUBF}(D) \le \frac{P_f R_f^{-\alpha_{fi}/2}\|g_0\|^2}{P_c D^{-\alpha_c}|f_c^\dagger w_0|^2} \quad (74)$$

With a target SIR $\beta$ for the femtocell user, the outage probability $P_{out}(\beta, D) = Pr(SIR_{F,CSIT-SUBT}(D) \le \beta)$ can be given as:

$$\mathcal{P}_{out}(\beta, D) = Pr(SIR_{F,CSIT-SUBT}(D) \le \beta) \quad (75)$$
$$= \frac{\kappa(\beta, D)^F}{1+\kappa(\beta, D)}$$

where $$\kappa(\beta, D) = \frac{P_c}{P_f}\frac{D^{-\alpha_c}}{R_f^{-\alpha_{fi}}}\frac{A_{f,c}}{A_{fi}}\beta$$

Consequently, a QoS requirement $\epsilon$ which stipulates that the outage probability for a femtocell user is no more than $\epsilon$ is violated whenever the femtocell is less than a distance $D_{min}$ given as:

$$D \le D_{min} = \left[\frac{A_{f,c}}{A_{fi}}\frac{P_c}{P_f}R_f^{1/\alpha_c}\beta\right]^{1/\alpha_c}\left(\frac{\epsilon^{1/F}}{1-\epsilon^{1/F}}\right)^{-1/\alpha_c} \Rightarrow \mathcal{P}_{out}(\beta, D) > \epsilon \quad (76)$$

The above expression can provide the threshold distance of a femtocell with respect to the central macrocell $B_0$ within which cross-tier interference prevents in-home users from satisfying their QoS constraint $\epsilon$.

Consequently, embodiments of the present invention propose that all in-home users located at $D \le D_{min}$ communicate with the central macrocell.

III. Simulation Results

Figure 29:
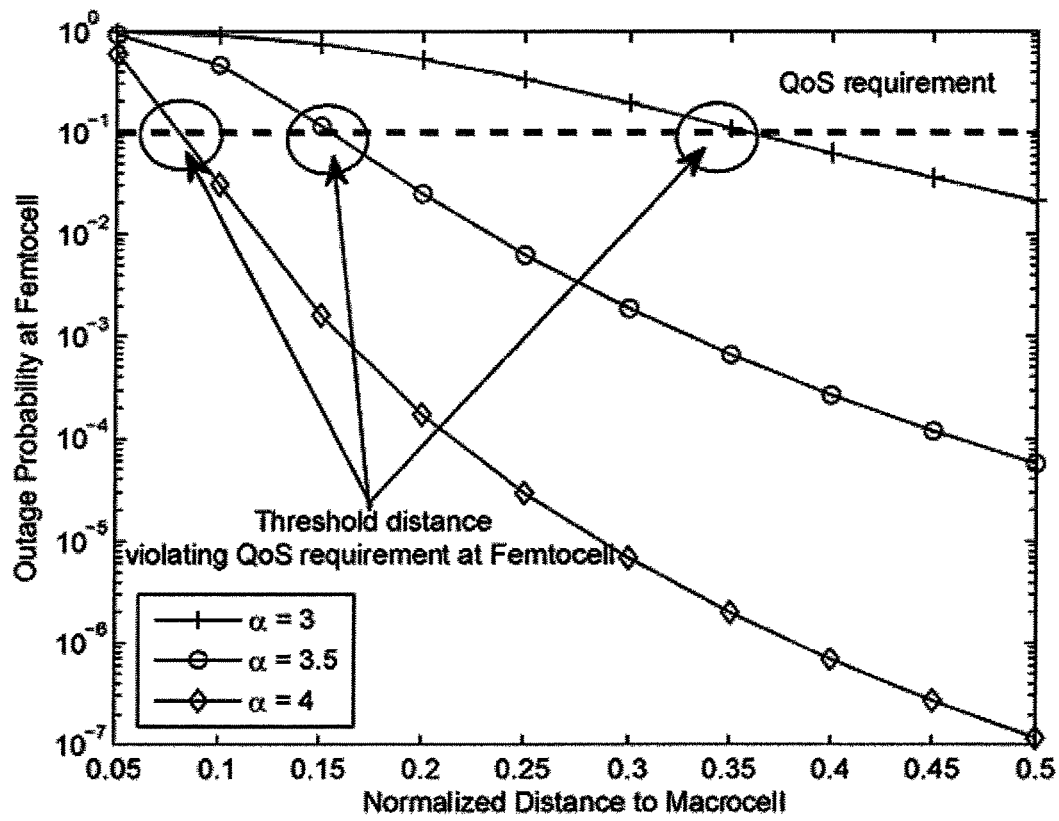
FIG. 29 illustrates outage probability at femtocell as a function of its distance from the central macrocell.
Figure 30:
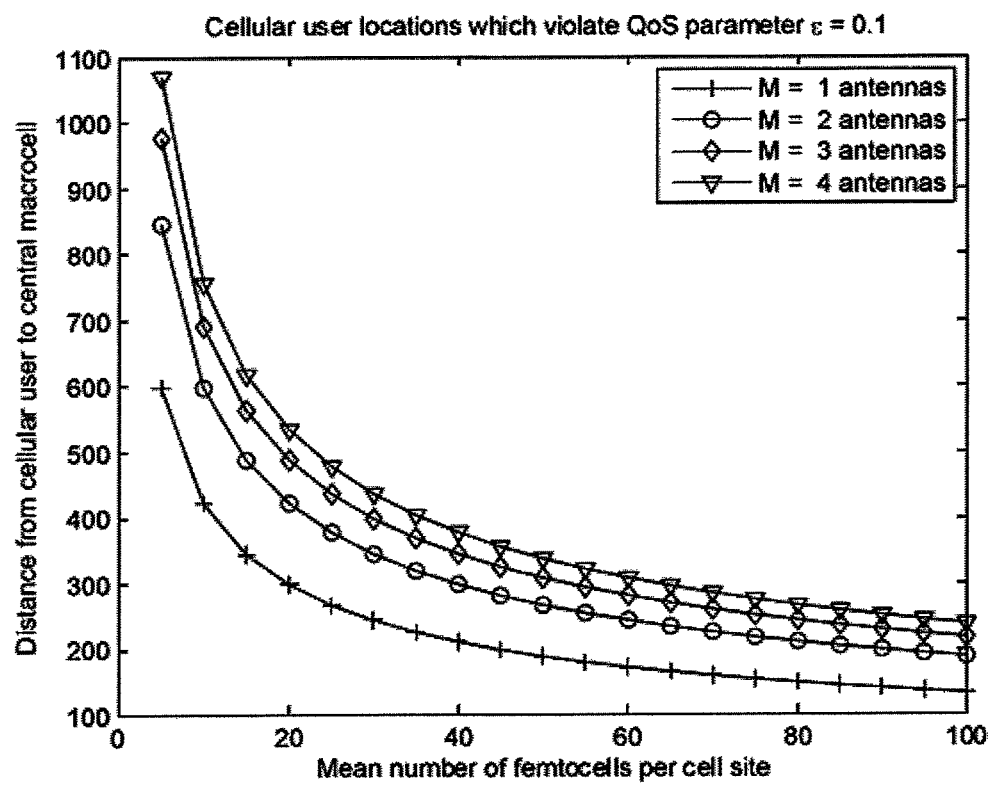
FIG. 30 illustrates threshold distance of cellular user at which QoS requirement $\epsilon=0.1$ is violated as a function of the number of femtocells per cell site and the number of transmit antennas at the macrocell M.

FIGS. 28, 29 and 30 illustrate simulation results associated with the foregoing embodiments of the present invention. In particular, FIG. 28 provides the system parameters used for the simulations; FIG. 29 illustrates the outage probability at a femtocell as a function of its distance from the central macrocell; and FIG. 30 illustrates the threshold distance of cellular user at which QoS requirement $\epsilon=0.1$ is violated as a function of the number of femtocells per cell site and the number of transmit antennas at the macrocell M.

Conclusion

While the methods and systems have been described in connection with embodiments and specific examples, it is not intended that the scope be limited to the particular embodiments set forth, as the embodiments herein are intended in all respects to be illustrative rather than restrictive The examples described herein are put forth so as to provide those of ordinary skill in the art with a complete disclosure and description of how the system and/or methods claimed herein are designed and evaluated, and are intended to be purely exemplary and are not intended to limit the scope of the methods and systems.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

As described above and as will be appreciated by one skilled in the art, embodiments of the present invention may be configured as a system, method or network entity. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable computer-readable storage medium may be utilized including hard disks, CD-ROMS, optical storage devices, or magnetic storage devices.

Embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, be implemented by various means including computer program instructions. These computer program instructions may be loaded onto a general purpose computer, special purpose computer, or other programmable data processing apparatus, such as processor 103 discussed above with reference to FIG. 3, to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus (e.g., processor 103 of FIG. 3) to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions an the associated drawings describe exemplary embodiments in the context of certain exemplary combinations of elements and/or functions, it should be appreciated that different combinations of elements and/or functions may be provided by alternative embodiments without department from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed:

1. A system for decentralized spectrum allocation in a two-tier network, comprising:
   one or more low power base stations deployed in a secondary tier within a coverage range of a macro cellular base station deployed in a first tier, wherein the macro cellular base station utilizes a wireless frequency band and respective low power base stations utilize a wireless frequency band that is the same as the macro cellular base station wireless frequency band,
   wherein respective low power base stations are configured to employ at least one cross-tier interference avoidance technique such that coexistence between the macro cellular base station and the corresponding low power base station is enabled, the at least one cross-tier interference avoidance technique comprising the use of two or more transmit antennas at the low power base station to null interference in the direction of a nearby macro cellular base station's user, and
   wherein the direction to null the low power base station's transmissions is determined by channel state feedback sent from the macro cellular base station's downlink user to its associated macro base station.

2. The system of claim 1, wherein respective low power base stations use an Orthogonal Frequency Division Multiple Access (OFDMA) technique, wherein one or more frequency subchannels are created by an inverse Fourier transform.

3. The system of claim 2, further comprising:
   a central radio access network controller associated with the macro cellular base station, said central radio access network controller configured to dynamically partition a frequency spectrum associated with the cellular base station and the one or more low power base stations into a first portion to be used by one or more users associated with the macro cellular base station and a second portion to be used by one or more users associated with respective low power base stations.

4. The system of claim 2, wherein at least one of the interference avoidance techniques comprises randomly selecting a predetermined number of available frequency subchannels for transmitting signals to and from the corresponding low power users.

5. The system of claim 2, wherein at least one of the interference avoidance techniques comprises identifying one or more unutilized frequency subchannels for transmitting signals to and from the corresponding low power users.

6. The system of claim 1, wherein the at least one cross-tier interference avoidance technique comprises use of randomized frequency hopping when transmitting signals to and from one or more users associated with the corresponding low power base station.

7. The system of claim 1, wherein respective low power base stations employ frequency division multiple access transmission.

8. The system of claim 1, wherein at least one of the interference avoidance techniques comprises handing off at least one user associated with the macro cellular base station to one of the low power base stations.

9. The system of claim 1, wherein at least one of the interference avoidance techniques comprises handing off at least one user associated with at least one of the low power base stations to the macro cellular base station.

10. The system of claim 1, wherein at least one of the interference avoidance techniques comprises reducing the transmission power of at least one of the low power base stations to reduce interference and ensure a minimum quality-of-service for a user serviced by the macro cellular base station.

11. The system of claim 1, wherein respective low power base stations further comprise:
- a low-power amplifier;
- one or more analog filters configured to reject out of band interferences;
- a digital processing circuit for performing digital modulation and demodulation and error correction coding and decoding; and
- a microprocessor.

12. The system of claim 1, wherein respective low power base stations provide a range of coverage that is shorter than a range of coverage associated with the macro cellular base station.

13. A system for decentralized spectrum allocation in a two-tier network, comprising:
- one or more low power base stations deployed in a secondary tier within a coverage range of a macro cellular base station deployed in a first tier, wherein the macro cellular base station utilizes a wireless frequency band and respective low power base stations utilize a wireless frequency band that is the same as the macro cellular base station wireless frequency band,
- wherein respective low power base stations are configured to employ at least one cross-tier interference avoidance technique such that coexistence between the macro cellular base station and the corresponding low power base station is enabled, the at least one cross-tier interference avoidance technique comprising the use of two or more transmit antennas at the low power base station to null interference in the direction of a nearby macro cellular base station's user, and
- wherein the transmitted data rate from the low power base station is adapted to a measured channel quality at the low power base station's desired receiver.

14. The system of claim 13, wherein respective low power base stations use an Orthogonal Frequency Division Multiple Access (OFDMA) technique, wherein one or more frequency subchannels are created by an inverse Fourier transform.

15. The system of claim 14, further comprising:
- a central radio access network controller associated with the macro cellular base station, said central radio access network controller configured to dynamically partition a frequency spectrum associated with the cellular base station and the one or more low power base stations into a first portion to be used by one or more users associated with the macro cellular base station and a second portion to be used by one or more users associated with respective low power base stations.

16. The system of claim 14, wherein at least one of the interference avoidance techniques comprises randomly selecting a predetermined number of available frequency subchannels for transmitting signals to and from the corresponding low power users.

17. The system of claim 14, wherein at least one of the interference avoidance techniques comprises identifying one or more unutilized frequency subchannels for transmitting signals to and from the corresponding low power users.

18. The system of claim 13, wherein the at least one cross-tier interference avoidance technique comprises use of randomized frequency hopping when transmitting signals to and from one or more users associated with the corresponding low power base station.

19. The system of claim 13, wherein respective low power base stations employ frequency division multiple access transmission.

20. The system of claim 13, wherein at least one of the interference avoidance techniques comprises handing off at least one user associated with the macro cellular base station to one of the low power base stations.

21. The system of claim 13, wherein at least one of the interference avoidance techniques comprises handing off at least one user associated with at least one of the low power base stations to the macro cellular base station.

22. The system of claim 13, wherein at least one of the interference avoidance techniques comprises reducing the transmission power of at least one of the low power base stations to reduce interference and ensure a minimum quality-of-service for a user serviced by the macro cellular base station.

23. The system of claim 13, wherein respective low power base stations further comprise:
- a low-power amplifier;
- one or more analog filters configured to reject out of band interferences;
- a digital processing circuit for performing digital modulation and demodulation and error correction coding and decoding; and
- a microprocessor.

24. The system of claim 13, wherein respective low power base stations provide a range of coverage that is shorter than a range of coverage associated with the macro cellular base station.

* * * * *